United States Patent
Ahlfeld et al.

(10) Patent No.: US 9,281,083 B2
(45) Date of Patent: Mar. 8, 2016

(54) TRAVELING WAVE NUCLEAR FISSION REACTOR, FUEL ASSEMBLY, AND METHOD OF CONTROLLING BURNUP THEREIN

(75) Inventors: Charles E. Ahlfeld, La Jolla, CA (US); John Rogers Gilleland, Kirkland, WA (US); Roderick A. Hyde, Redmond, WA (US); Muriel Y. Ishikawa, Livermore, CA (US); David G. McAlees, Bellevue, WA (US); Nathan P. Myhrvold, Medina, WA (US); Charles Whitmer, North Bend, WA (US); Lowell L. Wood, Jr., Bellevue, WA (US); George B. Zimmerman, Lafayette, CA (US)

(73) Assignee: TerraPower, LLC, Bellevue, WA (US)

( * ) Notice: Subject to any disclaimer, the term of this patent is extended or adjusted under 35 U.S.C. 154(b) by 598 days.

(21) Appl. No.: 12/459,591

(22) Filed: Jul. 1, 2009

(65) Prior Publication Data

US 2010/0254502 A1 Oct. 7, 2010

Related U.S. Application Data

(63) Continuation-in-part of application No. 12/384,669, filed on Apr. 6, 2009, now Pat. No. 8,942,338.

(51) Int. Cl.
*G21C 7/02* (2006.01)
*G21C 7/06* (2006.01)
(Continued)

(52) U.S. Cl.
CPC *G21C 7/06* (2013.01); *G21C 1/022* (2013.01); *G21C 1/026* (2013.01); *G21C 5/20* (2013.01);
(Continued)

(58) Field of Classification Search
USPC .......................... 376/207, 219, 214, 327, 349
See application file for complete search history.

(56) References Cited

U.S. PATENT DOCUMENTS 3,093,569 A 6/1963 Post
3,105,036 A * 9/1963 Puechl .......................... 376/346
(Continued)

FOREIGN PATENT DOCUMENTS

CN 85 1 09302 B 6/1988
CN 88102423 10/1988
(Continued)

OTHER PUBLICATIONS

Ohoka et al., "Simulation Study on Candle Burnup Applied to Block-Type High Temperature Gas-cooled Reactor" Progress in Nuclear Energy, vol. 47, No. 1-4, pp. 292-299, 2005.*
(Continued)

*Primary Examiner* — Jack W Keith
*Assistant Examiner* — Sean P Burke

(57) ABSTRACT

A traveling wave nuclear fission reactor, fuel assembly, and a method of controlling burnup therein. In a traveling wave nuclear fission reactor, a nuclear fission reactor fuel assembly comprises a plurality of nuclear fission fuel rods that are exposed to a deflagration wave burnfront that, in turn, travels through the fuel rods. The excess reactivity is controlled by a plurality of movable neutron absorber structures that are selectively inserted into and withdrawn from the fuel assembly in order to control the excess reactivity and thus the location, speed and shape of the burnfront. Controlling location, speed and shape of the burnfront manages neutron fluence seen by fuel assembly structural materials in order to reduce risk of temperature and irradiation damage to the structural materials.

36 Claims, 59 Drawing Sheets

(51) Int. Cl.

| | |
|---|---|
| *G21C 1/02* | (2006.01) |
| *G21C 5/20* | (2006.01) |
| *G21C 7/08* | (2006.01) |
| *G21C 7/34* | (2006.01) |
| *G21C 19/50* | (2006.01) |
| *G21C 3/07* | (2006.01) |

(52) U.S. Cl.
CPC .. *G21C 7/08* (2013.01); *G21C 7/34* (2013.01); *G21C 19/50* (2013.01); *G21C 1/024* (2013.01); *G21C 3/07* (2013.01); *G21C 7/02* (2013.01); *Y02E 30/34* (2013.01); *Y02E 30/39* (2013.01)

(56) References Cited

U.S. PATENT DOCUMENTS

| | | | | |
|---|---|---|---|---|
| 3,172,818 | A | | 3/1965 | Hibshman |
| 3,309,284 | A | | 3/1967 | Bennett |
| 3,322,644 | A | | 5/1967 | Benson |
| 3,406,093 | A | | 10/1968 | DeParatesi et al. |
| 3,489,646 | A | | 1/1970 | VanDievoet et al. |
| 3,799,839 | A | | 3/1974 | Fischer et al. |
| 3,906,469 | A | | 9/1975 | Kronk |
| 4,097,330 | A | * | 6/1978 | Neissel et al. ............... 376/255 |
| 4,113,563 | A | * | 9/1978 | Tobin ............................ 376/427 |
| 4,704,248 | A | * | 11/1987 | Lee et al. ..................... 376/427 |
| 4,711,756 | A | | 12/1987 | Nakazato |
| 4,759,896 | A | * | 7/1988 | Boyd ............................ 376/224 |
| 4,876,057 | A | | 10/1989 | Bernard et al. |
| 5,045,275 | A | | 9/1991 | Abdel-Khalik |
| 5,276,718 | A | * | 1/1994 | Ueda ............................ 376/220 |
| 5,420,897 | A | | 5/1995 | Kasai et al. |
| 5,596,615 | A | | 1/1997 | Nakamura et al. |
| 5,719,912 | A | | 2/1998 | Ledford et al. |
| 6,669,893 | B1 | | 12/2003 | Provot et al. |
| 7,155,613 | B2 | * | 12/2006 | Master et al. ................. 713/182 |
| 7,158,127 | B1 | * | 1/2007 | Dotson ........................ 345/204 |
| 2006/0109944 | A1 | | 5/2006 | Popa |
| 2006/0171498 | A1 | | 8/2006 | D'Auvergne |
| 2008/0123795 | A1 | | 5/2008 | Hyde et al. |
| 2008/0123797 | A1 | | 5/2008 | Hyde et al. |
| 2008/0171498 | A1 | | 7/2008 | Woods et al. |

FOREIGN PATENT DOCUMENTS

| | | |
|---|---|---|
| JP | 50-034191 A | 11/1975 |
| JP | 60-003585 A | 1/1985 |
| JP | 2010-511174 A | 2/1989 |
| RU | 2077742 C1 | 4/1997 |
| RU | 2107957 C1 | 3/1998 |
| RU | 2119199 C1 | 9/1998 |
| RU | 2142654 C1 | 12/1999 |
| RU | 2287193 C2 | 11/2006 |
| WO | WO2008097298 A2 | 8/2008 |

OTHER PUBLICATIONS

Chen et al., "Solitary Burnup Wave Solution in a Multi-Group Diffusion-Burnup Couple Systems", ICENES 2007.*

Teller, Edward; Ishikawa, Muriel; Wood, Jr., Lowell; Hyde, Roderick; Nuckolls, John. "Completely Automated Nuclear Reactors for Long-Term Operation II: Toward a Concept-Level Point-Design of a High-Temperature, Gas-Cooled Central Power Station System"; University of California Lawrence Livermore National Laboratory Publication UCRL-JC-122708 Pt 2; submitted to the 1996 International Conference on Emerging Nuclear Energy Systems (ICENES '96), Obninsk, Russian Federation on Jun. 24-28, 1996.

Teller, Edward; Ishikawa, Muriel; Wood, Jr., Lowell; Hyde, Roderick; Nuckolls, John. "Completely Automated Nuclear Power Reactors for Long-Term Operation: III. Enabling Technology for Large-Scale, Low-Risk, Affordable Nuclear Electricity"; University of California Lawrence Livermore National Laboratory Publication UCRL-JRNL-122708; presented at the Jul. 2003 Workshop of the Aspen Global Change Institute.

PCT International Search Report; International App. No. PCT/US10/01006; Nov. 15, 2010; pp. 1-2.

PCT International Search Report; International App. No. PCT/US10/01004; Nov. 18, 2010; pp. 1-2.

"Thorium Fuel Cycle—Potential Benefits and Challenges", May 2005, pp. 1-113, International Atomic Energy Agency (IAEA), Vienna, Austria.

"Working Material: Status of National Programmes on Fast Breeder Reactors", Twenty-Fifth Annual Meeting of the International Working Group on Fast Reactors Summary Report, Apr. 27-30, 1992, pp. 1-279, International Atomic Energy Agency (IAEA), Vienna, Austria.

European Patent Office; Extended European Search Report; European App. No. EP 10 78 9840; bearing a date of Dec. 11, 2012 (received by our Agent on Dec. 12, 2012); pp. 1-2.

Patent Office of the Russian Federation, Office Action, App. No. 2011143468/07 (065235); Feb. 12, 2013; pp. 1-9 (machine translation 6 pages, 15 total pages including translation).

European Patent Office; European Search Report; App. No. EP10 789 840.5; Sep. 3, 2013 (received by our agent on Sep. 10, 2013); pp. 1-6.

European Patent Office; European Search Report; App. No. EP10 789 839.7; Sep. 3, 2013 (received by our agent on Sep. 10, 2013); pp. 1-6.

Teller et al.; "Completely Automated Nuclear Power Reactors for Long-Term Operation: III. Enabling Technology for Large-Scale, Low-Risk, Affordable Nuclear Electricity"; University of California Lawrence Livermore National Laboratory Publication UCRL-JRNL-122708; Jul. 2003.

* cited by examiner

TRAVELING WAVE NUCLEAR FISSION REACTOR, FUEL ASSEMBLY, AND METHOD OF CONTROLLING BURNUP THEREIN

CROSS-REFERENCE TO RELATED APPLICATIONS

The present application is related to and claims the benefit of the earliest available effective filing date from the following listed applications (the "Related Applications") (e.g., claims earliest available priority dates for other than provisional patent applications or claims benefits under 35 USC §119(e) for provisional patent applications, for any and all parent, grandparent, great-grandparent, etc. applications of the Related Applications).

RELATED APPLICATIONS

For purposes of the USPTO extra-statutory requirements, the present application constitutes a continuation-in-part of U.S. patent application Ser. No. 12/384,669, entitled A TRAVELING WAVE NUCLEAR FISSION REACTOR, FUEL ASSEMBLY, AND METHOD OF CONTROLLING BURNUP THEREIN, naming Charles E. Ahlfeld, John Rogers Gilleland, Roderick A. Hyde, Muriel Y. Ishikawa, David G. McAlees, Nathan P. Myhrvold, Charles Whitmer, Lowell L. Wood, Jr., and George B. Zimmerman as inventors, filed Apr. 6, 2009 now U.S. Pat. No. 8,942,338, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent application as set forth above, but expressly points out that such designations are not to be construed in any way as any type of commentary and/or admission as to whether or not the present application contains any new matter in addition to the matter of its parent application.

All subject matter of the Related Application and of any and all parent, grandparent, great-grandparent, etc. applications of the Related Applications is incorporated herein by reference to the extent such subject matter is not inconsistent herewith.

BACKGROUND

This application generally relates to control of nuclear reactions and more particularly relates to a traveling wave nuclear fission reactor, fuel assembly, and a method of controlling burnup therein.

It is known, in an operating nuclear fission reactor, that neutrons of a known energy are absorbed by nuclides having a high atomic mass. The resulting compound nucleus separates into fission products that include two lower atomic mass fission fragments and also decay products. Nuclides known to undergo such fission by neutrons of all energies include uranium-233, uranium-235 and plutonium-239, which are fissile nuclides. For example, thermal neutrons having a kinetic energy of 0.0253 eV (electron volts) can be used to fission U-235 nuclei. Thorium-232 and uranium-238, which are fertile nuclides, will not undergo induced fission, except with fast neutrons that have a kinetic energy of at least 1 MeV (million electron volts). The total kinetic energy released from each fission event is about 200 MeV. This kinetic energy is eventually transformed into heat.

Moreover, the fission process, which starts with an initial source of neutrons, liberates additional neutrons as well as transforms kinetic energy into heat. This results in a self-sustaining fission chain reaction that is accompanied by continued energy release.

A traveling wave Pyrotron for continuous operation is disclosed in U.S. Pat. No. 3,093,569, issued Jun. 11, 1963 in the names of Richard F. Post, et al. and titled "Traveling Wave Pyrotron." This patent discloses a continuous operating reactor or device for increasing the energy and density of plasma and conducting nuclear reactions therein. An object of the invention is to provide a Pyrotron where traveling magnetic waves are employed to accomplish trapping, heating and energy recovery of charged particles within individual containment zones, each of which progresses along the machine with time. However, this patent does not appear to disclose a traveling wave nuclear fission reactor, fuel assembly, and a method of controlling burnup therein, as described and claimed herein.

U.S. Pat. No. 3,799,839 issued Mar. 6, 1974 in the names of David L. Fischer, et al. and titled "Reactivity And Power Distribution Control Of Nuclear Reactor" discloses a spatial distribution, amount, density and configuration of burnable poison to control a predetermined amount of excess reactivity and to maintain a constant or stationary power distribution during the operating cycle of a nuclear reactor core. According to this patent, it is an object of the invention to provide an arrangement of burnable poison in a nuclear reactor core which will provide a substantially stationary power distribution in the core throughout the period of the operating cycle. Also, according to this patent, other objects are achieved in accordance with the invention by determining consistent power and concomitant reactivity distributions for the operating cycles: by determining the resulting excess local reactivity, and by providing burnable poison in amount, density and configuration, spatially distributed to substantially match the changes in excess local reactivity throughout the period of the operating cycle. However, this patent does not appear to disclose a traveling wave nuclear fission reactor, fuel assembly, and a method of controlling burnup therein, as described and claimed herein.

U.S. Pat. No. 3,489,646 issued Jan. 13, 1970 in the names of Jean Paul Van Dievoet, et al. and titled "Method of Pulsating or Modulating a Nuclear Reactor" relates to a method of pulsating or modulating the operation of a nuclear reactor. This patent discloses modulating the reactor by periodically varying the neutron flux density. According to this patent, operation of a nuclear reactor is controlled by moving one or more structures containing at least at certain localities, an amount of neutron-active substance, at a place outside the nuclear fission region of the reactor, and thereby modify, in dependence upon the speed of the structure, a neutron flow issuing from the reactor core. The specimens of neutron-active material which thus modify the reactivity of the reactor system from the outside may be neutron-generating and/or neutron-influencing material, such as fissionable material, reflector material or other neutron-influencing substance. However, this patent does not appear to disclose a traveling wave nuclear fission reactor, fuel assembly, and a method of controlling burnup therein, as described and claimed herein.

None of the art recited hereinabove appears to disclose a traveling wave nuclear fission reactor, fuel assembly, and a method of controlling burnup therein, as described and claimed herein.

Therefore, what are needed are a traveling wave nuclear fission reactor, fuel assembly, and a method of controlling burnup therein, as described and claimed herein.

SUMMARY

According to an aspect of this disclosure, there is provided a method of controlling burnup in a traveling wave nuclear fission reactor capable of emitting a neutron flux, comprising modulating the neutron flux emitted by the traveling wave nuclear fission reactor.

According to another aspect of this disclosure, there is provided a method of controlling burnup in a traveling wave nuclear fission reactor capable of emitting a neutron flux, comprising modulating the neutron flux emitted by the traveling wave nuclear fission reactor, the neutron flux defining a burnfront.

According to a further aspect of this disclosure, there is provided a traveling wave nuclear fission reactor, comprising a nuclear reactor core; and a nuclear fission reactor fuel assembly disposed in the reactor core, the nuclear fission reactor fuel assembly being configured to achieve a burnup value at or below a predetermined burnup value.

According to an additional aspect of this disclosure, there is provided a traveling wave nuclear fission reactor, comprising a nuclear reactor core capable of producing a burnfront therein; a nuclear fission reactor fuel assembly disposed in the nuclear reactor core; a neutron interactive material disposed in the nuclear fission reactor fuel assembly; and a control system configured to control disposition of the nuclear interactive material in response to a parameter associated with the burnfront.

According to yet another aspect of this disclosure, there is provided a traveling wave nuclear fission reactor capable of controlling burnup therein, comprising a reactor pressure vessel; a nuclear fission reactor fuel assembly sealingly disposed in the pressure vessel, the nuclear fission reactor fuel assembly including a neutron interactive material arranged in a predetermined loading pattern; and a removable nuclear fission igniter capable of being disposed in neutronic communication with the neutron interactive material, the nuclear fission igniter capable of igniting a deflagration wave burnfront traveling through the neutron interactive material.

A feature of the present disclosure is the provision of neutron absorber material in the form of a control rod, reflector, or neutron emitting material or other absorber material that enhances absorption at a location relative to a deflagration wave burnfront.

In addition to the foregoing, various other method and/or device aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

While the specification concludes with claims particularly pointing-out and distinctly claiming the subject matter of the present disclosure, it is believed the disclosure will be better understood from the following detailed description when taken in conjunction with the accompanying drawings. In addition, the use of the same symbols in different drawings will typically indicate similar or identical items.

DETAILED DESCRIPTION

Figure 1:
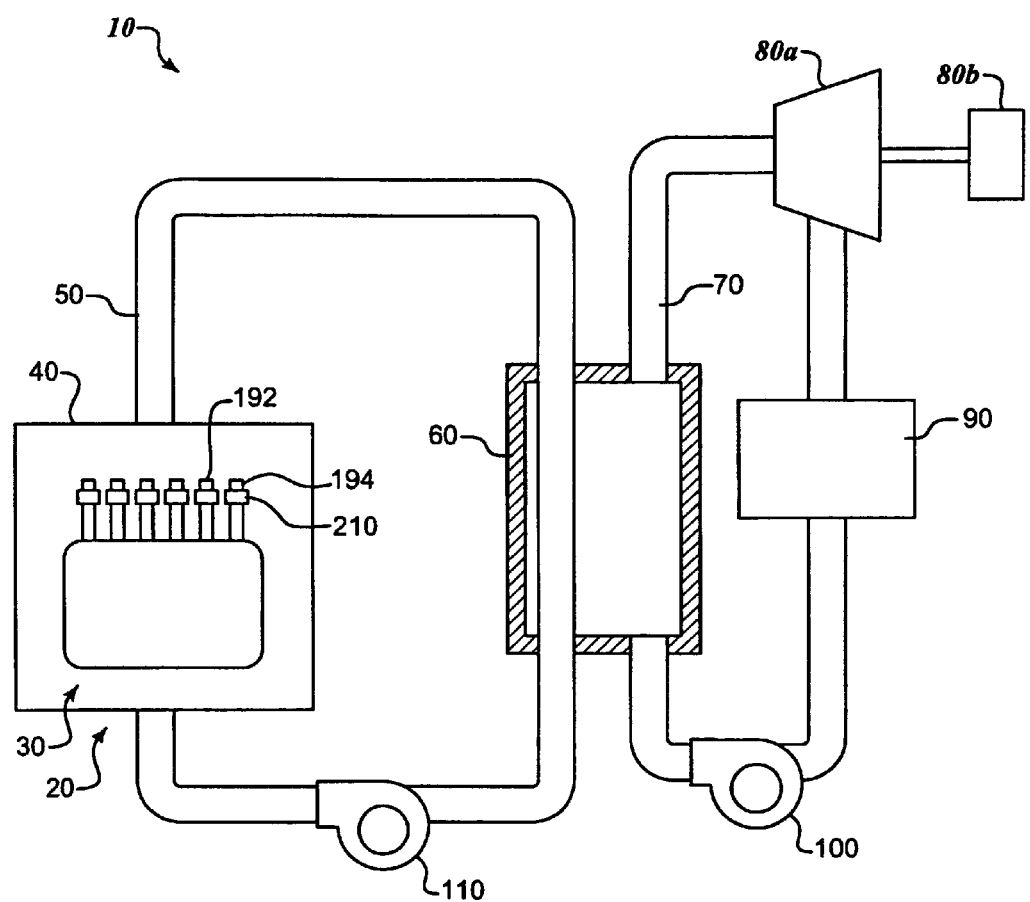
FIG. 1 is a view in partial elevation of a nuclear fission reactor arrangement.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

In addition, the present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Moreover, the herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Some considerations regarding various embodiments disclosed herein are given by way of overview but are not to be interpreted as limitations. Also, some of the embodiments disclosed herein reflect attainment of all of the considerations discussed below. On the other hand, some other embodiments disclosed herein reflect attainment of selected considerations, and need not accommodate all of the considerations discussed hereinbelow. Portions of the following discussion include information excerpted from a paper titled "Completely Automated Nuclear Power Reactors for Long-Term Operation: III. Enabling Technology For Large-Scale, Low-Risk, Affordable Nuclear Electricity" by Edward Teller, Muriel Ishikawa, Lowell Wood, Roderick Hyde, and John Nuckolls, presented at the July 2003 Workshop of the Aspen Global Change Institute, University of California Lawrence Livermore National Laboratory publication UCRL-JRNL-122708 (2003). (This paper was prepared for submittal to *Energy, The International Journal,* 30 Nov. 2003, the entire contents of which are hereby incorporated by reference).

As previously mentioned, for every neutron that is absorbed in a fissile nuclide which leads to a fission event, more than one neutron is liberated until the fissile nuclei are depleted. This phenomenon is used in a commercial nuclear reactor to produce continuous heat that, in turn, is beneficially used to generate electricity.

However, a consideration in reactor design and operation is heat damage to reactor structural materials due to "peak" temperature (i.e., hot channel peaking factor) which occurs due to a combination of uneven neutron flux, coolant flow, fuel composition and power distribution in the reactor. Heat damage results if the peak temperature exceeds material limits. This can happen regardless of the extent of burn-up (i.e., cumulative amount of energy generated per unit mass of fuel), which is usually expressed in units of megawatt-days per metric tonne of heavy metal fuel (MWd/MTHM) or gigawatt-days per metric tonne of heavy metal fuel (GWd/MTHM). A "reactivity change" (i.e., change in the responsiveness of the reactor) may be produced because of fuel burnup. More specifically, "reactivity change" is related to the relative ability of the reactor to produce more or less neutrons than the exact amount to sustain the critical chain reaction. Responsiveness of a reactor is typically characterized as the time derivative of a reactivity change causing the reactor to increase or decrease in power exponentially where the time constant is known as the reactor period. In this regard, control rods made of neutron absorbing material are typically used to adjust and control the changing reactivity and reactor responsiveness. Such control rods are reciprocated in and out of the reactor core to variably control neutron absorption and thus the neutron flux level and reactivity in the core. The neutron flux level is depressed in the vicinity of the control rod and potentially higher in areas remote from the control rod. Thus, the neutron flux is not uniform across the reactor core. This results in higher fuel burnup in those areas of higher flux. Also, it may be appreciated by a person of ordinary skill in the art of nuclear power production that flux and power density variations are due to many factors. Proximity to a control rod may or may not be the primary factor. For example, the flux typically drops significantly at core boundaries with no nearby control rod. These effects, in turn, may cause overheating or high temperatures in those areas of higher flux. Such peak temperatures may undesirably reduce the operational life of structures subjected to such peak temperatures by altering the mechanical properties of the structures. Also, reactor power density, which is proportional to the product of the neutron flux and the fissile fuel concentration, is limited by the ability of core structural materials to withstand such high temperatures without damage. Therefore, it is desirable to avoid structural damage due to high temperatures caused by high fuel burnup.

Another consideration in reactor design and operation is irradiation damage to structural materials contained in the nuclear reactor core due to high fuel burnup. Such irradiation damage may be expressed in terms of displacements per atom (DPA), which includes information on the response of the material (i.e., displaced atoms), as well as the fast neutron fluence to which the material was exposed. DPA is proportional to burnup and is a calculated, representative measure of radiation damage which accounts for not only the dose and type of irradiation, but also includes a measure of the material's response to the irradiation. In this regard, some structural materials used in reactor core structures may become embrittled when exposed to neutrons released during the fission process. It is desirable to maintain such irradiation damage to reactor structural materials within known limits in order to ensure structural integrity and safe operation of the reactor.

Therefore, referring to FIG. 1, by way of example only and not by way of limitation, there is shown a nuclear fission reactor arrangement, generally referred to as 10, to address the problems recited hereinabove. Nuclear fission reactor arrangement 10 generates electricity that is to be transmitted over a plurality of transmission lines (not shown). Reactor arrangement 10 alternatively may be used to conduct tests to determine effects of neutron flux on reactor materials.

Referring again to FIG. 1, reactor arrangement 10 comprises a nuclear fission reactor, generally referred to as 20, that includes a plurality of generic nuclear fission reactor fuel assemblies, generally referred to as 30 (only one of which is shown), disposed within a reactor pressure vessel 40, which in turn may be housed within a containment structure (not shown). By way of illustration only and not by way of limitation, exemplary embodiments of generic fuel assembly 30 are disclosed hereinbelow. Generic fuel assembly 30 may be surrounded by a neutron multiplier or reflector material (not shown) and a radiation shield (also not shown). In this case, the reflector material reduces neutron leakage from fuel assembly 30. An additional function of the reflector material is to substantially reduce the fast neutron fluence seen by the outer portions of fuel assembly 30, such as its radiation shield, structural supports and containment structure. It also influences the performance of generic fuel assembly 30, so as to improve the breeding efficiency and the specific power in the outermost portions of generic fuel assembly 30. The radiation shield, on the other hand, further protects the biosphere from unintended release of radiation from generic fuel assembly 30.

Referring yet again to FIG. 1, a primary coolant loop 50 carries heat from generic fuel assembly 30 to a steam generating heat exchanger 60. Primary loop 50 may be made from any suitable material, such as stainless steel. Thus, if desired, primary loop 50 may be made from ferrous alloys, non-ferrous alloys, zirconium-based alloys or other structural materials or composites. The coolant carried by primary loop 50 may be a noble gas or mixtures thereof. Alternatively, the coolant may be other fluids such as water ($H_2O$), or gaseous or supercritical carbon dioxide ($CO_2$). As another example, the coolant may be a liquid metal such as sodium (Na) or lead (Pb) or alloys, such as lead-bismuth (Pb—Bi). Further, the coolant may be an organic-based coolant, such as a polyphenyl or a fluorocarbon. As the coolant carried by primary loop 50 passes through steam generating heat exchanger 60, the coolant will give-up its heat to a working fluid (not shown) residing in heat exchanger 60. The working fluid will vaporize to steam, when the working fluid is water. In this case, the steam travels into a secondary loop 70 that is isolated from primary loop 50 and that is coupled to a turbine-generator set 80a and 80b. Hence, heat exchanger 60 transfers heat to the working fluid in heat exchanger 60 and secondary loop 70 to generate steam that is provided as the working fluid for rotating turbine-generator set 80a and 80b. Turbine-generator set 80a and 80b generates electricity as it rotates, in a manner well understood in the art of electricity production from steam. A condenser 90 may be suitably coupled to turbine-generator set 80a and 80b for condensing exhaust steam from turbine-generator set 80a and 80b from a vapor state to a liquid state.

Referring again to FIG. 1, a pump 100 is coupled to secondary loop 70 and is in fluid communication with the working fluid carried by secondary loop 70 for pumping the liquefied working fluid from condenser 90 heat exchanger 60. Moreover, a pump 110 is coupled to primary loop 50 and is in fluid communication with the reactor coolant carried by primary loop 50 for pumping the reactor coolant through primary loop 50. Primary loop 50 carries the reactor coolant from generic fuel assembly 30 to heat exchanger 60. Also, primary loop 50 carries the coolant from heat exchanger 60 to pressure vessel 40. Pump 110 circulates the reactor coolant through primary loop 50, including generic fuel assembly 30 and heat exchanger 60 in order to remove heat generated by fuel assembly 30 during reactor operation or to remove residual decay heat when reactor 20 is not operating. Removing heat from generic fuel assembly 30 reduces the risk that generic fuel assembly 30 will overheat, which is highly undesirable.

Figure 2:
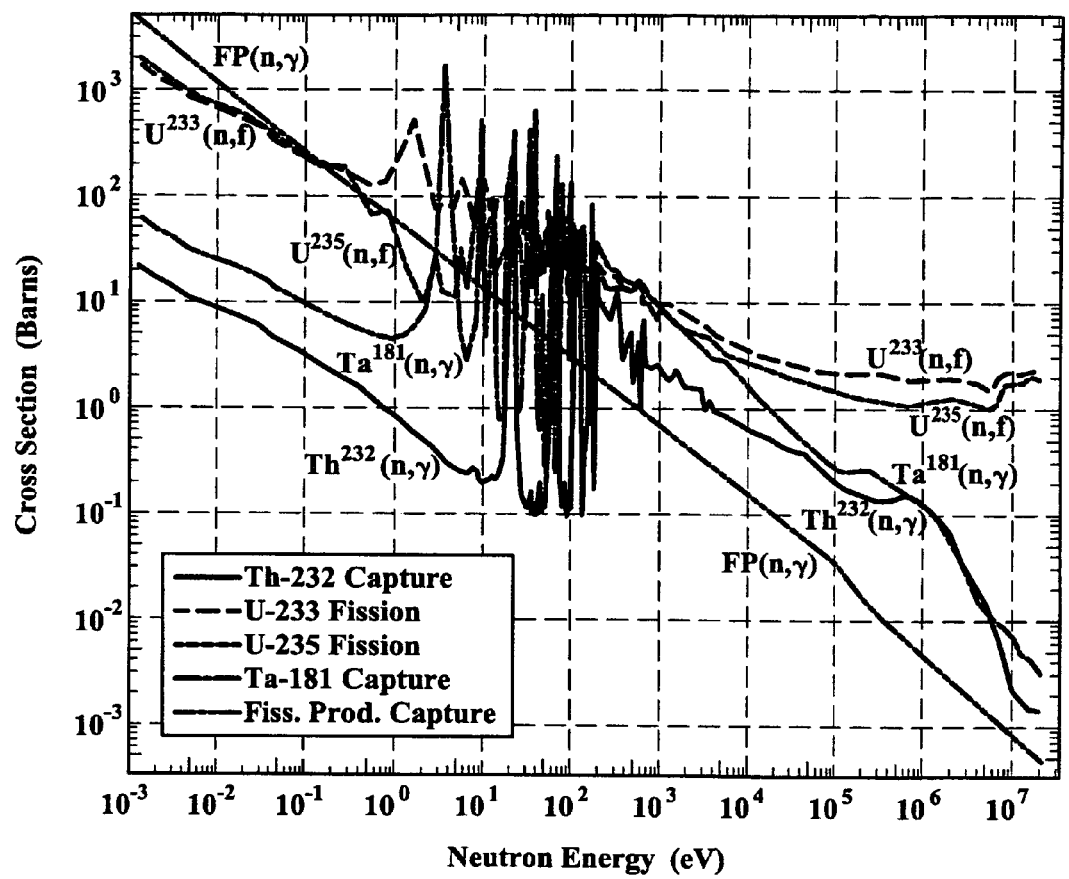
FIG. 2 is a graph showing cross-section versus neutron energy.
Figure 3:
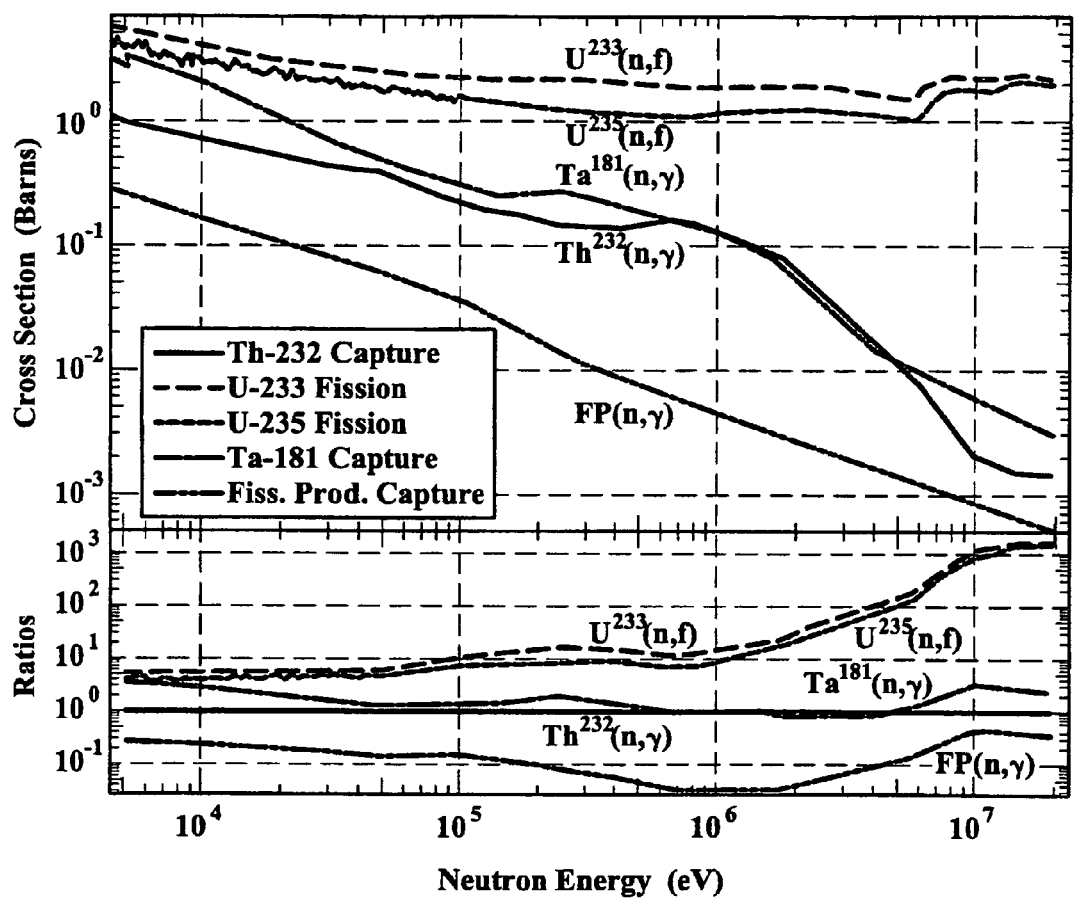
FIG. 3 is a graph showing cross-section versus neutron energy together with ratios of those cross-sections versus neutron energy.

Referring now to FIGS. 2 and 3, generic fuel assembly 30 suitably utilizes a fast neutron spectrum because the high absorption cross-section of fission products for epithermal to thermal neutrons does not permit utilization of more than a small amount of thorium or of the more abundant uranium isotope, $U^{238}$, in uranium-fueled embodiments, because of neutron absorption by fission products.

As best seen in FIG. 2, cross-sections for the dominant neutron-driven nuclear reactions of interest for the $Th^{232}$-fueled embodiments are plotted over the neutron energy range $10^{-3}$-$10^7$ eV. It can be seen that losses to radiative capture on fission product nuclei dominate neutron economies at near-thermal (approximately 0.1 eV) energies, but are comparatively negligible above the resonance capture region (between approximately 3 and 300 eV). Thus, operating with a fast neutron spectrum when attempting to realize a high-gain fertile-to-fissile breeder can help to preclude neutron losses to fission products that build-up within the core during operation. The radiative capture cross-sections for fission products shown are those for intermediate-Z nuclei resulting from fast neutron-induced fission that have undergone subsequent beta-decay to a negligible extent. Those in the central portions of the burn-waves of embodiments of generic fuel assembly 30 will have undergone some decay and thus will have somewhat higher neutron avidity. However, parameter studies have indicated that core fuel-burning results may be insensitive to the precise degree of such decay.

In FIG. 3, cross-sections for the dominant neutron-driven nuclear reactions of primary interest for the $Th^{232}$-fueled embodiments are plotted over the most interesting portion of the neutron energy range, between >$10^4$ and <$10^{6.5}$ eV, in the upper portion of FIG. 3. The neutron spectrum of embodiments of generic fuel assembly 30 peaks in the ≧$10^5$ eV neutron energy region. The lower portion of FIG. 3 contains the ratio of these cross-sections versus neutron energy to the cross-section for neutron radiative capture on $Th^{232}$, the fertile-to-fissile breeding step (as the resulting $Th^{233}$ swiftly beta-decays to $Pa^{233}$, which then relatively slowly beta-decays to $U^{233}$, analogously to the $U^{239}$—$Np^{239}$—$Pu^{23}$% eta decay-chain upon neutron capture by $U^{238}$). Thus, it can be seen that losses to radiative capture on fission products are comparatively minimized for a reactor having a fast spectrum.

Figure 4:
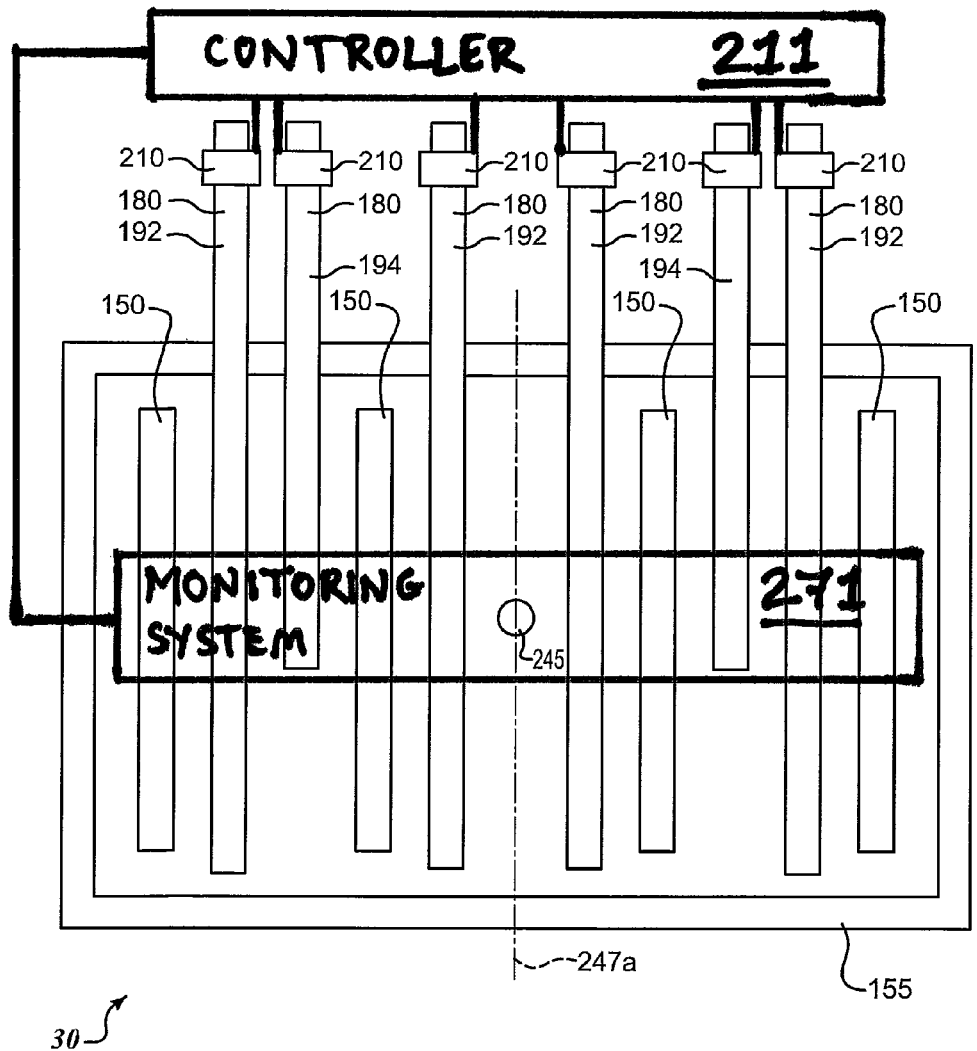
FIG. 4 is a view in partial elevation of a generic representation of a nuclear fission reactor fuel assembly.
Figure 5:
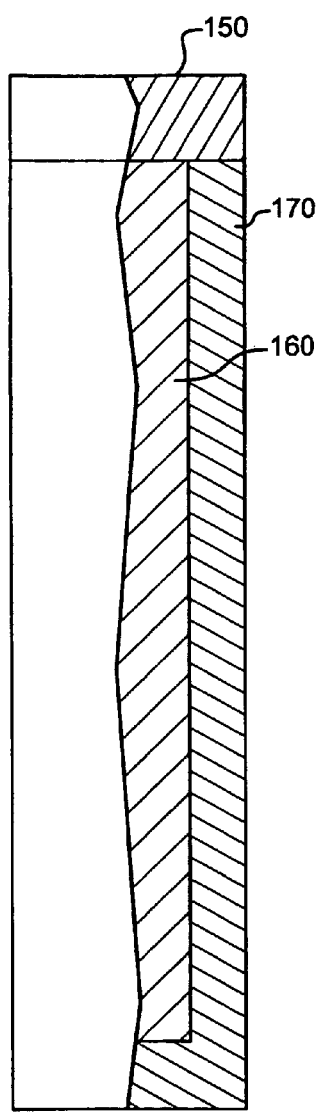
FIG. 5 is a view in partial vertical section of a nuclear fuel rod.

Turning now to FIGS. 4 and 5, generic fuel assembly 30 comprises fissile and/or fertile material, which may take the form of a plurality of elongate nuclear fission reactor fuel rods 150 (only some of which are shown) arranged in a predetermined fuel loading pattern. Exemplary embodiments of generic fuel assembly 30 are disclosed hereinbelow. Fuel rods 150 are sealingly contained within a leak-tight enclosure 155. Each fuel rod 150 has nuclear fuel 160 disposed therein, which nuclear fuel 160 is sealingly surrounded by a fuel rod cladding material 170. An average burnup value for fuel assembly 30 is limited by cladding material 170, which is the most pertinent structural material within fuel assembly 30. Nuclear fuel 160 comprises the afore-mentioned fissile nuclide, such as uranium-235, uranium-233 or plutonium-239. Alternatively, nuclear fuel 160 may comprise a fertile nuclide, such as thorium-232 and/or uranium-238 which will be transmuted during the fission process into the fissile nuclides mentioned immediately hereinabove. A further alternative is that nuclear fuel 160 may comprise a predetermined mixture of fissile and fertile nuclides. By way of example only, and not by way of limitation, nuclear fuel 160 may be made from an oxide selected from the group consisting essentially of uranium monoxide (UO), uranium dioxide ($UO_2$), thorium dioxide ($ThO_2$) (also referred to as thorium oxide), uranium trioxide ($UO_3$), uranium oxide-plutonium oxide (UO—PuO), triuranium octoxide ($U_3O_8$) and mixtures thereof. Alternatively, nuclear fuel 160 may substantially comprise uranium alloyed with other metals, such as, but not limited to, zirconium or thorium metal alloyed or unalloyed. As yet another alternative, nuclear fuel 160 may substantially comprise a carbide of uranium ($UC_x$) or a carbide of thorium ($ThC_x$). For example, nuclear fuel 160 may be made from a carbide selected from the group consisting essentially of uranium monocarbide (UC), uranium dicarbide ($UC_2$), uranium sesquicarbide ($U_2C_3$), thorium dicarbide ($ThC_2$), thorium carbide (ThC) and mixtures thereof. As another non-limiting example, nuclear fuel 160 may be made from a nitride selected from the group consisting essentially of uranium nitride ($U_3N_2$), uranium nitride-zirconium nitride ($U_3N_2Zr_3N_4$), uranium-plutonium nitride ((U—Pu)N), thorium nitride (ThN), uranium-zirconium alloy (UZr) and mixtures thereof. Fuel rod cladding material 170, which sealingly surrounds nuclear fuel 160, may be a suitable zirconium alloy, such as ZIRCOLOY™ (trademark of the Westinghouse Electric Corporation), which has known resistance to corrosion and cracking. Cladding material 170 may be other materials, as well, such as ferritic martensitic steels.

Figure 6:
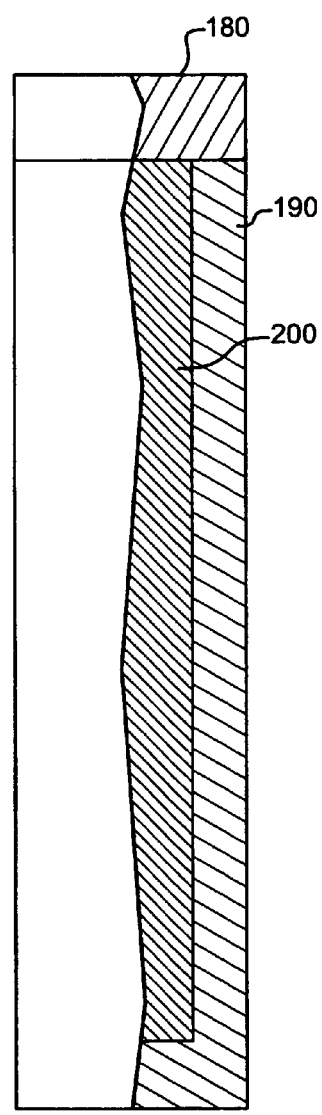
FIG. 6 is a view in partial vertical section of a control rod.

Referring to FIGS. 4 and 6, generic fuel assembly 30 further comprises neutron absorber material, which may take the form of a plurality of elongate neutron absorber or control rods 180 (only some of which are shown) with an associated control rod cladding 190. Control rods 180 are capable of introducing negative reactivity into generic fuel assembly 30. Control rods 180 may be in the form of "part-length" control rods 192 (only some of which are shown) and/or "full-length" control rods 194 (only some of which are shown). Full-length control rods 194 are suitably positioned parallel to fuel rods 150 and extend the entire length of fuel rods 150 when fully inserted into an enclosure 155. Part-length control rods 192 are also suitably positioned parallel to fuel rods 150, but do not extend the entire length of fuel rods 150 when fully inserted into enclosure 155. There may be any number of such part-length and full-length control rods depending on the neutron flux shaping design requirements for fuel assembly 30. A purpose of full-length control rods 192 is to reduce the rate of or stop the fission process occurring within generic fuel assembly 30 such as before decommissioning of reactor arrangement 10. Moreover, control rod and/or fuel rod configurations may deviate from the classic rod assembly type configurations mentioned immediately hereinabove. For example, plate type fuel may be used. Additionally, the fuel rods may be perpendicular (or at any other angle) to the direction of burn.

Still referring to FIGS. 4 and 6, each control rod 180 comprises a suitable neutron absorber material 200 having an acceptably high neutron capture cross-section. In this regard, absorber material 200 may be a metal or metalloid selected from the group consisting essentially of lithium, silver, indium, cadmium, boron, cobalt, hafnium, dysprosium, gadolinium, samarium, erbium, europium and mixtures thereof. Alternatively, absorber material 200 may be a compound or alloy selected from the group consisting essentially of silver-indium-cadmium alloy, boron carbide, zirconium diboride, titanium diboride, hafnium diboride, gadolinium titanate, dysprosium titanate and mixtures thereof. Additionally, fuel rods that have been burned and have a high fission product concentration may be used as part of the control. By way of example only, and not by way of limitation, each of such controls rods 180 is, for example, vertically slidably movable inside respective ones of a plurality of control rod guide tubes (not shown) that were previously fixed within generic fuel assembly 30, such as during fabrication of generic fuel assembly 30. A purpose of part-length control rods 194 is to fine-tune the neutron flux within generic fuel assembly 30, so as to achieve a more precise burn-up of the fuel within generic fuel assembly 30.

Referring again to FIGS. 4 and 6, control rods 180 are selectively operable, such as by means of respective ones of a plurality of drive motors 210 controlled by a controller 211. Each drive motor 210 engages its respective control rod 180 when electrical power is supplied to motor 210 and suitably disengages control rod 180 when electrical power is not supplied to motor 210, such as during a loss of power incident. Thus, if a loss of power incident occurs, motor 210 will disengage control rod 180, so that control rod 180 will vertically slidably drop into generic fuel assembly 30 along an interior of the previously mentioned guide tube due to force of gravity. In this manner, control rods 180 will controllably supply negative reactivity to generic fuel assembly 30. Thus, generic fuel assembly 30, by means of control rods 180, provides a reactivity management capability in the event of a loss of power incident, without reactor operator control or intervention.

Figure 7:
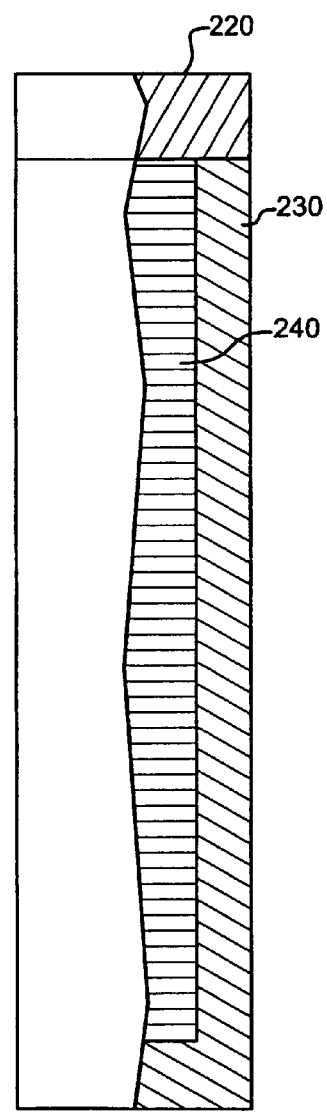
FIG. 7 is a view in partial vertical section of a reflector rod.

Referring to FIG. 7, generic fuel assembly 30 may further comprise a neutron multiplier or reflector, which may take the form of a plurality of elongate neutron reflector rods 220 sealingly housed in a reflector rod cladding 230. Reflector rods 220 cause elastic scattering of neutrons and are thus intended to "reflect" neutrons. Due to such elastic scattering of neutrons, reflector rods 220 are capable of introducing positive reactivity into fuel assembly 30 by decreasing the neutron leakage from generic fuel assembly 30. In this regard, each reflector rod 220 comprises a suitable neutron reflector material 240 having a suitable probability for neutron scattering. In this regard, reflector material 240 may be a material selected from the group consisting essentially of beryllium (Be), lead alloys, tungsten (W), vanadium (V), depleted uranium (U), thorium (Th) and mixtures thereof. Reflector material 240 may also be selected from a wide variety of steel alloys. It should be appreciated that the fissile and fertile materials that are contemplated for use in generic fuel assembly 30 also have high elastic scattering cross sections.

Returning to FIG. 4, generic fuel assembly 30 further comprises a comparatively small and removable nuclear fission igniter 245 that includes moderate isotopic enrichment of nuclear fissionable material, such as, without limitation, $U^{233}$, $U^{235}$ or $Pu^{239}$, suitably centered in enclosure 155 along a vertical axis 247a. Igniter 245 may be disposed at an end of enclosure 155 rather than being centered in enclosure 155, if desired. Neutrons are released by igniter 245. The neutrons that are released by igniter 245 are captured by the fissile and/or fertile material within fuel rods 150 to initiate the previously mentioned fission chain reaction. Igniter 245 may be removed once the chain reaction becomes self-sustaining, if desired.

It will be understood that the teachings herein describe a traveling wave nuclear fission reactor. The basic principles of such a traveling wave nuclear fission reactor is disclosed in more detail in co-pending U.S. patent application Ser. No. 11/605,943 filed Nov. 28, 2006 in the names of Roderick A. Hyde, et al. and titled "Automated Nuclear Power Reactor For Long-Term Operation", which application is assigned to the assignee of the present application, the entire disclosure of which is hereby incorporated by reference.

Figure 8:
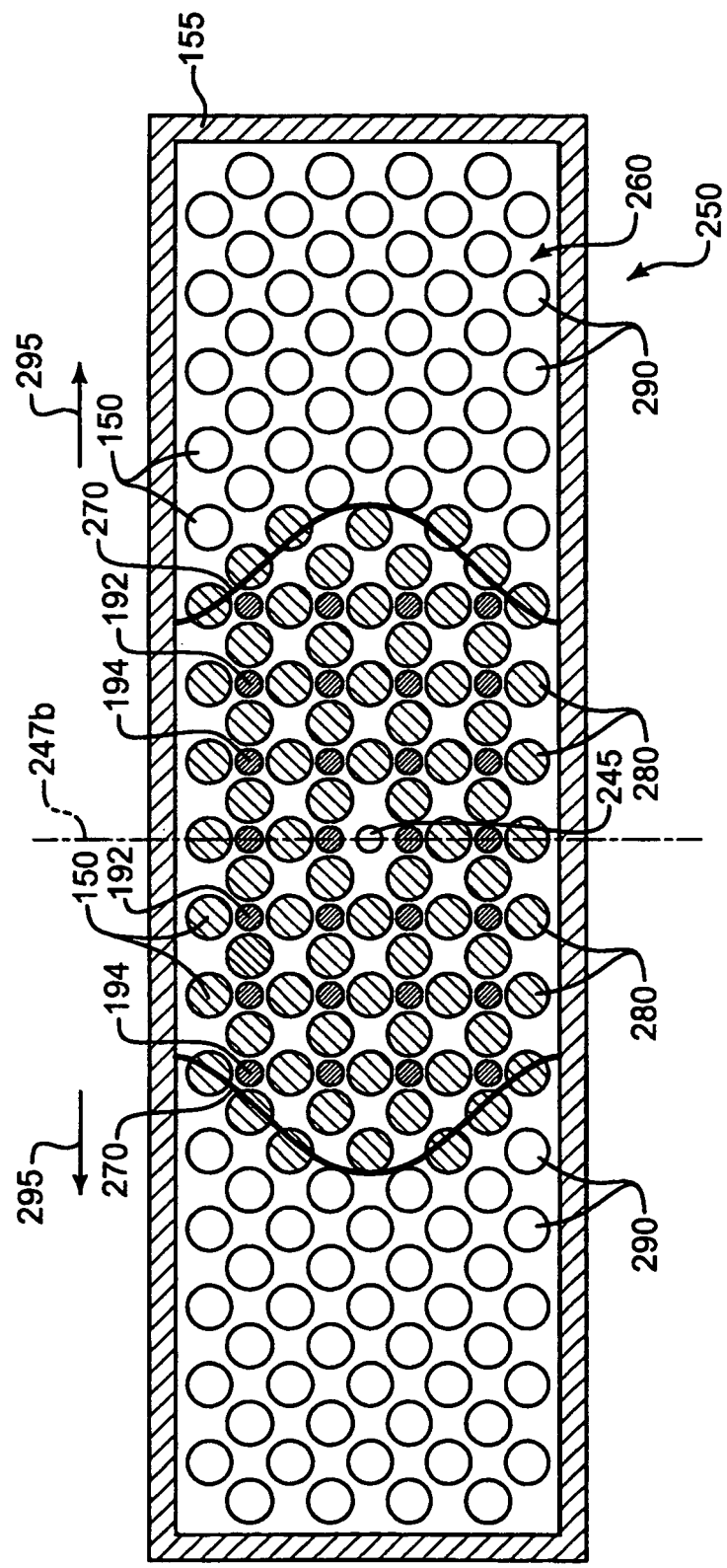
FIG. 8 is a view in horizontal section of a first embodiment fuel assembly, this view showing two oppositely-disposed and symmetrical deflagration burn fronts initiated by an igniter and also showing a first fuel loading pattern.
Figure 9:
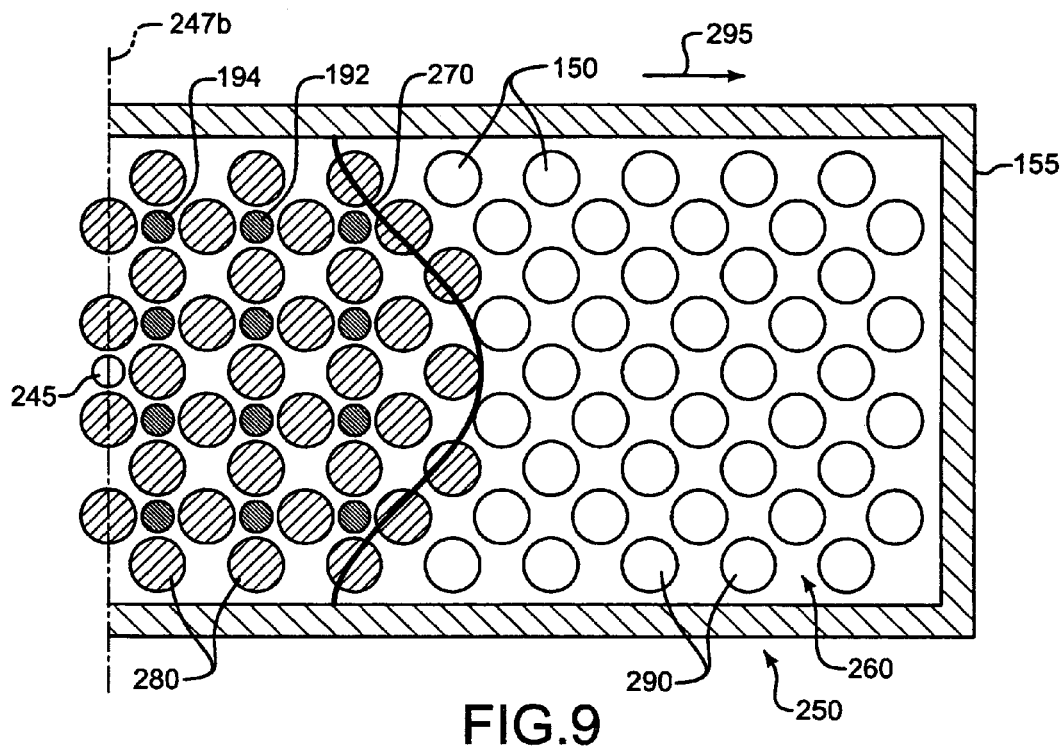
FIG. 9 is a view in horizontal section of one-half of the first embodiment fuel assembly, this view showing one of the oppositely-disposed and symmetrical deflagration burn fronts.

Referring to FIGS. 4, 8 and 9, there is shown a specific exemplary first embodiment nuclear fission reactor fuel assembly, generally referred to as 250. Exemplary first embodiment fuel assembly 250 comprises a first loading pattern, generally referred to as 260, for developing and modulating neutron flux level (i.e., neutron population) in first embodiment fuel assembly 250. First loading pattern 260 is shown at a predetermined instant in time after neutron ignition by igniter 245 (e.g., 7.5 years after ignition). The terminology "modulating" is defined herein to mean modifying or changing neutron flux level as a function of time, space and/or energy. Modulating neutron flux level manages reactivity in first embodiment fuel assembly 250. In this manner, the material composition of a region of the reactor is changed. This results in a change of the level of the effective neutron multiplication factor, $k_{eff}$, which in turn results in a change in flux (modulation). As previously briefly mentioned and as disclosed in more detail presently, first loading pattern 260 generates a deflagration wave or "burnfront" 270 that builds excess reactivity into first embodiment fuel assembly 250. Excess reactivity is developed for several reasons, one reason being that more fuel is bred than is burned. First loading pattern 260 balances this excess reactivity sufficiently behind burnfront 270 (i.e., the space between igniter 245 and burnfront 270) while allowing breeding within and in the vicinity of the front of burnfront 270.

Figure 10:
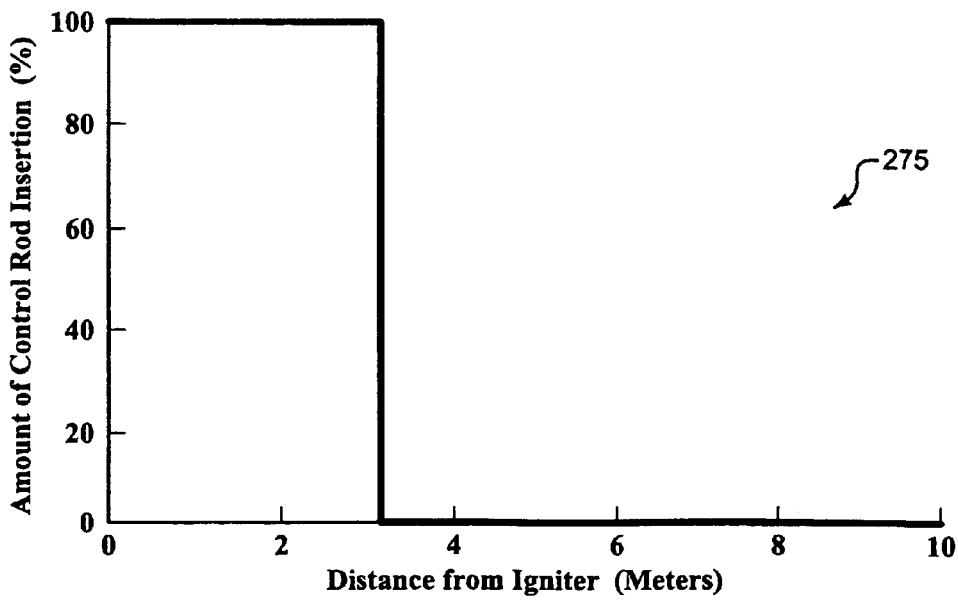
FIG. 10 is a graph showing a first control function comprising percent of control rod insertion versus distance from the igniter, this first control function corresponding to the first fuel loading pattern of the first embodiment fuel assembly.

Referring to FIG. 10, a first control function, generally referred to as 275, corresponding to first loading pattern 260 is shown in graphical form comprising amount of control rod insertion in first embodiment fuel assembly 250 as a function of distance from igniter 245. As seen in FIG. 10, the y-axis is the percentage amount of control rod inserted (the value is 100% behind burnfront 270 and 0% in front of burnfront 270). The x-axis is the distance from igniter 245 shown in units of meters. In the exemplary embodiment illustrated in FIG. 10, the x-axis has a length of approximately four meters. However, this distance may be any suitable distance, such as four meters. This particular example shows a "limit" case. For example, burnfront 270 moves a distance, "x", and a control rod is fully inserted. Burnfront 270 then moves another distance "Δx" and another control rod is inserted. The step-wise control function shown is a "binary" case. In practice, the reactor operator may deviate from the step-wise function. For example, the control rod closest to burnfront 270 may be in half-way or 50%. First control function 275 modulates neutron flux at a level responsive to changes observed by a monitoring system, as described hereinbelow. As may be appreciated, enhanced steady state deflagration wave burnfront 270 propagation is established by means of a step-wise function type distribution of control material sufficiently behind burnfront 270. As an example, should the rate of reaction fall below desired levels at the front of burnfront 270, a control function response could be to remove or relocate absorber at the rear of the burnfront 270 such that the fission rate increases. A neutron flux level is obtained and the control function is readjusted to again maintain the desired condition. By moving the step function absorber closer to the front of burnfront 270 such that a burn region fission rate is reduced the power can also be reduced. In accident scenarios, it is conceivable to deviate from the step function configurations by placing sufficient absorber throughout the burn wave region.

Referring again to FIGS. 8, 9 and 10, first loading pattern 260 comprises control rods 192/194 arranged behind burnfront 270 and centered about a horizontal axis 247b, as shown. First loading pattern 260 further comprises fuel rods arranged into two groups. A first group of fuel rods 280 includes fissile material (referred to herein as a "burning region") and is arranged in a predetermined first group fuel rod pattern behind burnfront 270 and centered about axis 247b, as described hereinbelow. The burning region is primarily fertile material with some percentage of fissile material bred into it. A second group of fuel rods 290 includes fertile fuel material and is arranged in a predetermined second group fuel rod pattern in front of burnfront 270 and centered about axis 247b, as shown. The terminology "in front of burnfront 270" is defined to mean the space between propagating burnfront 270 and an end of enclosure 155. The terminology "behind burnfront 270" is defined to mean the space between igniter 245 and burnfront 270.

Still referring to FIGS. 8, 9 and 10, when igniter 245 releases its neutrons to cause "ignition", and by way of example only and not by way of limitation, two burnfronts 270 travel radially outwardly from igniter 245 toward ends of enclosure 155, so as to form an oppositely propagating wave-pair. As this occurs, burnfront 270 builds excess reactivity into first embodiment fuel assembly 250 as burnfront 270 propagates from igniter 245 and into first group of fuel rods 280, which are essentially depleted of fissile fuel material. This tends to leave some excess reactivity behind burnfront 270. This result is undesirable because excess reactivity causes increased neutron fluence seen by fuel assembly structural materials in a region behind burnfront 270 where significant burnup has already occurred.

Referring again to FIGS. 8, 9 and 10, it should be understood that neutron flux generated by first group of fuel rods 280 behind burnfront 270 breeds fissile fuel material in second group of fuel rods 290 in front of burnfront 270 by transmuting the fertile fuel material in second group of fuel rods 290 into fissile fuel material at the burnfront's leading-edge. Transmuting the fertile fuel material in second group of fuel rods 290 into fissile fuel material at the burnfront's leading-edge advances burnfront 270 in the direction of arrows 295. As burnfront 270 sweeps over a given mass of fuel, fissile isotopes are continually generated as long as neutrons are present to undergo radiative capture in fertile nuclei. The rate at which fissile isotopes are generated may, for a given time and location within the reactor, exceed that of consumption of the fissile isotopes due to parasitic capture and fission. Additionally, capture of neutrons in fertile material leads to intermediate isotopes which decay with a given half-life to fissile material. Because the wave has a propagation velocity, some amount of decay of intermediate isotopes, therefore, occurs behind burnfront 270. A combination of these effects results in additional reactivity remaining and being generated behind burnfront 270.

Thus, as shown in FIGS. 8, 9 and 10, burnfront 270 can be modulated to enable a variable nuclear fission fuel burnup. In this type of control configuration, the propagation rate is enhanced by maintaining absorbers as far behind burnfront 270 as allowable to maintain power at a constant level. Biasing of the absorber material behind burnfront 270 counteracts the build-up of excess reactivity within burnfront 270 without reducing the amount of neutrons available for breeding in and in front of burnfront 270. Thus, in order to propagate burnfront 270 in first embodiment fuel assembly 250, burnfront 270 is initiated by igniter 245, as described above and then allowed to propagate. In one embodiment, the actively controllable control rods 192/194 insert neutron absorbers, such as without limitation, Li6, B10, or Gd, into first group of fuel rods 280 behind burnfront 270. Such an insertion of neutron absorbers drives down or lowers neutronic reactivity of first group of fuel rods 280 that is presently being burned by burnfront 270 relative to neutronic reactivity of second group of fuel rods 290 ahead of burnfront 270, giving the wave a propagation direction indicated by arrow 295. Controlling reactivity in this manner increases the propagation rate of burnfront 270 and therefore provides a means to control burnup above a minimum value needed for propagation and a greater value set by, in part, structural limitations discussed above.

Figure 11:
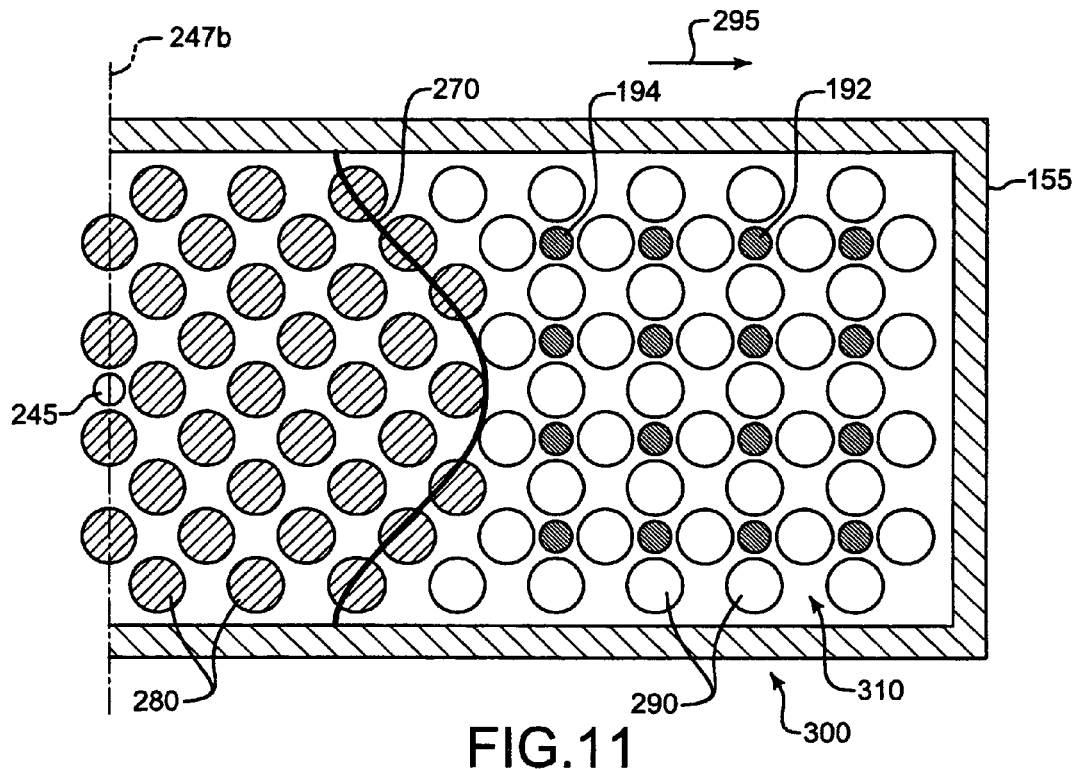
FIG. 11 is a view in horizontal section of one-half of a second embodiment fuel assembly, this view showing one of the oppositely-disposed and symmetrical deflagration burn fronts and also showing a second fuel loading pattern.

Referring to FIG. 11 there is shown an exemplary second embodiment nuclear fission reactor fuel assembly, generally referred to as 300. Exemplary second embodiment fuel assembly 300 comprises a second loading pattern, generally referred to as 310, for modulating neutron flux level in second embodiment fuel assembly 300. Second loading pattern 310 is shown at a predetermined instant in time after neutron ignition by igniter 245 (e.g., 7.5 years after ignition). Modulating neutron flux level manages reactivity in second embodiment fuel assembly 300. As disclosed in more detail presently, second loading pattern 310 generates deflagration wave or "burnfront" 270 that builds excess reactivity into second embodiment fuel assembly 300. Second loading pattern 310 balances this excess reactivity sufficiently in front of burnfront 270 while reducing neutron fluence seen by fuel assembly. Control rods 192/194 insert neutron absorbers into second group of fuel rods 290 in front of the burnfront 270, thereby slowing down the propagation of burnfront 270. In this case, fuel to the left of burnfront 270 is allowed to produce power as the burnfront propagates. One can see that such a control method could lead to the ignition of the entire fuel assembly 300.

Figure 12:
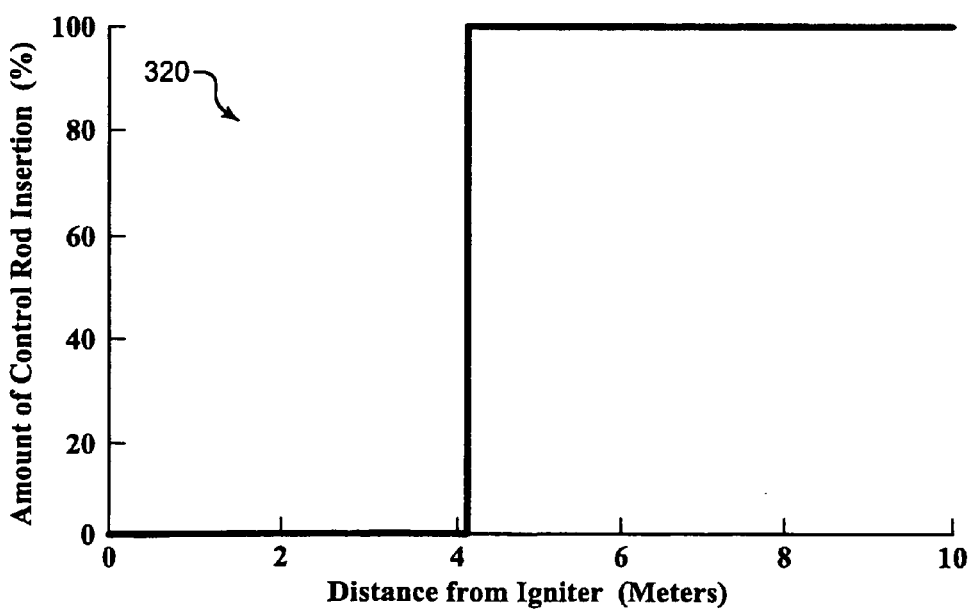
FIG. 12 is a graph showing a second control function comprising percent of control insertion versus distance from the igniter, this second control function corresponding to the second fuel loading pattern of the second embodiment fuel assembly.

Referring to FIG. 12, a second control function, generally referred to as 320, corresponding to second loading pattern 310 is shown in graphical form comprising amount of control rod insertion in second embodiment fuel assembly 300 as a function of distance from igniter 245. Second control function 320 modulates neutron flux at a level responsive to changes observed by a monitoring system, as described hereinbelow. Hence, increased steady state deflagration wave burnfront 270 propagation in this embodiment is established by means of a step-wise function type distribution, as shown and is in part dependant on the rate of removal of control rods 192/194.

Figure 13:
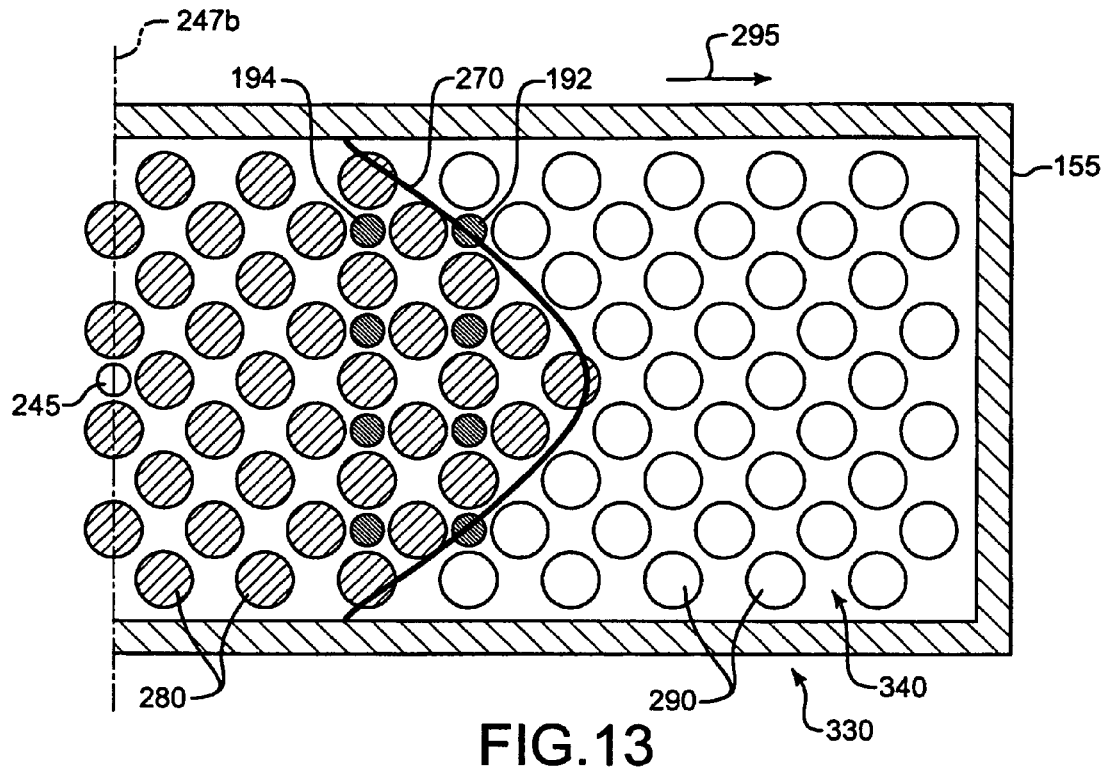
FIG. 13 is a view in horizontal section of one-half of a third embodiment fuel assembly, this view showing one of the oppositely-disposed and symmetrical deflagration burn fronts and also showing a third fuel loading pattern.

Referring to FIG. 13 there is shown an exemplary third embodiment nuclear fission reactor fuel assembly, generally referred to as 330. Exemplary third embodiment fuel assembly 330 comprises a third loading pattern, generally referred to as 340, for modulating neutron flux level in third embodiment fuel assembly 330. Third loading pattern 340 is shown at a predetermined instant in time after neutron ignition by igniter 245 (e.g., 7.5 years after ignition). Modulating neutron flux level manages reactivity in third embodiment fuel assembly 330. As disclosed in more detail presently, third loading pattern 340 generates deflagration wave burnfront 270 that builds excess reactivity into third embodiment fuel assembly 330. Third loading pattern 340 balances this excess reactivity sufficiently near burnfront 270 (i.e., the space within or adjacent to burnfront 270) via control rods 192/194 which insert neutron absorbers into first group of fuel rods 280 within or to the side of burnfront 270. By allowing build-up and/or utilization of excess reactivity at or near the perimeter of the burnfront, the effective size and velocity of burnfront 270 may be modified.

Figure 14:
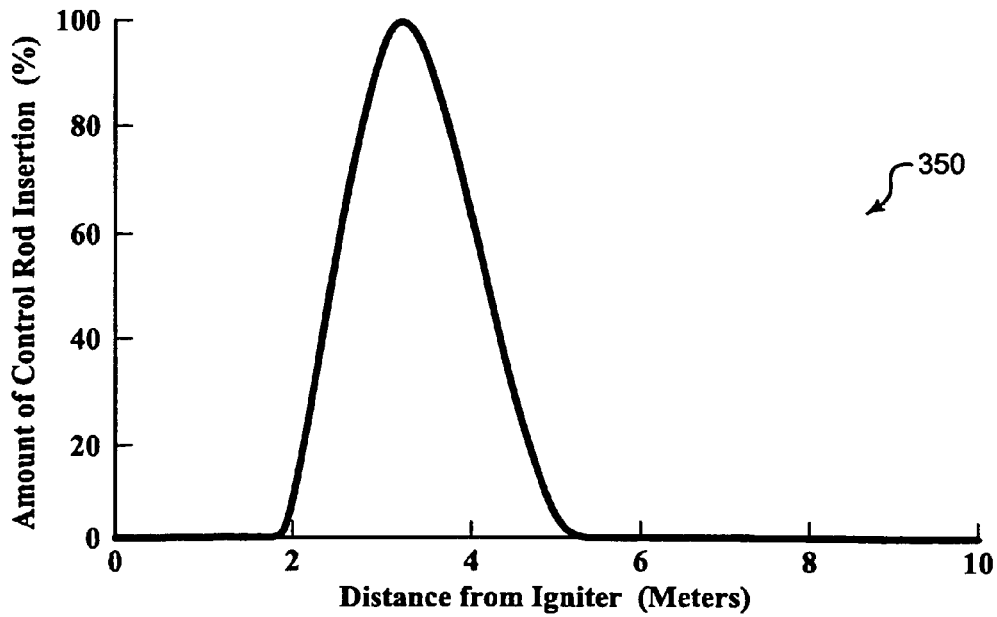
FIG. 14 is a graph showing a third control function comprising percent of control rod insertion versus distance from the igniter, this third control function corresponding to the third fuel loading pattern of the third embodiment fuel assembly.

Referring to FIG. 14, a third control function, generally referred to as 350, corresponding to third loading pattern 340 is shown in graphical form comprising amount of control rod insertion in third embodiment fuel assembly 300 as a function of distance from igniter 245. Third control function 350 modulates neutron flux at a level responsive to changes observed by a monitoring system, as described hereinbelow. Steady state deflagration wave burnfront 270 propagation is established by means of a continuous function type distribution, as shown.

Figure 15:
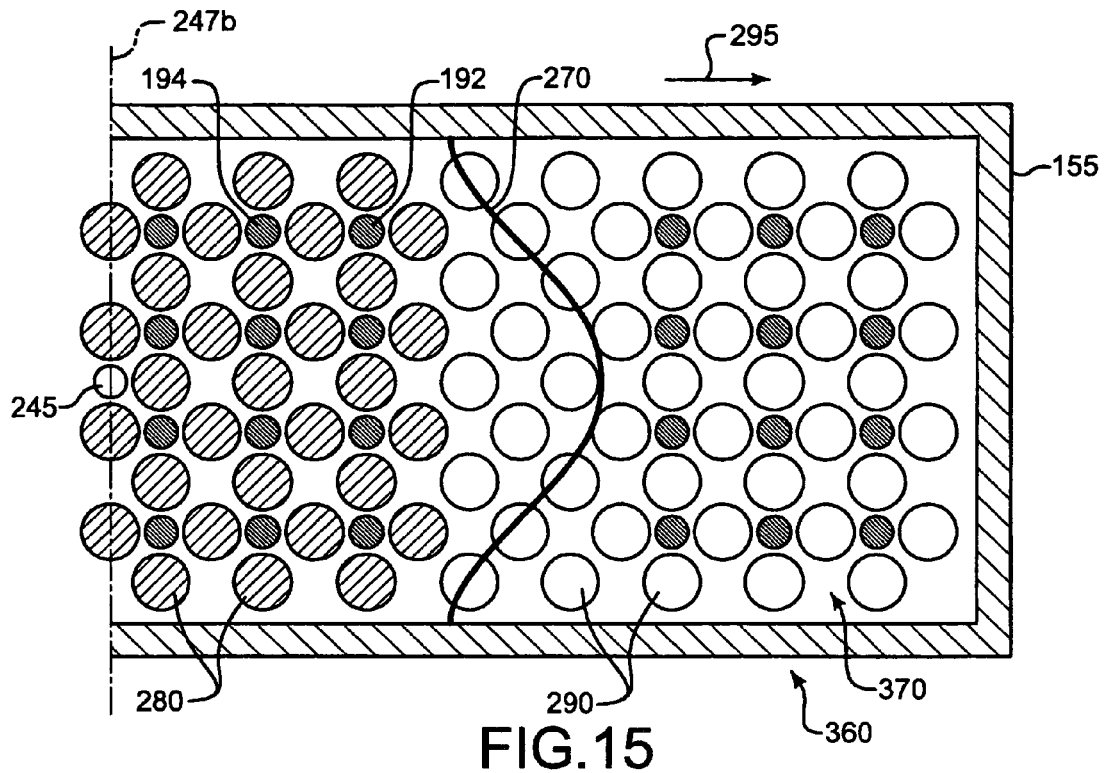
FIG. 15 is a view in horizontal section of one-half of a fourth embodiment fuel assembly, this view showing one of the oppositely-disposed and symmetrical deflagration burn fronts and also showing a fourth fuel loading pattern.

Referring to FIG. 15, there is shown an exemplary fourth embodiment nuclear fission reactor fuel assembly, generally referred to as 360. Exemplary fourth embodiment fuel assembly 360 comprises a fourth loading pattern, generally referred to as 370, for modulating neutron flux level in fourth embodiment fuel assembly 360. Fourth loading pattern 370 is shown at a predetermined instant in time after neutron ignition by igniter 245 (e.g., 7.5 years after ignition). Modulating neutron flux level manages reactivity in fourth embodiment fuel assembly 360. As disclosed in more detail presently, fourth loading pattern 370 generates deflagration wave burnfront 270 that builds excess reactivity into fourth embodiment fuel assembly 360. Fourth loading pattern 370 balances this excess reactivity sufficiently behind and in front of burnfront 370 through use of control rods 192/194. Loading pattern 370 thereby gives an additional means to control wave size, propagation characteristics, and therefore burn-up and fluence. Alternatively, burnfront 270 may be stimulated "out front" by control rods 192/194 having fissile material therein.

Figure 16:
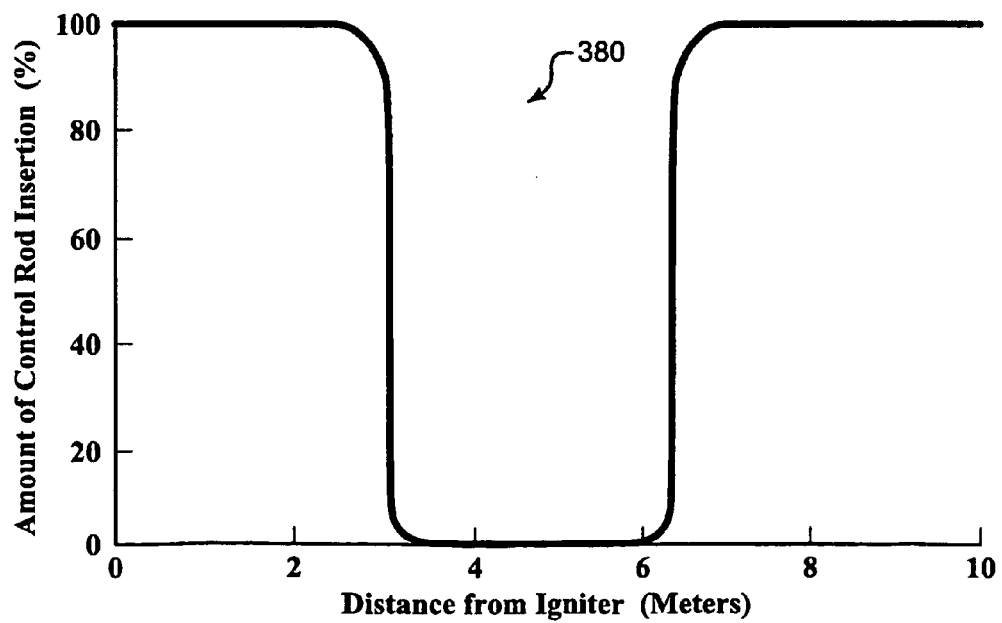
FIG. 16 is a graph showing a fourth control function comprising percent of control rod insertion versus distance from the igniter, this fourth control function corresponding to the fourth fuel loading pattern of the fourth embodiment fuel assembly.

Referring to FIG. 16, a fourth control function, generally referred to as 380, corresponding to fourth loading pattern 370 is shown in graphical form comprising amount of control rod insertion in fourth embodiment fuel assembly 360 as a function of distance from igniter 245. Fourth control function 380 modulates neutron flux at a level responsive to changes observed by a monitoring system, as described hereinbelow. Steady state deflagration wave burnfront 270 propagation is established by means of a function type distribution, as shown.

Figure 17:
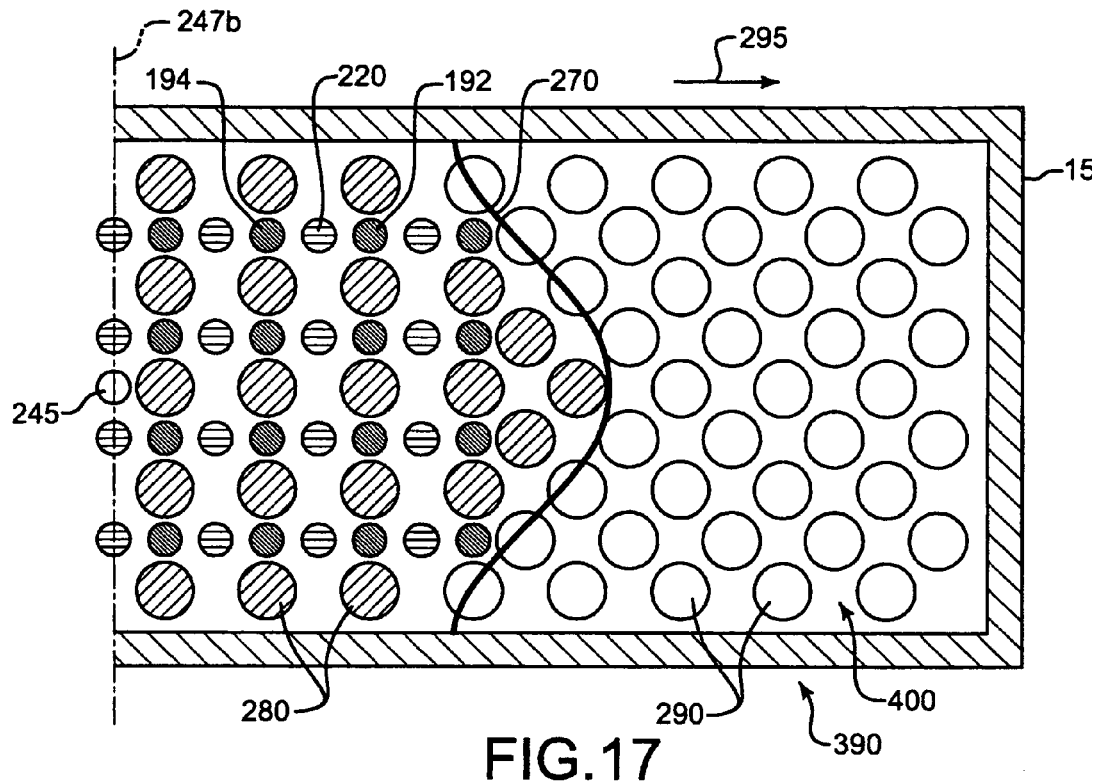
FIG. 17 is a view in horizontal section of one-half of a fifth embodiment fuel assembly, this view showing one of the oppositely-disposed and symmetrical deflagration burn fronts and also showing a fifth fuel loading pattern.

Referring to FIG. 17, there is shown an exemplary fifth embodiment nuclear fission reactor fuel assembly, generally referred to as 390. Exemplary fifth embodiment fuel assembly 390 comprises a fifth loading pattern, generally referred to as 400, for modulating neutron flux level in fifth embodiment fuel assembly 390. Fifth loading pattern 400 includes reflector rods 220 in addition to fuel rods 150 and control rods 192/194. As can be seen, by way of a non-limiting example, there is a repeating pattern of a row of absorber with a row of reflector behind the row of absorber. Alternatively, the row of reflector may be located in front of the row of absorber. The reflector returns a portion of the leakage neutrons back towards the absorbing row (and burnfront 270) resulting in a need for less absorber and more neutrons in the burn/breed region. Fifth loading pattern 400 is shown at a predetermined instant in time after neutron ignition by igniter 245 (e.g., 7.5 years after ignition). Modulating neutron flux level manages reactivity in fifth embodiment fuel assembly 390. As disclosed in more detail presently, fifth loading pattern 400 generates deflagration wave burnfront 270 that builds excess reactivity into fifth embodiment fuel assembly 390. Fifth loading pattern 400 balances this excess reactivity sufficiently behind burnfront 370 while reducing neutron fluence seen by fuel assembly materials behind the burnfront as a result of relatively high burnup. Control rods 192/194 and reflector rods 220 modulate neutron flux in the first group of fuel rods 280 behind burnfront 270, thereby changing the effective size and propagation characteristics of the burnfront 270.

Figure 18:
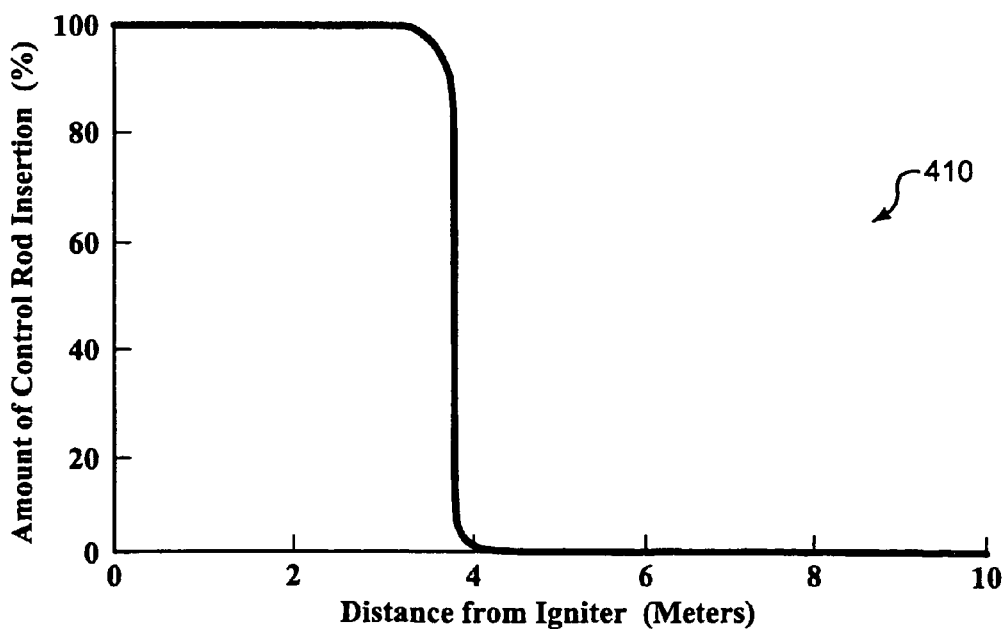
FIG. 18 is a graph showing a fifth control function comprising percent of control rod insertion versus distance from the igniter, this fifth control function corresponding to the fifth fuel loading pattern of the fifth embodiment fuel assembly.

Referring to FIG. 18, a fifth control function, generally referred to as 410, corresponding to fifth loading pattern 400 is shown in graphical form comprising amount of control rod insertion in fifth embodiment fuel assembly 390 as a function of distance from igniter 245. Fifth control function 410 modulates neutron flux at a level responsive to changes observed by a monitoring system, as described hereinbelow. Steady state deflagration wave burnfront 270 propagation is established by means of a step function type distribution, as shown. As with the embodiment shown in FIGS. 10 and 11, and as described above, this type of distribution leads to an enhanced burnfront propagation rate allowing for a reduced burn-up to be achieved.

Figure 19:
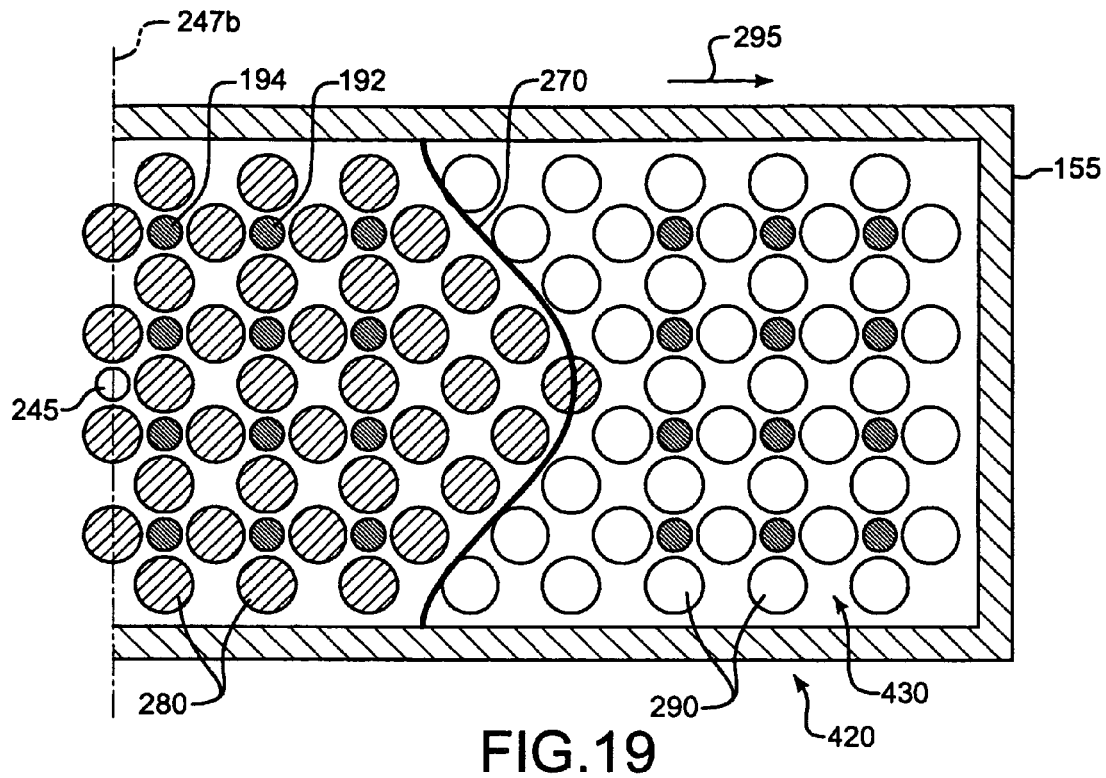
FIG. 19 is a view in horizontal section of one-half of a sixth embodiment fuel assembly, this view showing one of the oppositely-disposed and symmetrical deflagration burn fronts and also showing a sixth fuel loading pattern.

Referring to FIG. 19, there is shown an exemplary sixth embodiment nuclear fission reactor fuel assembly, generally referred to as 420. Exemplary sixth embodiment fuel assembly 420 comprises a sixth loading pattern, generally referred to as 430, for modulating neutron flux level in sixth embodiment fuel assembly 420. Sixth loading pattern 430 is obtained at a predetermined instant in time after neutron ignition by igniter 245 (e.g., 7.5 years after ignition). Modulating neutron flux level manages reactivity in sixth embodiment fuel assembly 420. As disclosed in more detail presently, sixth loading pattern 430 generates deflagration wave burnfront 270 that builds excess reactivity into sixth embodiment fuel assembly 420. Sixth loading pattern 430 balances this excess reactivity sufficiently behind burnfront 270 and in front of burnfront 270 while reducing neutron fluence seen by fuel assembly materials as a result of relatively high burnup. Control rods 192/194 insert neutron absorbers into first group of fuel rods 280 behind and in front of burnfront 270, thereby changing the effective size of the burnfront 270. It may be appreciated that there may be other materials present besides absorber material.

Figure 20:
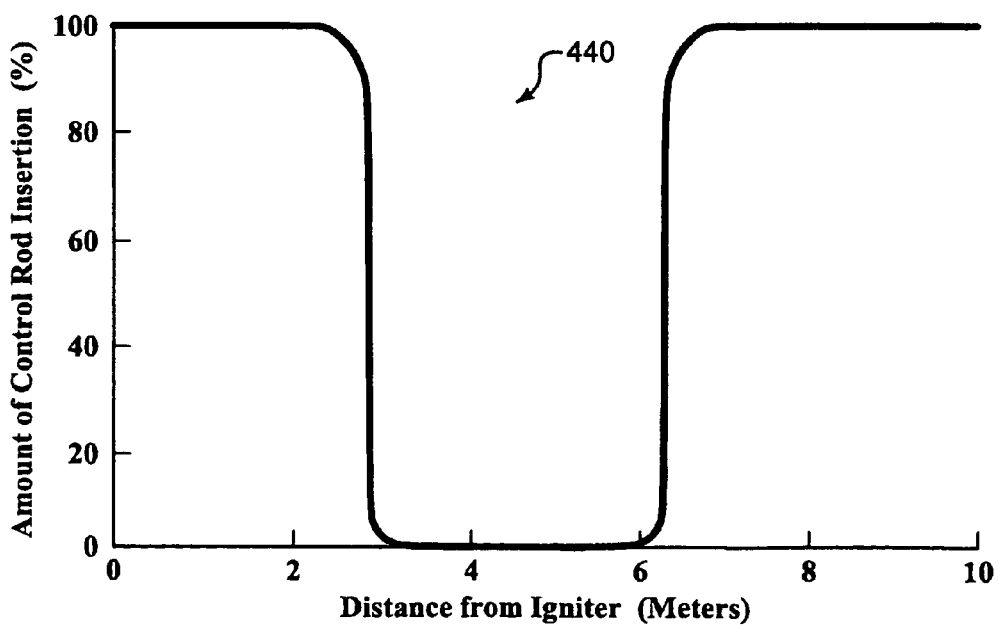
FIG. 20 is a graph showing a sixth control function comprising percent of control rod insertion versus distance from the igniter, this sixth control function corresponding to the sixth fuel loading pattern of the sixth embodiment fuel assembly.

Referring to FIG. 20, a sixth control function, generally referred to as 440, corresponding to sixth loading pattern 430 is shown in graphical form comprising amount of control rod insertion in sixth embodiment fuel assembly 420 as a function of distance from igniter 245. Sixth control function 440 modulates neutron flux at a level responsive to changes observed by a monitoring system, as described hereinbelow. Increased steady state deflagration wave burnfront 270 propagation is established by means of a continuous function type distribution, as shown.

Figure 21:
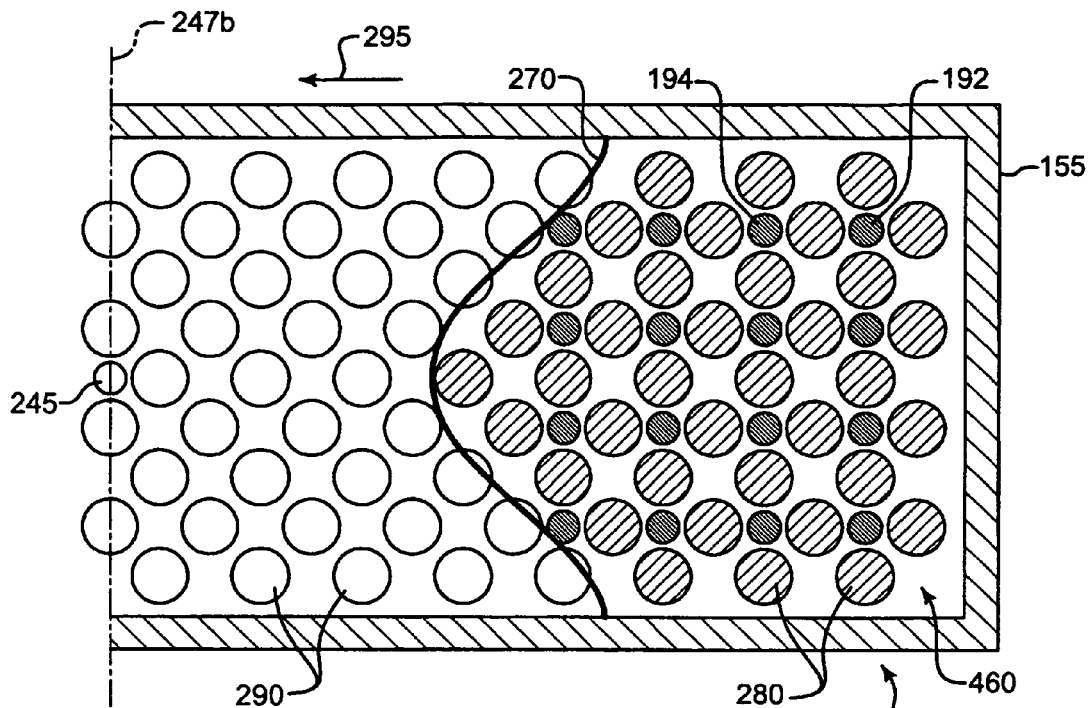
FIG. 21 is a view in horizontal section of one-half of a seventh embodiment fuel assembly, this view showing one of the oppositely-disposed and symmetrical deflagration burn fronts and also showing a seventh fuel loading pattern.

Referring to FIG. 21, there is shown an exemplary seventh embodiment nuclear fission reactor fuel assembly, generally referred to as 450. Exemplary seventh embodiment fuel assembly 450 comprises a seventh loading pattern, generally referred to as 460, for modulating neutron flux level in seventh embodiment fuel assembly 450. Seventh loading pattern 460 is shown at a predetermined instant in time after neutron ignition by igniter 245 (e.g., 7.5 years after ignition). It should be noted that fuel rods 290 may have already been burnt. Modulating neutron flux level manages reactivity in seventh embodiment fuel assembly 450. As disclosed in more detail presently, seventh loading pattern 460 generates deflagration wave burnfront 270 that builds excess reactivity into seventh embodiment fuel assembly 450. Seventh loading pattern 460 balances this excess reactivity sufficiently behind burnfront 370 while reducing neutron fluence seen by fuel assembly materials as a result of relatively high burnup. Placing the control step function appropriately in front of burnfront 270 while adjusting the control reaction at the rear of burnfront 270 may be performed to reverse the direction of burnfront 270 propagation resulting in wave propagation through previously burned rods 290. Control rods 192/194 insert neutron absorbers into first group of fuel rods 280 that are now arranged behind burnfront 270, thereby changing the effective size of the burnfront 270.

Figure 22:
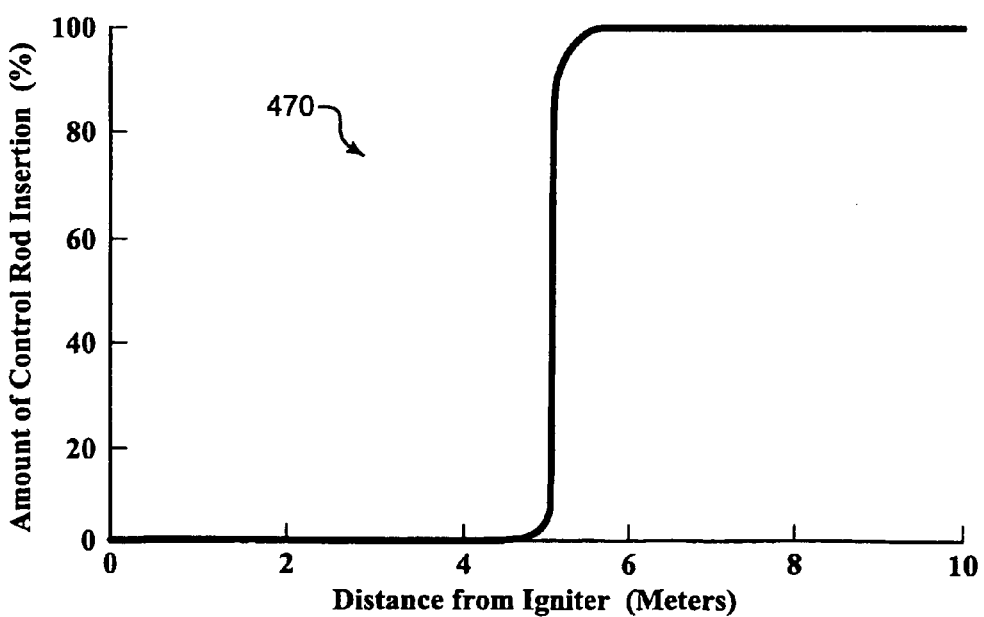
FIG. 22 is a graph showing a seventh control function comprising percent of control rod insertion versus distance from the igniter, this seventh control function corresponding to the seventh fuel loading pattern of the seventh embodiment fuel assembly.

Referring to FIG. 22, a seventh control function, generally referred to as 470, corresponding to seventh loading pattern 460 is shown in graphical form comprising amount of control rod insertion in seventh embodiment fuel assembly 450 as a function of distance from igniter 245. Seventh control function 470 modulates neutron flux at a level responsive to changes observed by a monitoring system, as described hereinbelow. Increased steady state deflagration wave burnfront 270 propagation is established by means of a step function type distribution, as shown.

It may be understood from the teachings hereinabove, that burnfront 270 can be directed as desired according to selected propagation parameters monitored by a monitoring system 271 (FIG. 4). For example, propagation parameters can include a propagation direction or orientation of burnfront 270, a propagation rate of burnfront 270, power demand parameters such heat generation density, cross-sectional dimensions of a burning region through which burnfront 270 is to the propagate (such as an axial or lateral dimension of the burning region relative to an axis of propagation of the burnfront 270), or the like. As another example, the propagation parameters may be selected so as to control the spatial or temporal location, profile and distribution of the burnfront 270, in order to avoid possible failed or malfunctioning control elements (e.g., neutron modifying structures or thermostats), failed or malfunctioning fuel rods, or the like. Failed or malfunctioning fuel rods may be due to swelling or cladding hot spots caused by coolant channel flow blockage. As another example, any ruptured broken fuel rod may be detected by means of feedback provided by detecting tracer isotopes placed within the fuel rods during manufacturing. As a further example, the propagation parameters may be selected based on monitoring or sensing actinides by means of a gas monitor or by sensing of gamma radiation by means of a gamma radiation detector or "Geiger Counter". As another example, the propagation parameters may be selected based on monitoring data from "coupons" responsive to neutron flux. As yet another example, the propagation parameters may be selected based on measurements of local temperature via thermocouples and flux via neutron detectors.

Figure 23:
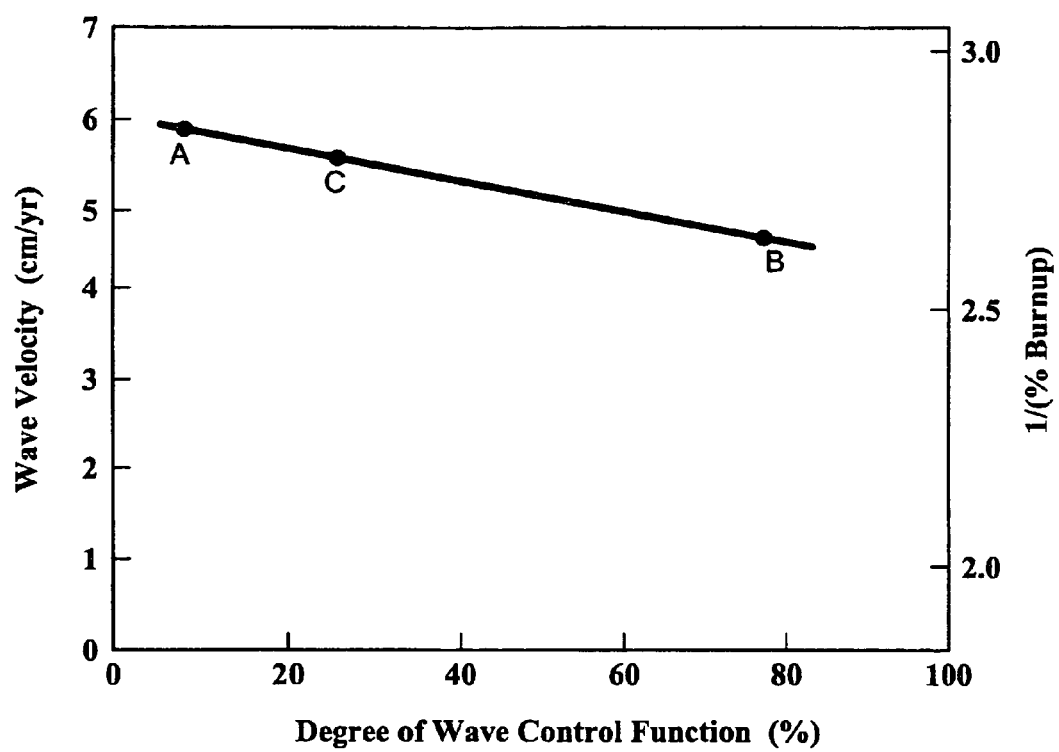
FIG. 23 is a graph illustrating a linear relationship between deflagration burnfront velocity and inverse burnup percent versus degree of wave control function.

Referring to FIG. 23, a graph illustrates a linear relationship between deflagration wave burnfront velocity and burnup percent versus degree of wave control function. As determined through neutronic simulation, position "A" on the graph corresponds to a step function type of control of burnfront 270 while position "B" on the graph corresponds to distributed type control rod arrangement of burnfront 270. Position "A" corresponds to a configuration similar to that illustrated in FIGS. 9 and 10, while Position "B" corresponds to a configuration similar to that shown in FIGS. 13 and 14. Position "C" on the graph corresponds to a control configuration where absorber is distributed between that of a step function as shown in FIGS. 9 and 10 and that of the continuous function shown in FIGS. 13 and 14; i.e., the absorber is distributed more behind the burnfront than in the distributed case, but not as much as in the step function case. FIG. 23 relates to neutronic results obtained using the MCNPX-CINDER computer software code. In this regard, FIG. 23 shows that if absorber is used, placing the absorber into the reactor as a step function behind the wave gives the fastest wave velocity and the lowest burn-up. Deviation from this configuration (distribute absorber throughout the wave) slows the wave and finally, if absorber is put in front of the wave, the wave's velocity should cease.

Figure 23A:
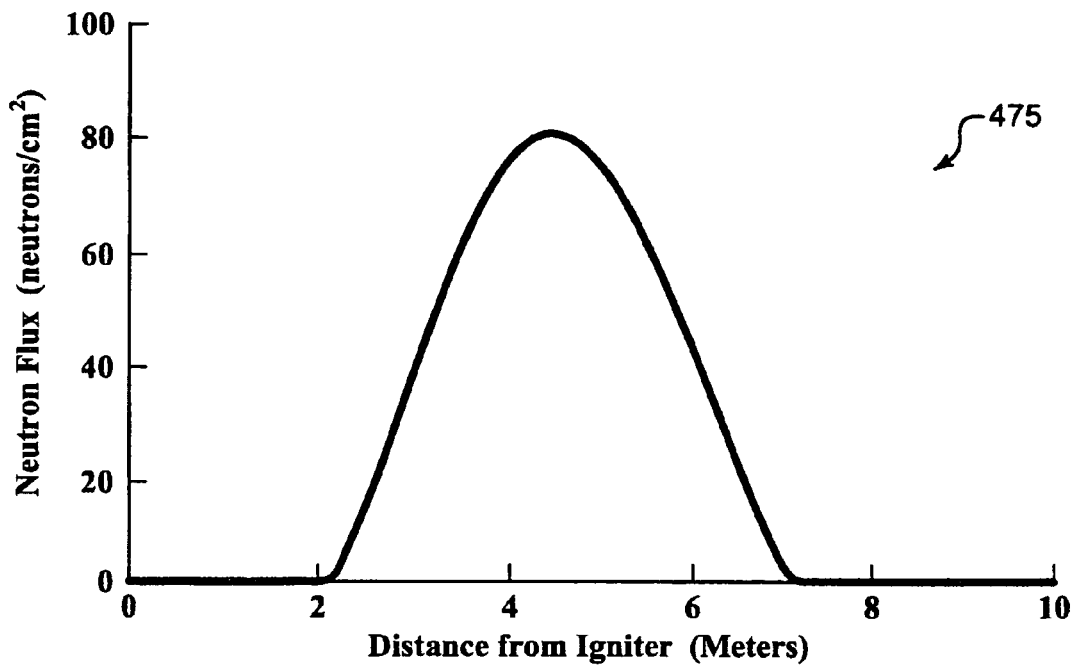
FIG. 23A is a graph showing an exemplary spatial distribution of neutron flux comprising neutron flux versus distance from the igniter, the spatial distribution being representative of the burnfront according to an exemplary control function.

Referring to FIG. 23A, there is shown a graph illustrating an exemplary spatial distribution of neutron flux, generally referred to as 475. In this regard, the graph plots spatial distribution 475 as neutron flux versus distance from igniter 245. Spatial distribution 475 is representative of the burnfront according to an exemplary control function.

Figure 23B:
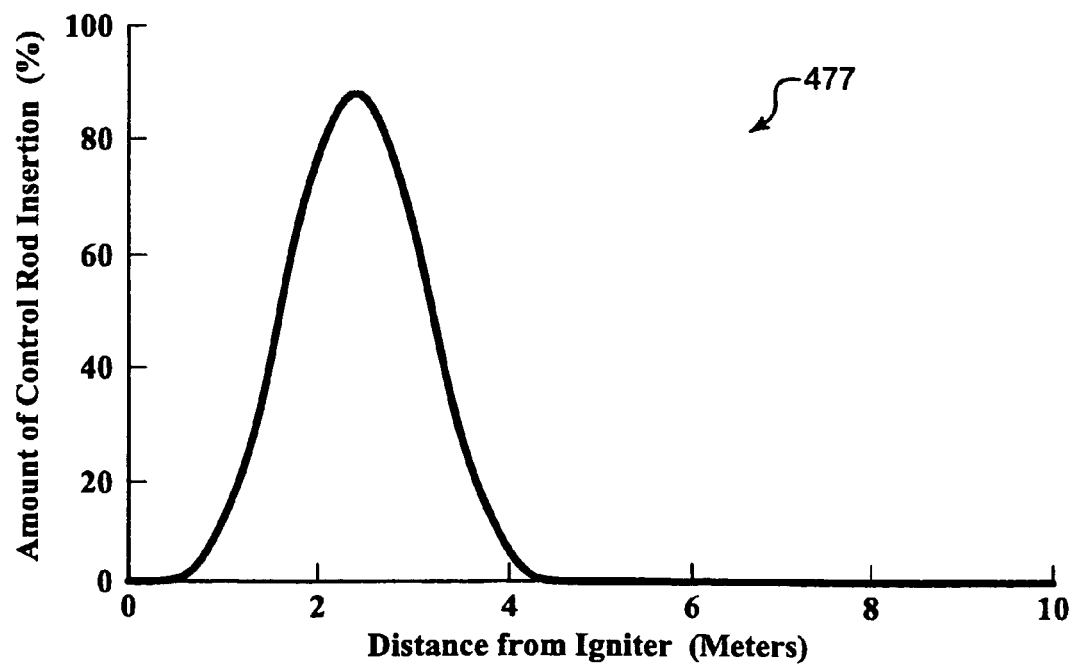
FIG. 23B is a graph showing a control function corresponding to the spatial distribution shown in FIG. 23A, this graph comprising percent of control rod insertion versus distance from the igniter.

Referring to FIG. 23B, there is shown a graph illustrating a spatial profile or control function, generally referred to as 477. Control function 477 corresponds to spatial distribution 475 shown in FIG. 23A. FIG. 23B plots percent of control rod insertion versus distance from igniter 245.

Figure 23C:
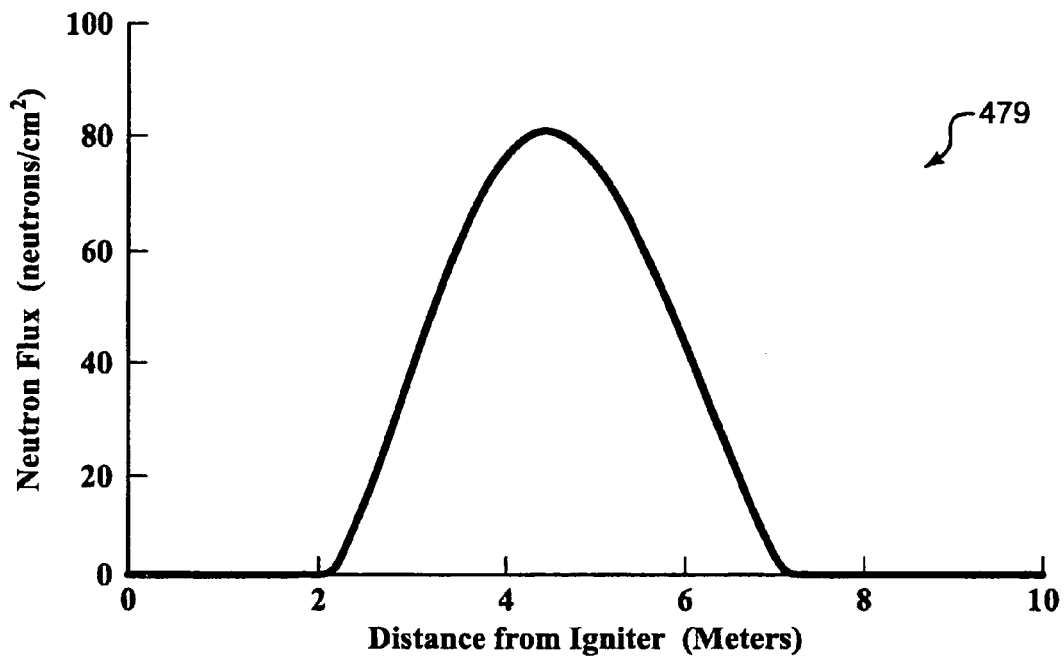
FIG. 23C is a graph showing an exemplary spatial distribution of neutron flux comprising neutron flux versus distance from the igniter, the spatial distribution being representative of the burnfront according to an exemplary control function.

Referring to FIG. 23C, there is shown a graph illustrating an exemplary spatial distribution of neutron flux, generally referred to as 479. In this regard, the graph plots spatial distribution 479 as neutron flux versus distance from igniter 245. Spatial distribution 479 is representative of the burnfront according to an exemplary control function.

Figure 23D:
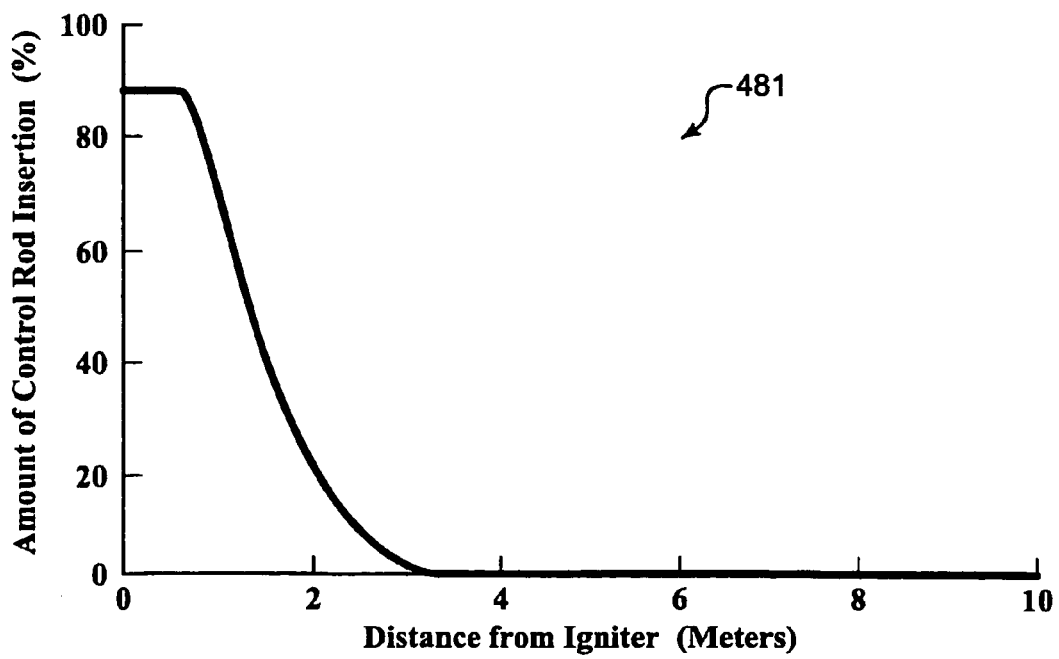
FIG. 23D is a graph showing a control function corresponding to the spatial distribution shown in FIG. 23C, this graph comprising percent of control rod insertion versus distance from the igniter.

Referring to FIG. 23D, there is shown a graph illustrating a spatial profile or control function, generally referred to as 481. Control function 481 corresponds to spatial distribution 479 shown in FIG. 23C. This graph plots percent of control rod insertion versus distance from igniter 245.

Figure 23E:
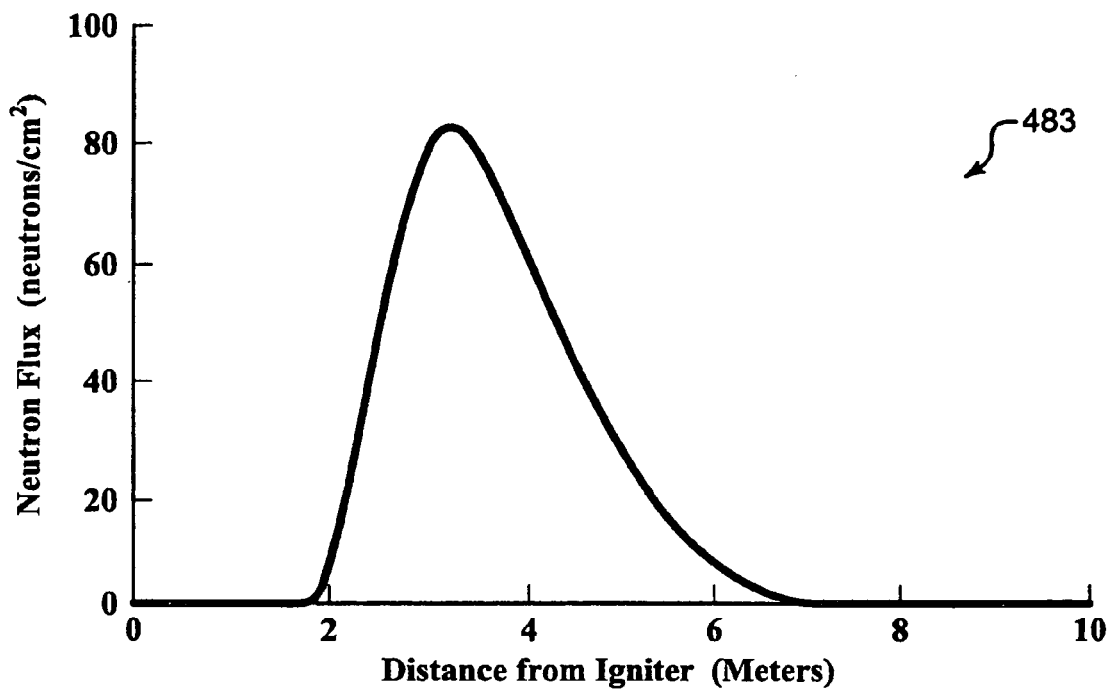
FIG. 23E is a graph showing an exemplary spatial distribution of neutron flux comprising neutron flux versus distance from the igniter, the spatial distribution being representative of the burnfront.

Referring to FIG. 23E, there is shown a graph illustrating an exemplary spatial distribution of neutron flux, generally referred to as 483. In this regard, the graph plots spatial distribution 483 as neutron flux versus distance from igniter 245. Spatial distribution 483 is representative of the burnfront.

Figure 23F:
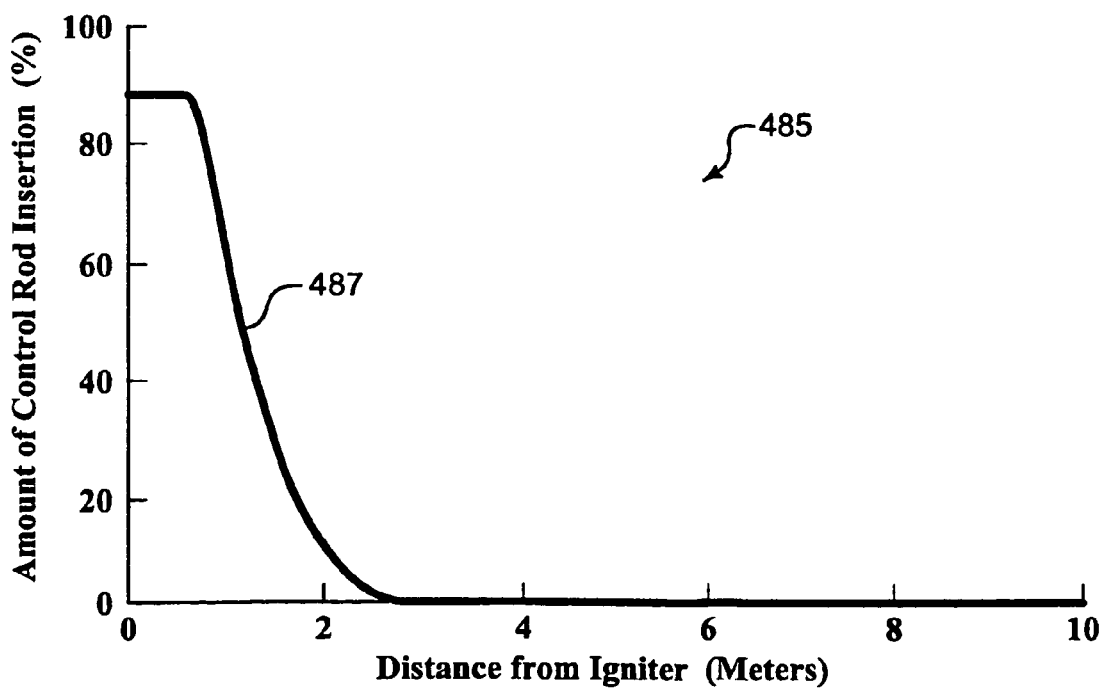
FIG. 23F is a graph showing a control function corresponding to the spatial distribution shown in FIG. 23E, this graph comprising percent of control rod insertion versus distance from the igniter.

Referring to FIG. 23F, there is shown a graph illustrating a spatial profile or control function, generally referred to as 485, corresponding to spatial distribution 483 shown in FIG. 23E. Spatial profile 485 has a steepest portion 487. This graph plots percent of control rod insertion versus distance from igniter 245.

It may be appreciated from the disclosure hereinabove that a burnup value at or below a predetermined burnup value is achievable. In this regard, an amount of neutron absorber, reflector and/or emitter can be controlled at a plurality of locations relative to burnfront 270, such that a majority of the neutron absorption occurs at locations behind burnfront 270 in order to obtain a burnup value at or below a predetermined burnup value. For example, the neutron emitter can be moved from a first location behind burnfront 270 to a second location in front of burnfront 270 to achieve a desired burnup value at or below a predetermined burnup value.

In addition, it may be appreciated from the disclosure hereinabove that radiation damage to one or more structural materials can also be controlled in response to controlling burnup in generic fuel assembly 30 and exemplary embodiment fuel assemblies 250/300/330/360/390/420/450. In this regard, controlling such radiation damage would entail achieving a desired radiation damage value, such as DPA, at or below a predetermined radiation damage value. Achieving a radiation damage value at or below a predetermined radiation damage value may comprise moving a neutron emitter from a first location behind burnfront 270 to a second location behind burnfront 270. Alternatively, the neutron emitter can be moved from a first location behind burnfront 270 to a second location in front of burnfront 270 to control potential radiation damage. As another alternative, an amount of neutron absorber can be controlled by means of control rods 192/194 at a location behind burnfront 270 to control potential radiation damage. In this regard, a majority of the neutron absorption due to the neutron absorber may occur at locations behind burnfront 270. In addition, achieving a desired radiation damage value at or below a predetermined radiation damage value may be obtained by controlling an amount of a neutron reflector at a location behind burnfront 270. In this regard, a majority of the neutron reflection due to the neutron reflector may occur at locations behind burnfront 270.

It may also be appreciated from the disclosure hereinabove that the neutron flux may be selectively modulated at a location relative to burnfront 270. In this regard, the neutron flux may be modulated at a location behind burnfront 270. In this case, a majority of the modulation occurs at a plurality of locations behind burnfront 270. In addition, selectively modulating neutron flux emitted by burnfront 270 can entail selectively absorbing a portion of the neutron flux emitted by burnfront 270. In other words, an amount of neutron absorber is controlled at a location relative to burnfront 270. More generally, an amount of a neutron interactive material (e.g., insertion of control rods 192/194) can be controlled at the location relative to burnfront 270. In one embodiment, controlling the amount of neutron interactive material at the location relative to burnfront 270 comprises controlling an amount of neutron emitter at the location relative to burnfront 270. The neutron emitter can be a fissile element, a fertile element and/or an element capable of undergoing beta decay to a fissile element. On the other hand, controlling the amount of the neutron interactive material at a location relative to burnfront 270 may comprise controlling an amount of a neutron reflector at the location relative to burnfront 270.

In addition, it may be appreciated from the disclosure hereinabove that selectively modulating the neutron flux may be governed by a spatial profile. The spatial profile can be either symmetric or asymmetric with respect to burnfront 270. The spatial profile can have a slope having a steepest portion, the steepest portion suitably occurring at a location behind burnfront 270.

It may be further appreciated from the disclosure hereinabove that selectively modulating neutron flux emitted by burnfront 270 may comprise detecting a burning parameter associated with burnfront 270 and selectively modulating the neutron flux at least partially in response to detecting the burning parameter. Detecting the burning parameter may comprise monitoring material radiation damage, such as DPA, at least one location proximate burnfront 270; monitoring burnup at least one location proximate burnfront 270; monitoring burnup speed; monitoring burnfront breadth; monitoring one or more characteristics associated with the neutron flux at least one location proximate burnfront 270; monitoring nuclear radiation at least one location proximate burnfront 270; and/or monitoring temperature at least one location thermally proximate burnfront 270. Moreover, selectively modulating the neutron flux at least partially in response to detecting the burning parameter may comprise selectively modulating the neutron flux at least partially in response to detecting the burning parameter and detecting the burning parameter at least partially in response to a feedback control process and/or at least partially in response to a computer-based algorithm having a plurality of parameters associated with the burning parameter. In this regard, one or more of the parameters of the computer-based algorithm may be modified in response to detecting the burning parameter.

Illustrative Methods

Illustrative methods associated with exemplary embodiments for controlling burnup in a traveling wave nuclear fission reactor and fuel assembly will now be described.

Referring to FIGS. 24-65; illustrative methods are provided for controlling burnup in a traveling wave nuclear fission reactor and fuel assembly capable of emitting a neutron flux.

Figure 24:
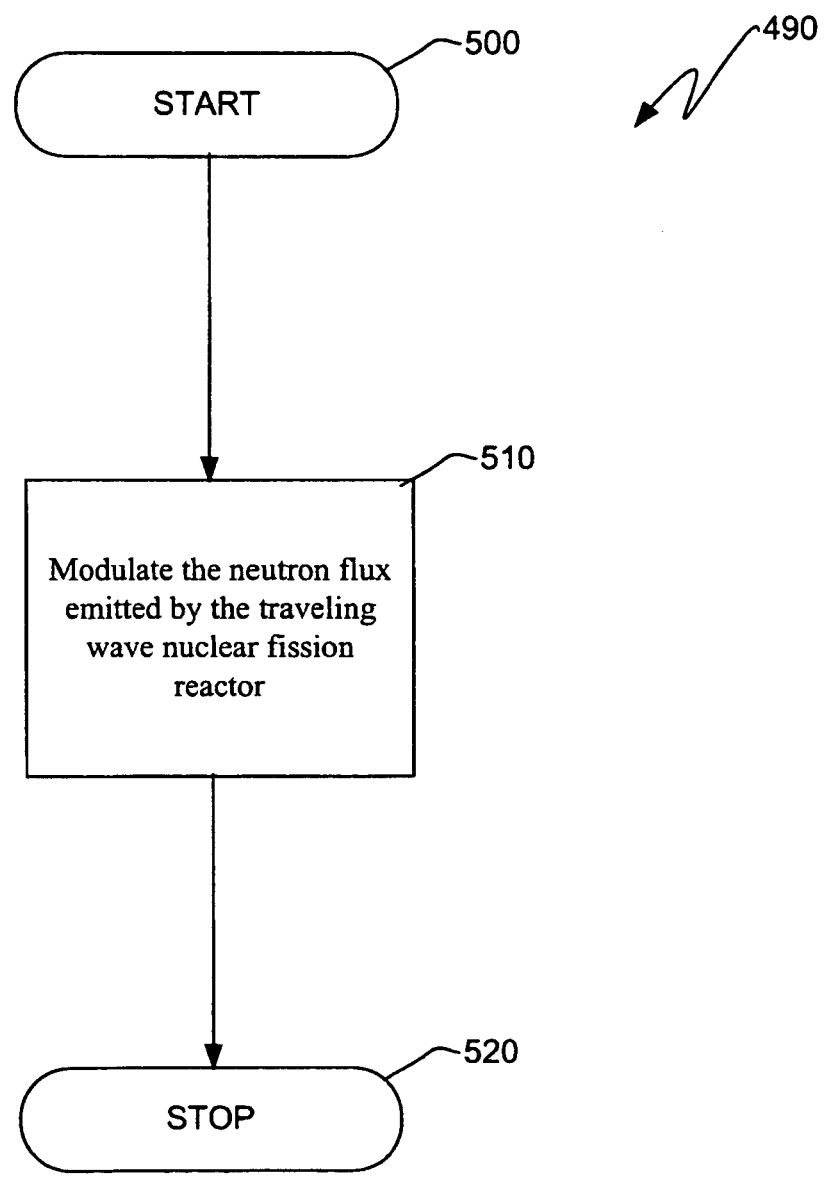
FIGS. 24-65 are flowcharts of illustrative methods of controlling burnup in a traveling wave nuclear fission reactor capable of emitting a neutron flux.

Turning now to FIG. 24, an illustrative method 490 for controlling burnup in a traveling wave nuclear fission reactor capable of emitting a neutron flux starts at a block 500. At a block 510, the method comprises modulating the neutron flux emitted by the traveling wave nuclear fission reactor. The method 490 stops at a block 520.

Figure 25:
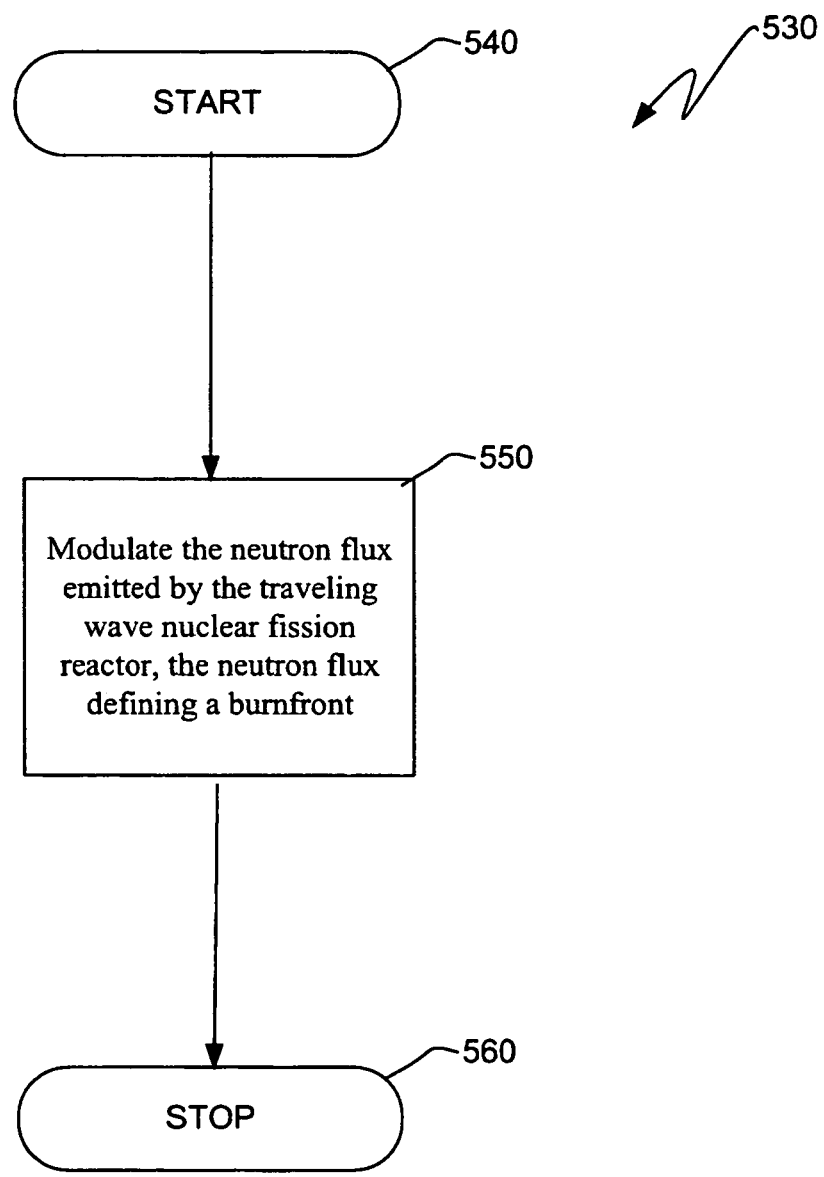

Referring to FIG. 25, an illustrative method 530 for controlling burnup in a traveling wave nuclear fission reactor capable of emitting a neutron flux starts at a block 540. At a block 550, the method comprises modulating the neutron flux emitted by the traveling wave nuclear fission reactor, the neutron flux defining a burnfront. The method 530 stops at a block 560.

Figure 26:
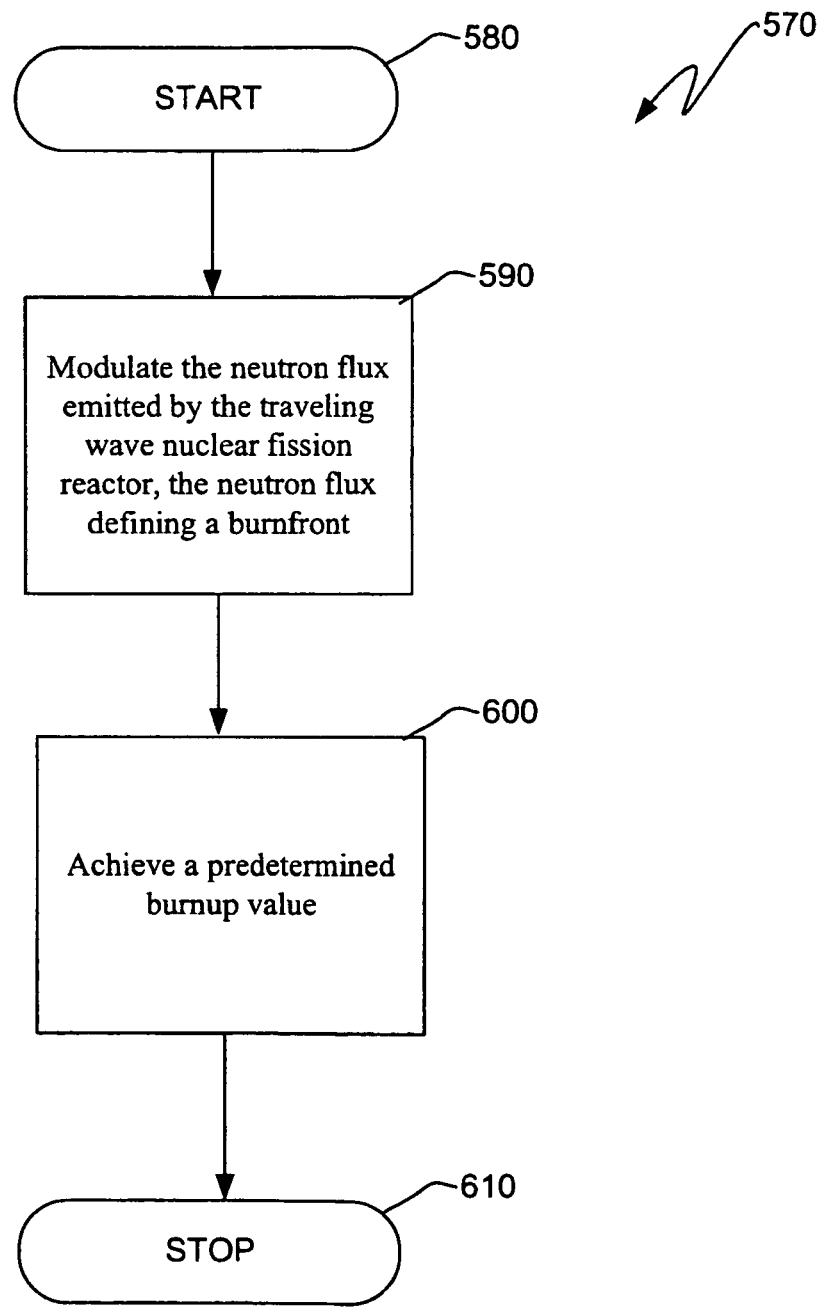

Referring to FIG. 26, an illustrative method 570 for controlling burnup in a traveling wave nuclear fission reactor capable of emitting a neutron flux starts at a block 580. At a block 590, the method comprises modulating the neutron flux emitted by the traveling wave nuclear fission reactor, the neutron flux defining a burnfront. At a block 600, a predetermined burnup value is achieved. The method 570 stops at a block 610.

Figure 27:
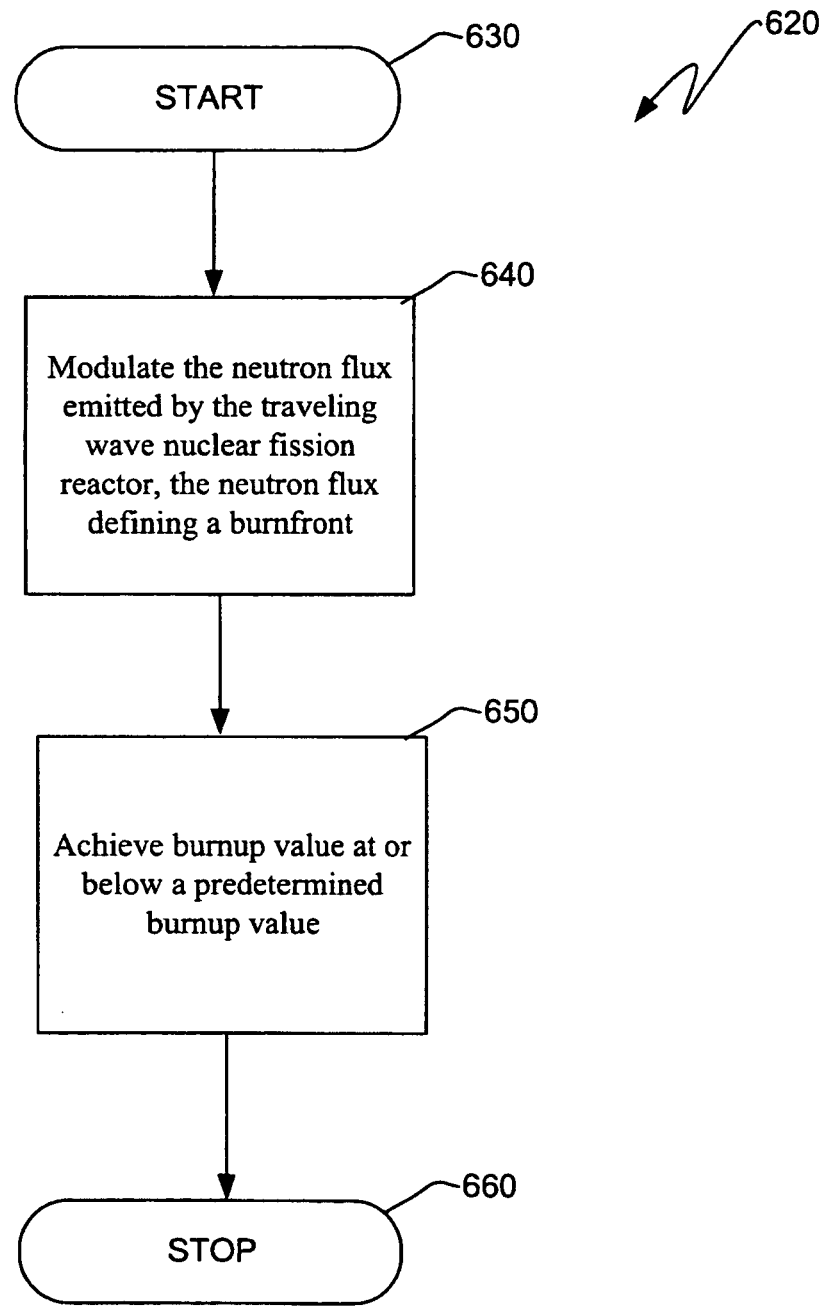

Referring to FIG. 27, an illustrative method 620 for controlling burnup in a traveling wave nuclear fission reactor capable of emitting a neutron flux starts at a block 630. At a block 640, the method comprises modulating the neutron flux emitted by the traveling wave nuclear fission reactor, the neutron flux defining a burnfront. At a block 650, a desired burnup value at or below a predetermined burnup value is achieved. The method 620 stops at a block 660.

Figure 28:
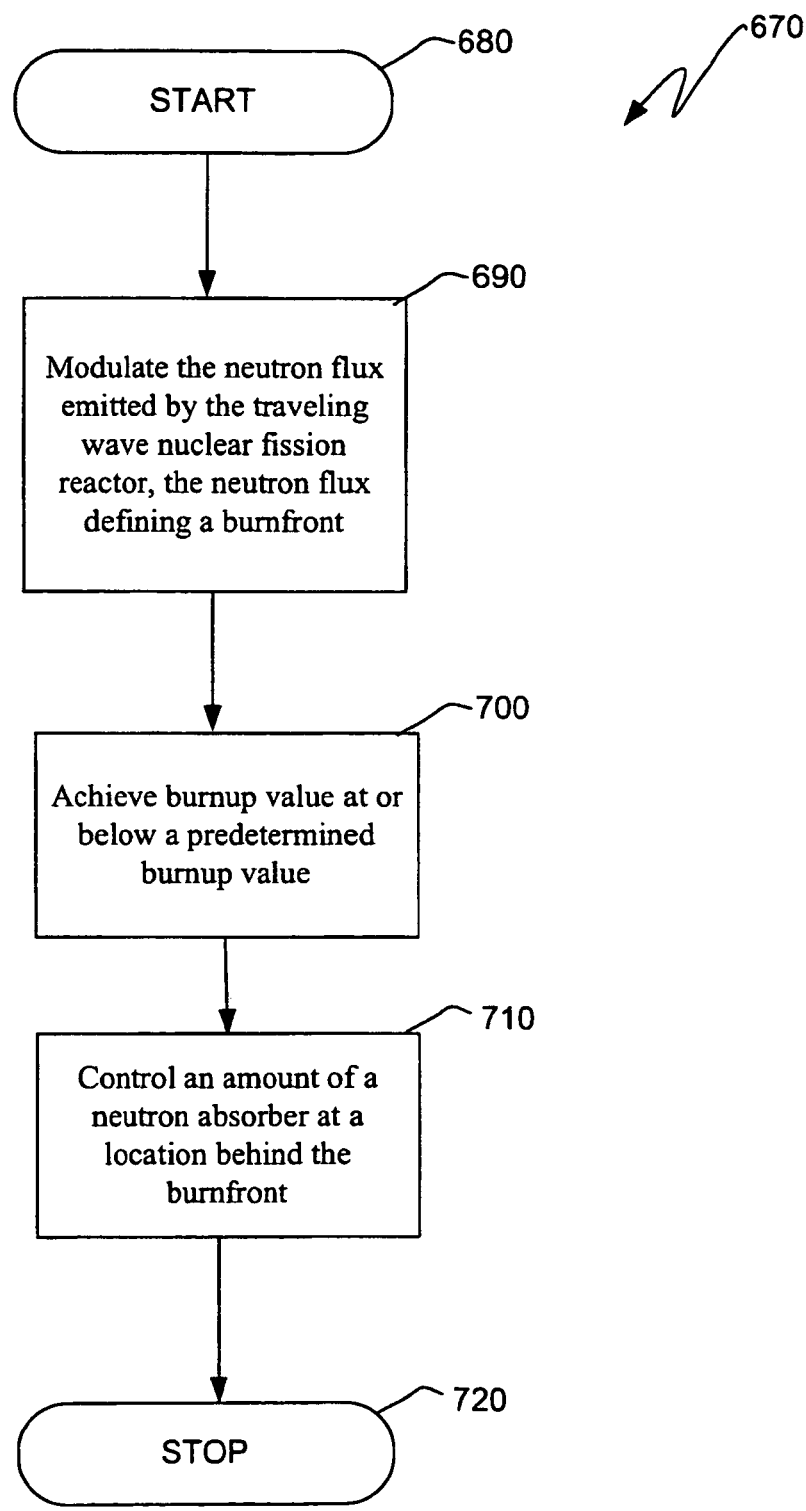

Referring to FIG. 28, an illustrative method 670 for controlling burnup in a traveling wave nuclear fission reactor capable of emitting a neutron flux starts at a block 680. At a block 690, the method comprises modulating the neutron flux emitted by the traveling wave nuclear fission reactor, the neutron flux defining a burnfront. At a block 700, the method comprises achieving a burnup value at or below a predetermined burnup value. At a block 710, an amount of a neutron absorber is controlled at a location behind the burnfront. The method 670 stops at a block 720.

Figure 29:
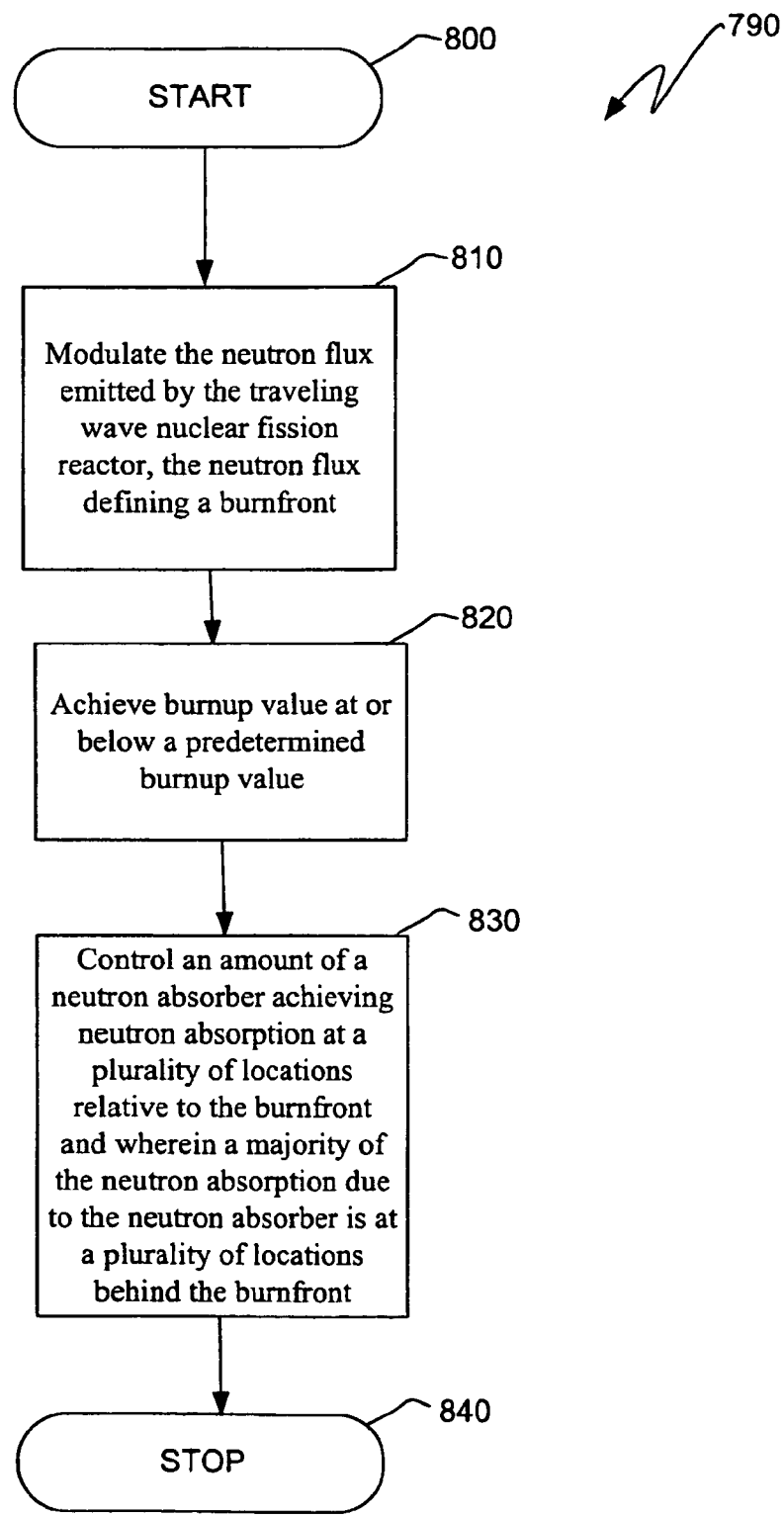

Referring to FIG. 29, an illustrative method 790 for controlling burnup in a traveling wave nuclear fission reactor capable of emitting a neutron flux starts at a block 800. At a block 810, the method comprises modulating the neutron flux emitted by the traveling wave nuclear fission reactor, the neutron flux defining a burnfront. At a block 820, a burnup value is achieved at or below a predetermined burnup value. At a block 830, an amount of a neutron absorber achieving neutron absorption is controlled at a plurality of locations relative to the burnfront and wherein a majority of the neutron absorption due to the neutron absorber is at a plurality of locations behind the burnfront. The method stops at a block 840.

Figure 30:
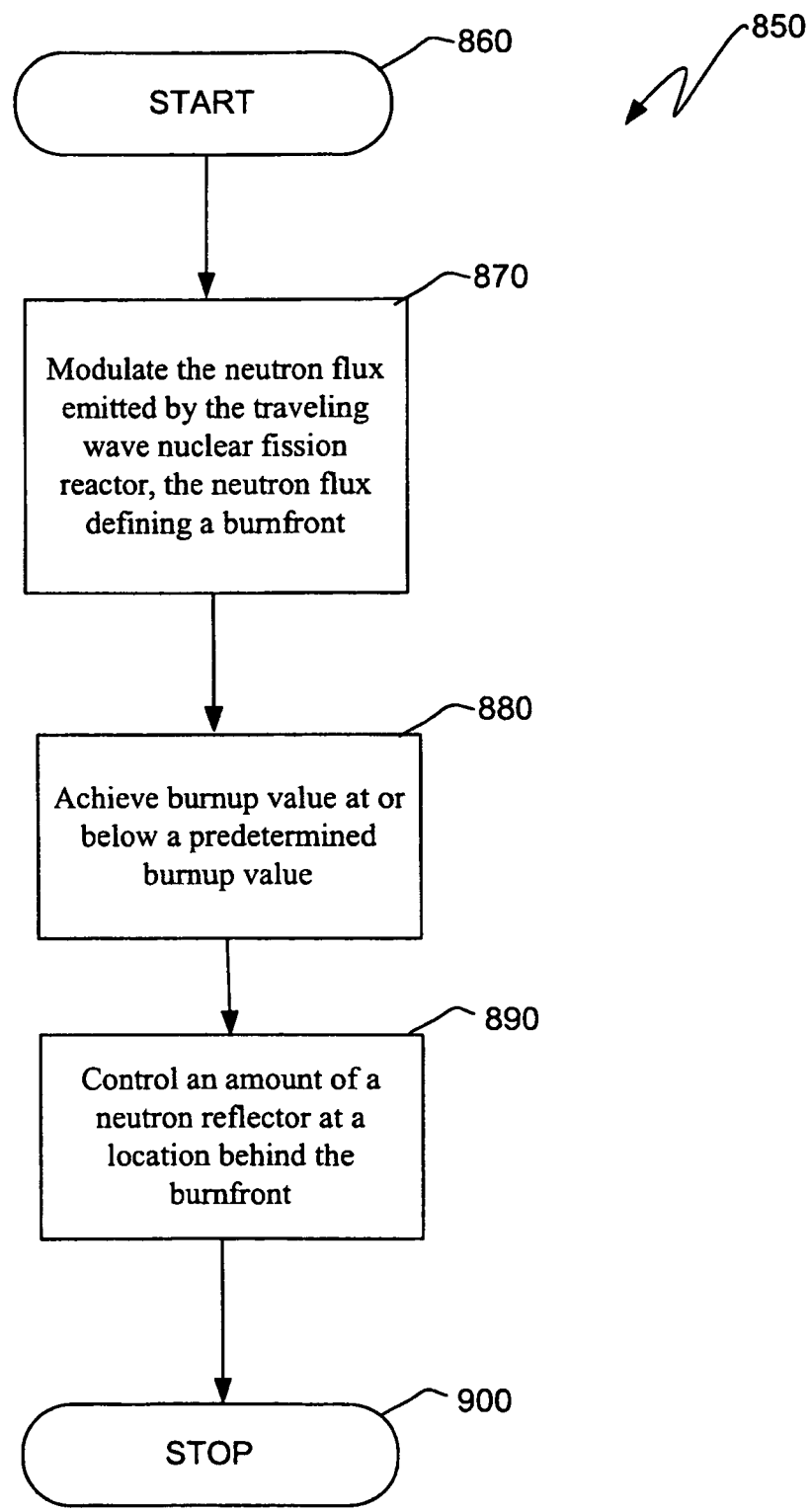

Referring to FIG. 30, an illustrative method 850 for controlling burnup in a traveling wave nuclear fission reactor capable of emitting a neutron flux starts at a block 860. At a block 870, the method comprises modulating the neutron flux emitted by the traveling wave nuclear fission reactor, the neutron flux defining a burnfront. At a block 880, a burnup value is achieved at or below a predetermined burnup value. At a block 890, an amount of a neutron reflector is controlled at a location behind the burnfront. The method stops at a block 900.

Figure 31:
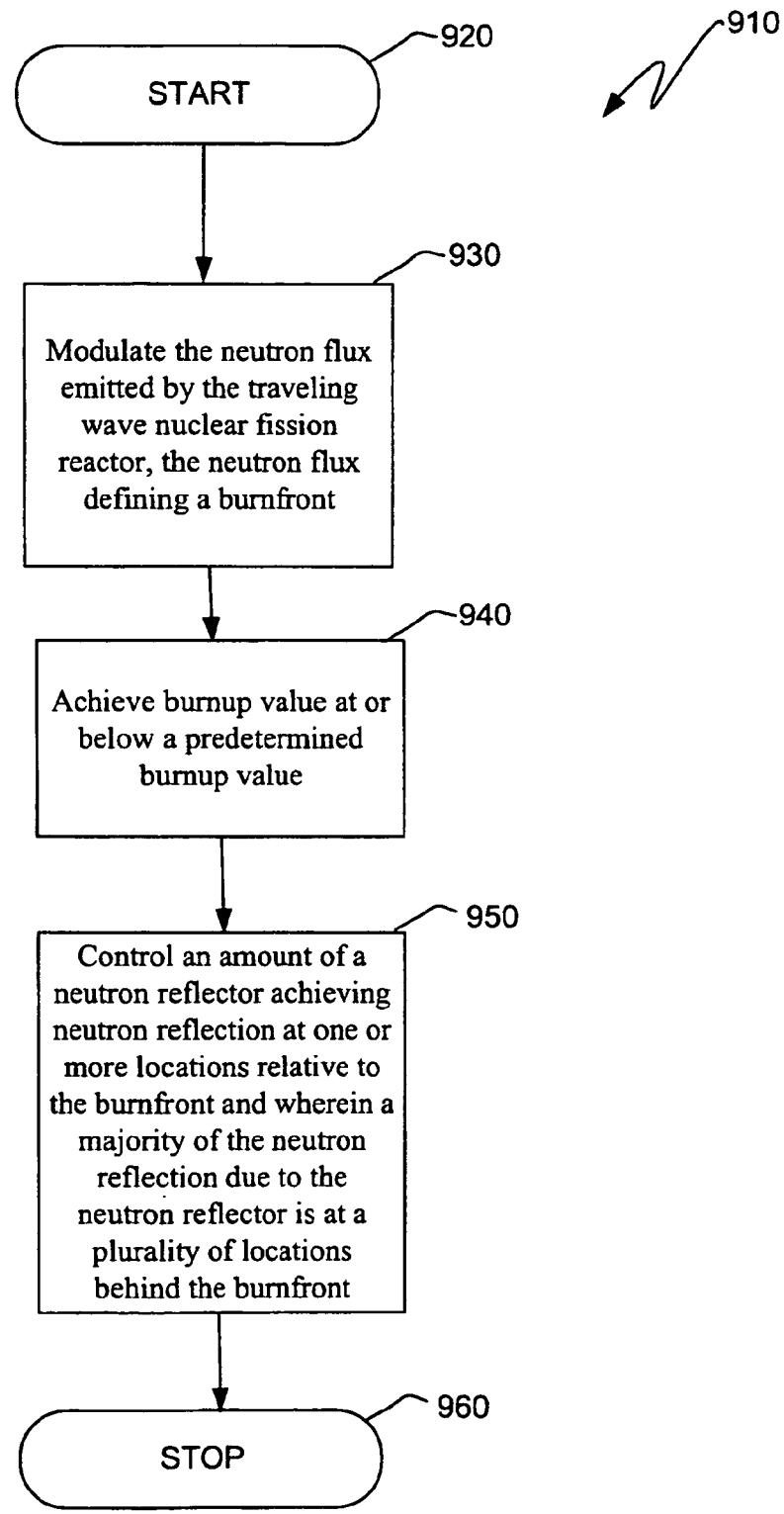

Referring to FIG. 31, an illustrative method 910 for controlling burnup in a traveling wave nuclear fission reactor capable of emitting a neutron flux starts at a block 920. At a block 930, the method comprises modulating the neutron flux emitted by the traveling wave nuclear fission reactor, the neutron flux defining a burnfront. At a block 940, a burnup value is achieved at or below a predetermined burnup value. At a block 950, an amount of a neutron reflector achieving neutron reflection is controlled at one or more locations relative to the burnfront and wherein a majority of the neutron reflection due to the neutron reflector is at a plurality of locations behind the burnfront. The method stops at a block 960.

Figure 32:
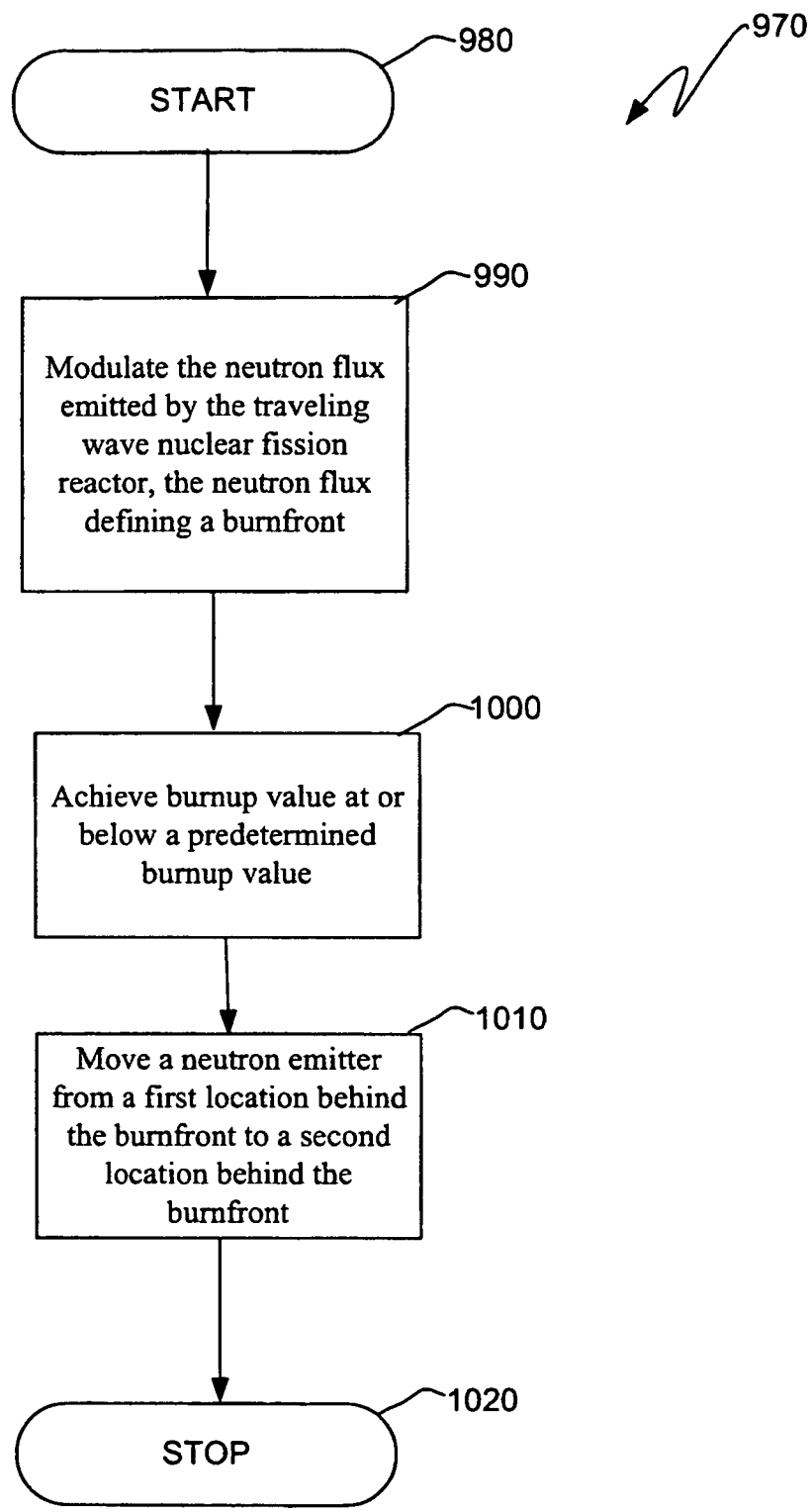

Referring to FIG. 32, an illustrative method 970 for controlling burnup in a traveling wave nuclear fission reactor capable of emitting a neutron flux starts at a block 980. At a block 990, the method comprises modulating the neutron flux emitted by the traveling wave nuclear fission reactor, the neutron flux defining a burnfront. At a block 1000, a burnup value is achieved at or below a predetermined burnup value. At a block 1010, a neutron emitter is moved from a first location behind the burnfront to a second location behind the burnfront. The method stops at a block 1020.

Figure 33:
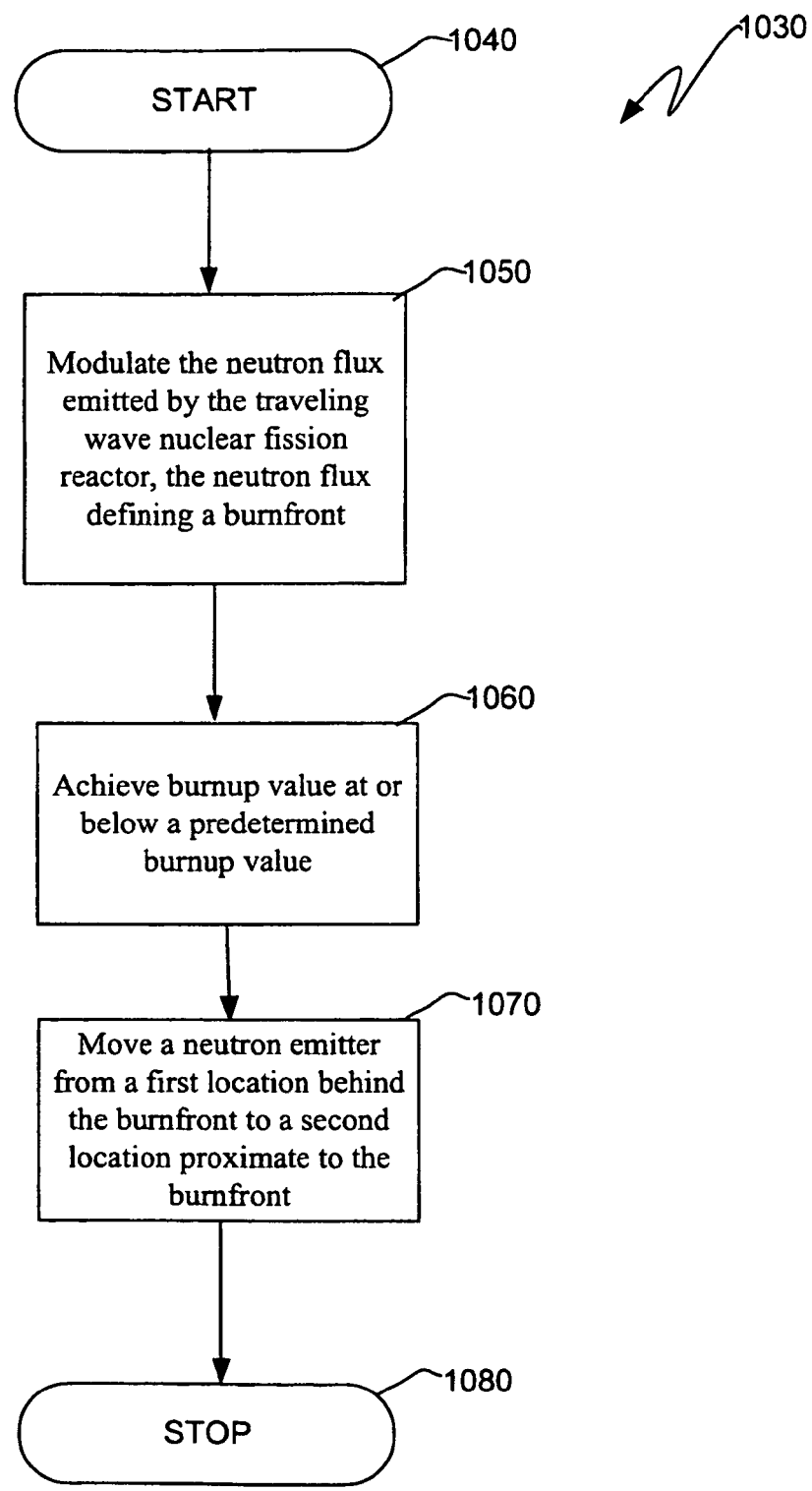

Referring to FIG. 33, an illustrative method 1030 for controlling burnup in a traveling wave nuclear fission reactor capable of emitting a neutron flux starts at a block 1040. At a block 1050, the method comprises modulating the neutron flux emitted by the traveling wave nuclear fission reactor, the neutron flux defining a burnfront. At a block 1060, a burnup value is achieved at or below a predetermined burnup value. At a block 1070, a neutron emitter is moved from a first location behind the burnfront to a second location proximate to the burnfront. The method stops at a block 1080.

Figure 34:
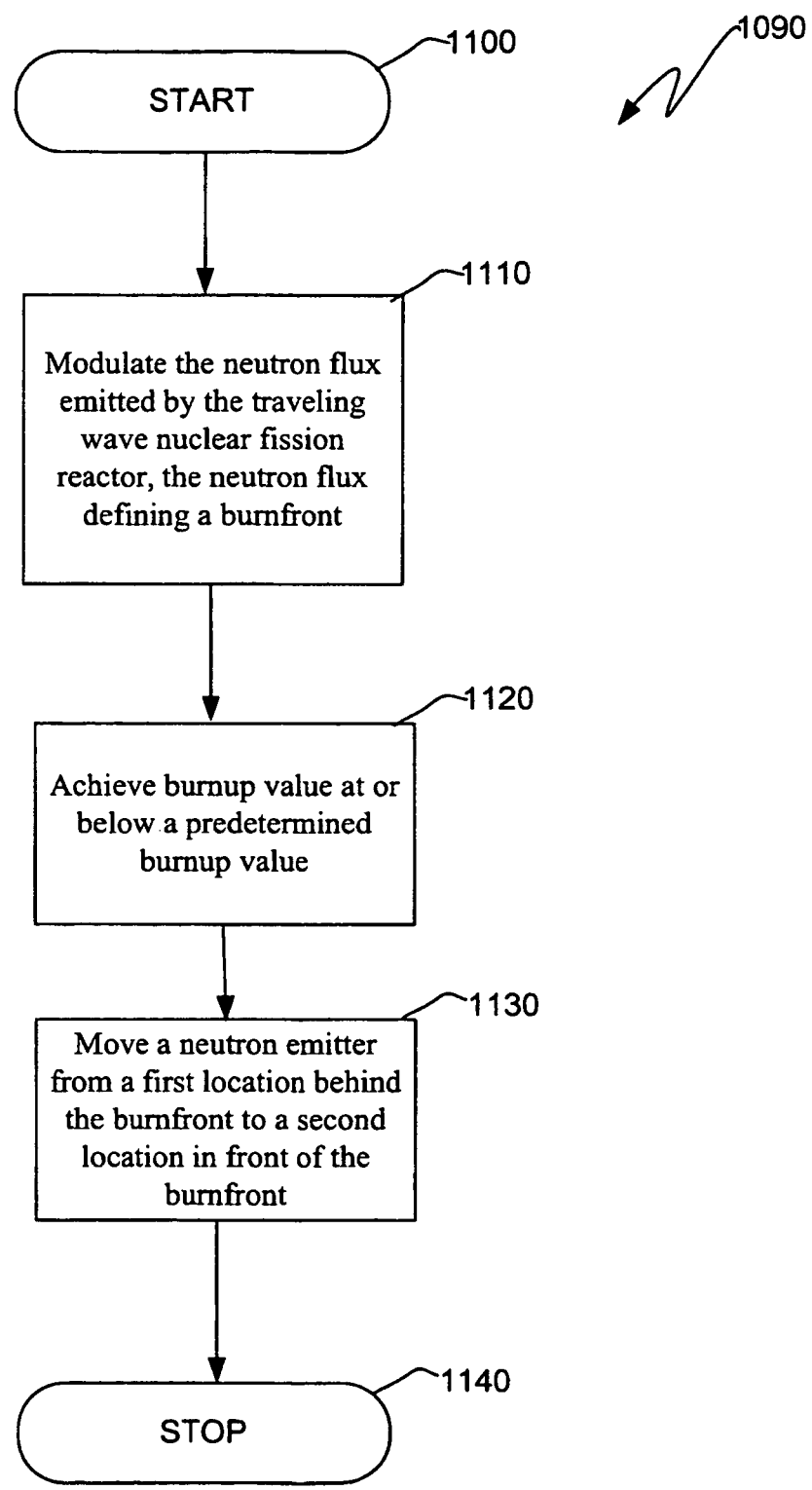

Referring to FIG. 34, an illustrative method 1090 for controlling burnup in a traveling wave nuclear fission reactor capable of emitting a neutron flux starts at a block 1100. At a block 1110, the method comprises modulating the neutron flux emitted by the traveling wave nuclear fission reactor, the neutron flux defining a burnfront. At a block 1120, a burnup value is achieved at or below a predetermined burnup value. At a block 1130, a neutron emitter is moved from a first location behind the burnfront to a second location in front of the burnfront. The method stops at a block 1140.

Figure 35:
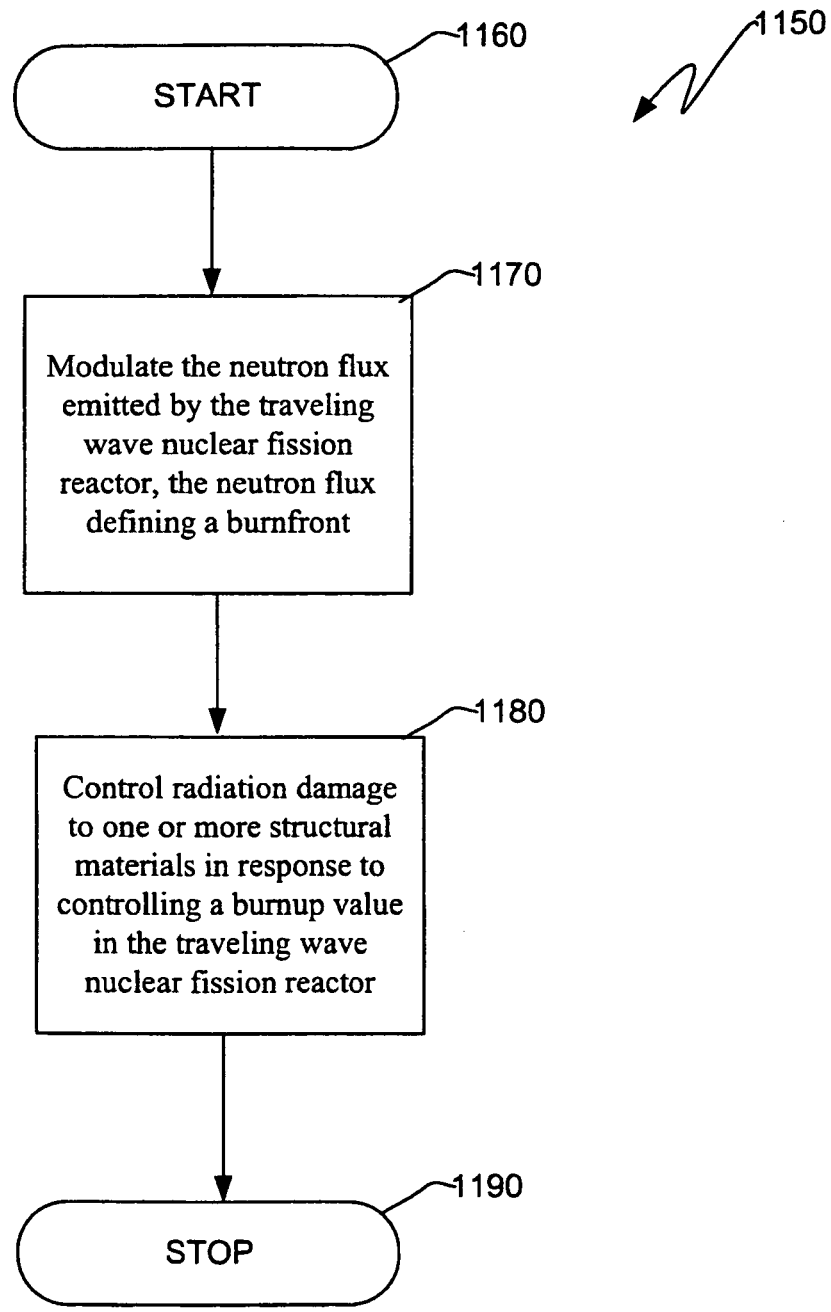

Referring to FIG. 35, an illustrative method 1150 for controlling burnup in a traveling wave nuclear fission reactor capable of emitting a neutron flux starts at a block 1160. At a block 1170, the method comprises modulating the neutron flux emitted by the traveling wave nuclear fission reactor, the neutron flux defining a burnfront. At a block 1180, radiation damage to one or more structural materials is controlled in response to controlling a burnup value in the traveling wave nuclear fission reactor. The method stops at a block 1190.

Figure 36:
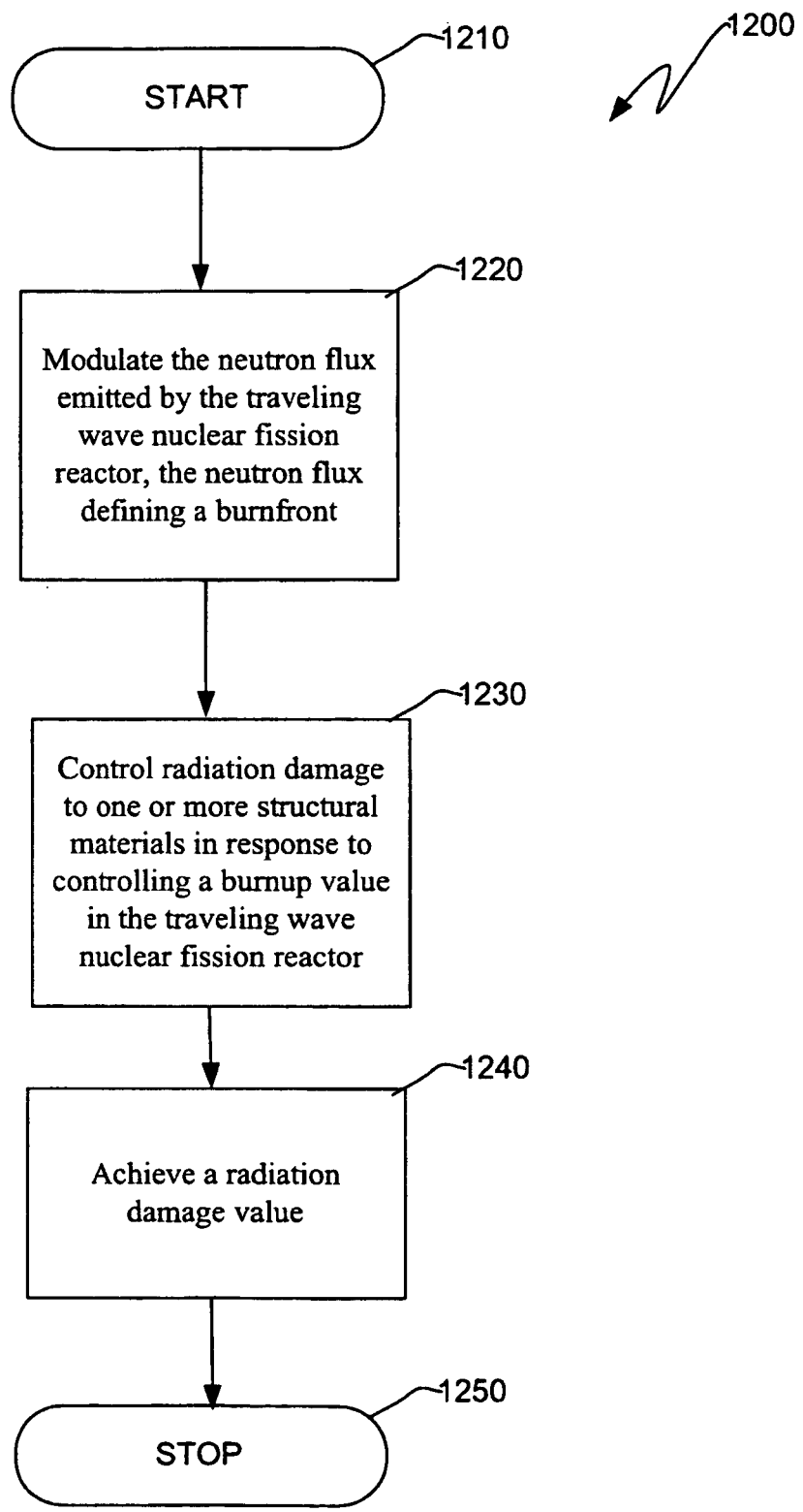

Referring to FIG. 36, an illustrative method 1200 for controlling burnup in a traveling wave nuclear fission reactor capable of emitting a neutron flux starts at a block 1210. At a block 1220, the method comprises modulating the neutron flux emitted by the traveling wave nuclear fission reactor, the neutron flux defining a burnfront. At a block 1230, radiation damage to one or more structural materials is controlled in response to controlling a burnup value in the traveling wave nuclear fission reactor. At a block 1240, a radiation damage value is achieved. The method stops at a block 1250.

Figure 37:
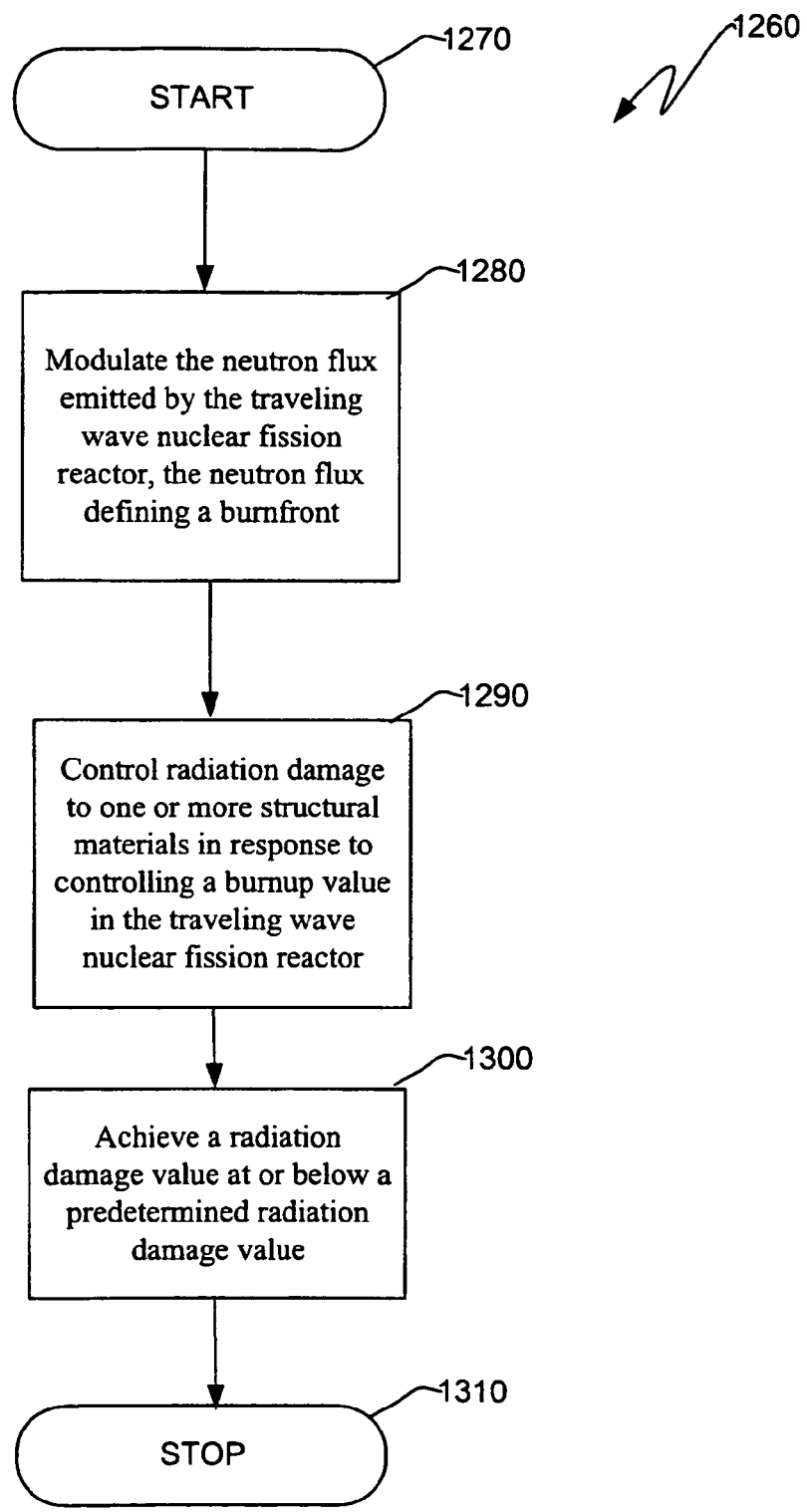

Referring to FIG. 37, an illustrative method 1260 for controlling burnup in a traveling wave nuclear fission reactor capable of emitting a neutron flux starts at a block 1270. At a block 1280, the method comprises modulating the neutron flux emitted by the traveling wave nuclear fission reactor, the neutron flux defining a burnfront. At a block 1290, radiation damage to one or more structural materials is controlled in response to controlling a burnup value in the traveling wave nuclear fission reactor. At a block 1300, a radiation damage value is achieved at or below a predetermined radiation damage value. The method stops at a block 1310.

Figure 38:
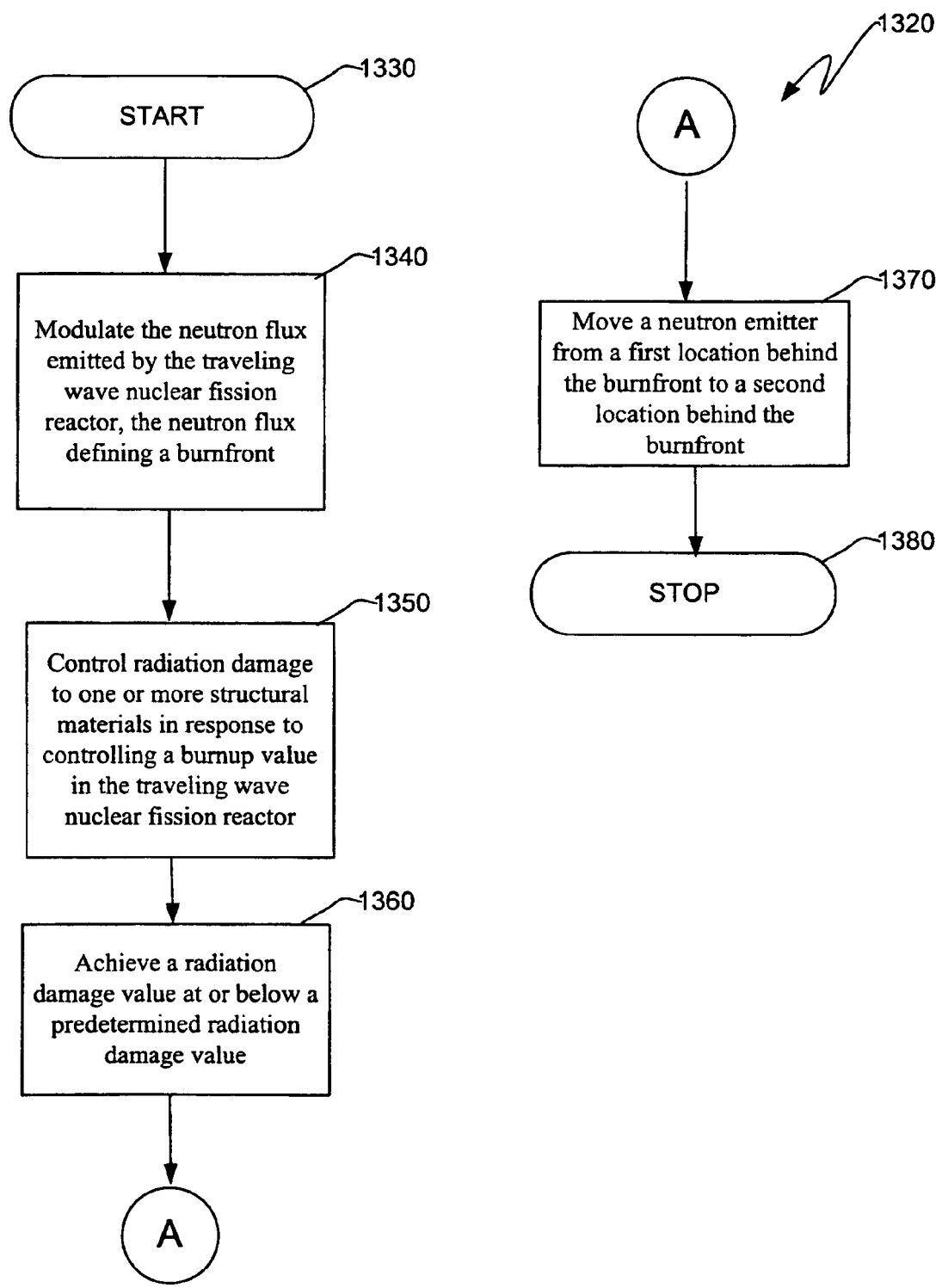

Referring to FIG. 38, an illustrative method 1320 for controlling burnup in a traveling wave nuclear fission reactor capable of emitting a neutron flux starts at a block 1330. At a block 1340, the method comprises modulating the neutron flux emitted by the traveling wave nuclear fission reactor, the neutron flux defining a burnfront. At a block 1350, radiation damage to one or more structural materials is controlled in response to controlling a burnup value in the traveling wave nuclear fission reactor. At a block 1360, a radiation damage value is achieved at or below a predetermined radiation damage value. At a block 1370 a neutron emitter is moved from a first location behind the burnfront to a second location behind the burnfront. The method stops at a block 1380.

Figure 39:
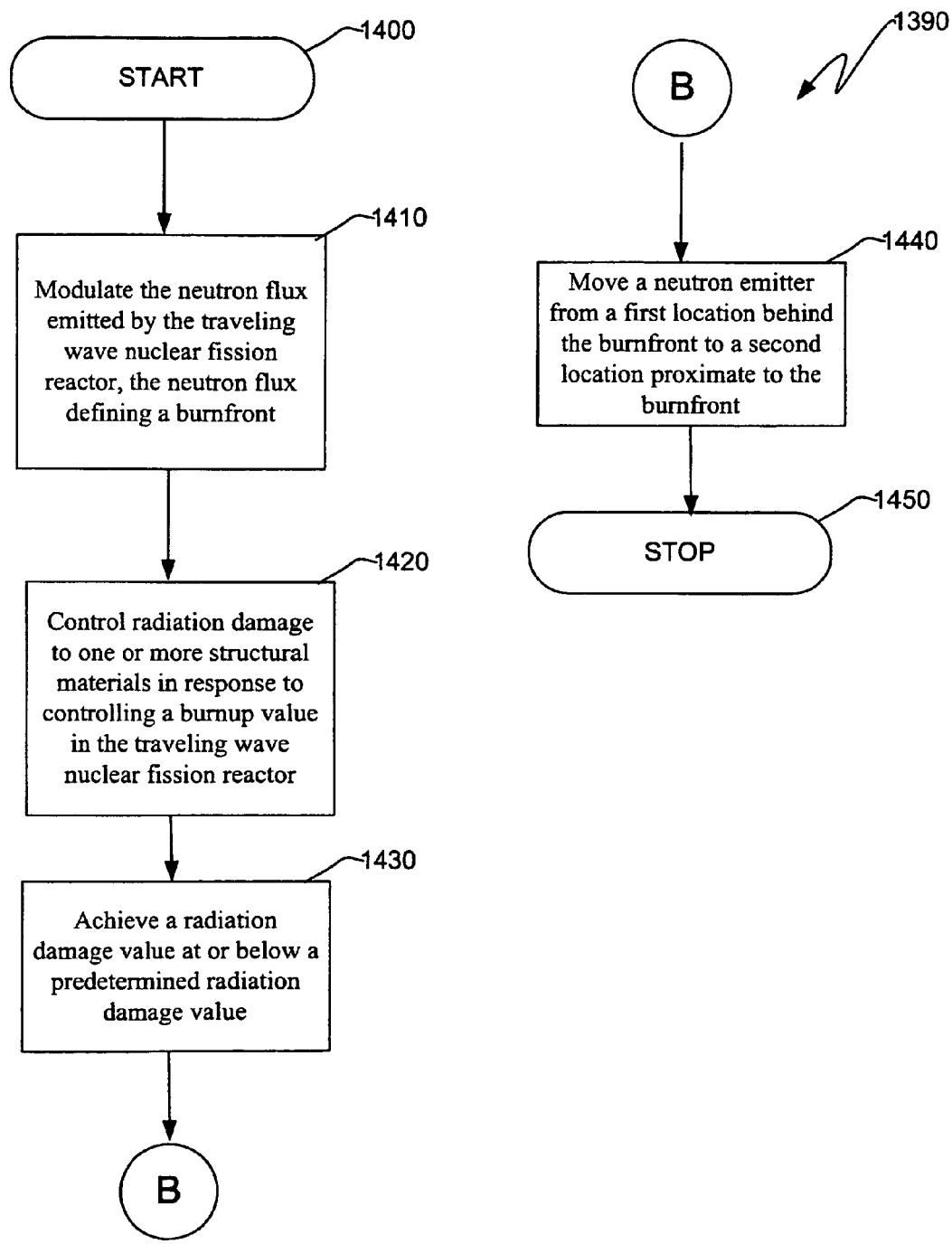

Referring to FIG. 39, an illustrative method 1390 for controlling burnup in a traveling wave nuclear fission reactor capable of emitting a neutron flux starts at a block 1400. At a block 1410, the method comprises modulating the neutron flux emitted by the traveling wave nuclear fission reactor, the neutron flux defining a burnfront. At a block 1420, radiation damage to one or more structural materials is controlled in response to controlling a burnup value in the traveling wave nuclear fission reactor. At a block 1430, a radiation damage value is achieved at or below a predetermined radiation damage value. At a block 1440 a neutron emitter is moved from a first location behind the burnfront to a second location proximate to the burnfront. The method stops at a block 1450.

Figure 40:
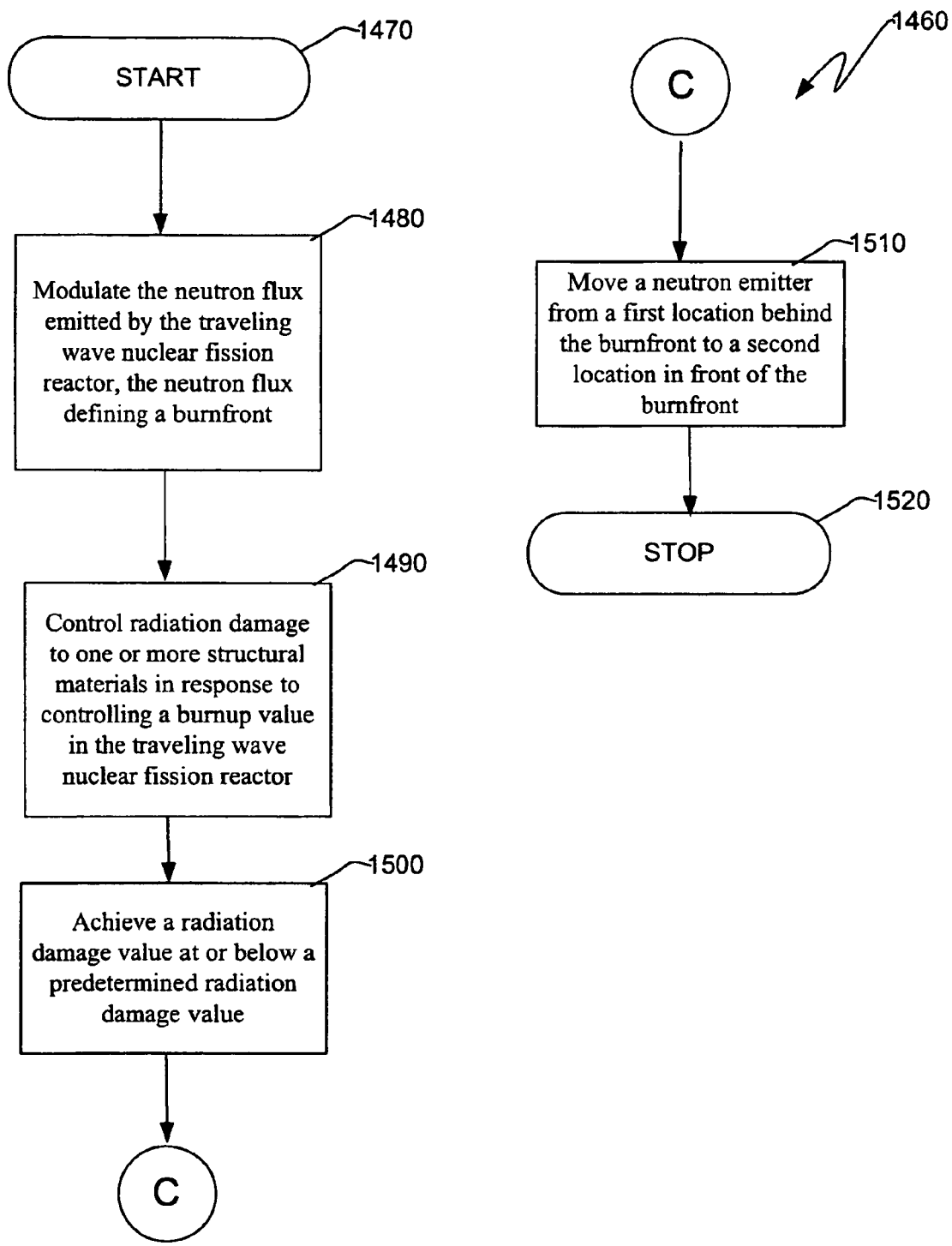

Referring to FIG. 40, an illustrative method 1460 for controlling burnup in a traveling wave nuclear fission reactor capable of emitting a neutron flux starts at a block 1470. At a block 1480, the method comprises modulating the neutron flux emitted by the traveling wave nuclear fission reactor, the neutron flux defining a burnfront. At a block 1490, radiation damage to one or more structural materials is controlled in response to controlling a burnup value in the traveling wave nuclear fission reactor. At a block 1500, a radiation damage value is achieved at or below a predetermined radiation damage value. At a block 1510, a neutron emitter is moved from a first location behind the burnfront to a second location in front of the burnfront. The method stops at a block 1520.

Figure 41:
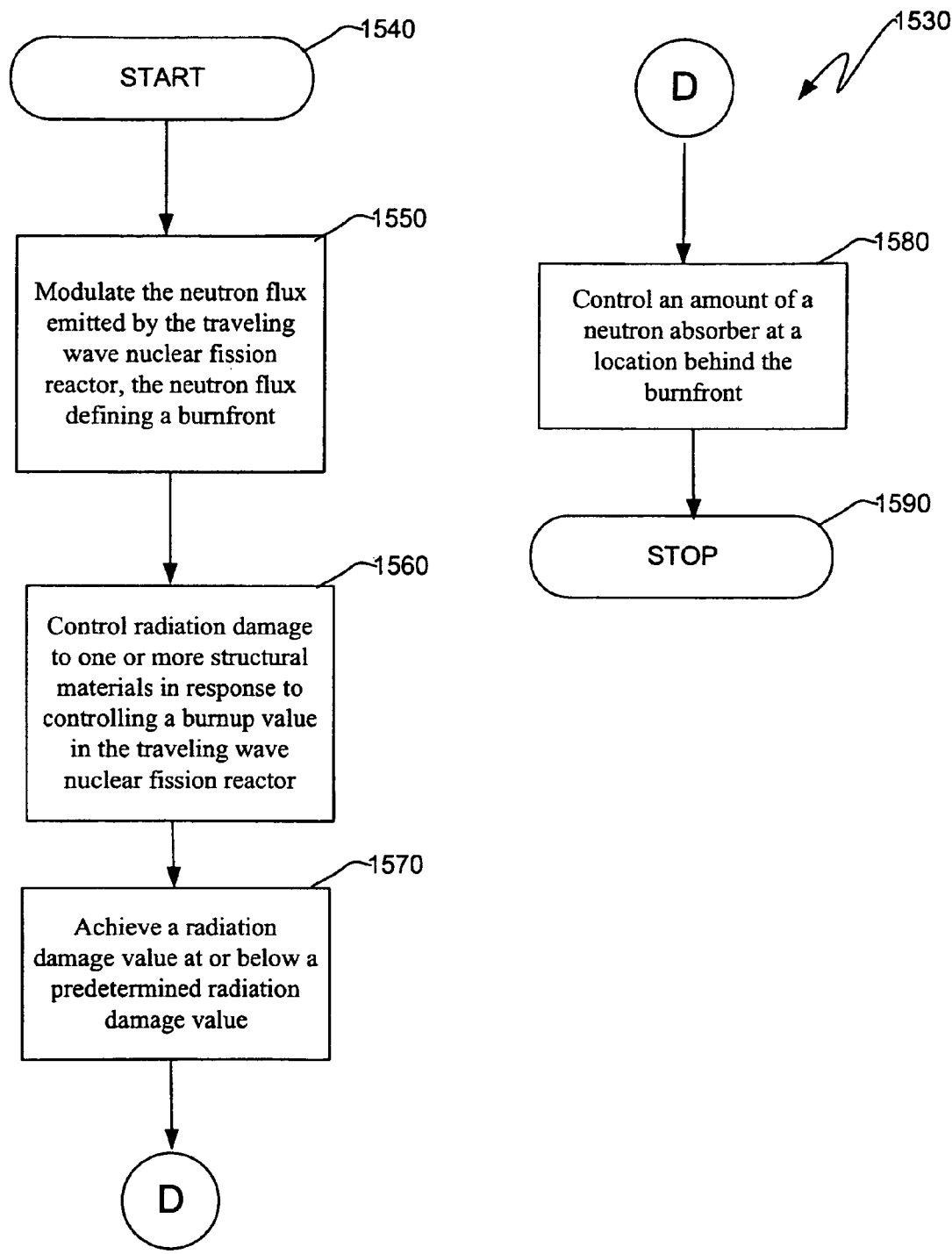

Referring to FIG. 41, an illustrative method 1530 for controlling burnup in a traveling wave nuclear fission reactor capable of emitting a neutron flux starts at a block 1540. At a block 1550, the method comprises modulating the neutron flux emitted by the traveling wave nuclear fission reactor, the neutron flux defining a burnfront. At a block 1560, radiation damage to one or more structural materials is controlled in response to controlling a burnup value in the traveling wave nuclear fission reactor. At a block 1570, a radiation damage value is achieved at or below a predetermined radiation damage value. An amount of a neutron absorber is controlled at a location behind the burnfront at a block 1580. The method stops at a block 1590.

Figure 42:
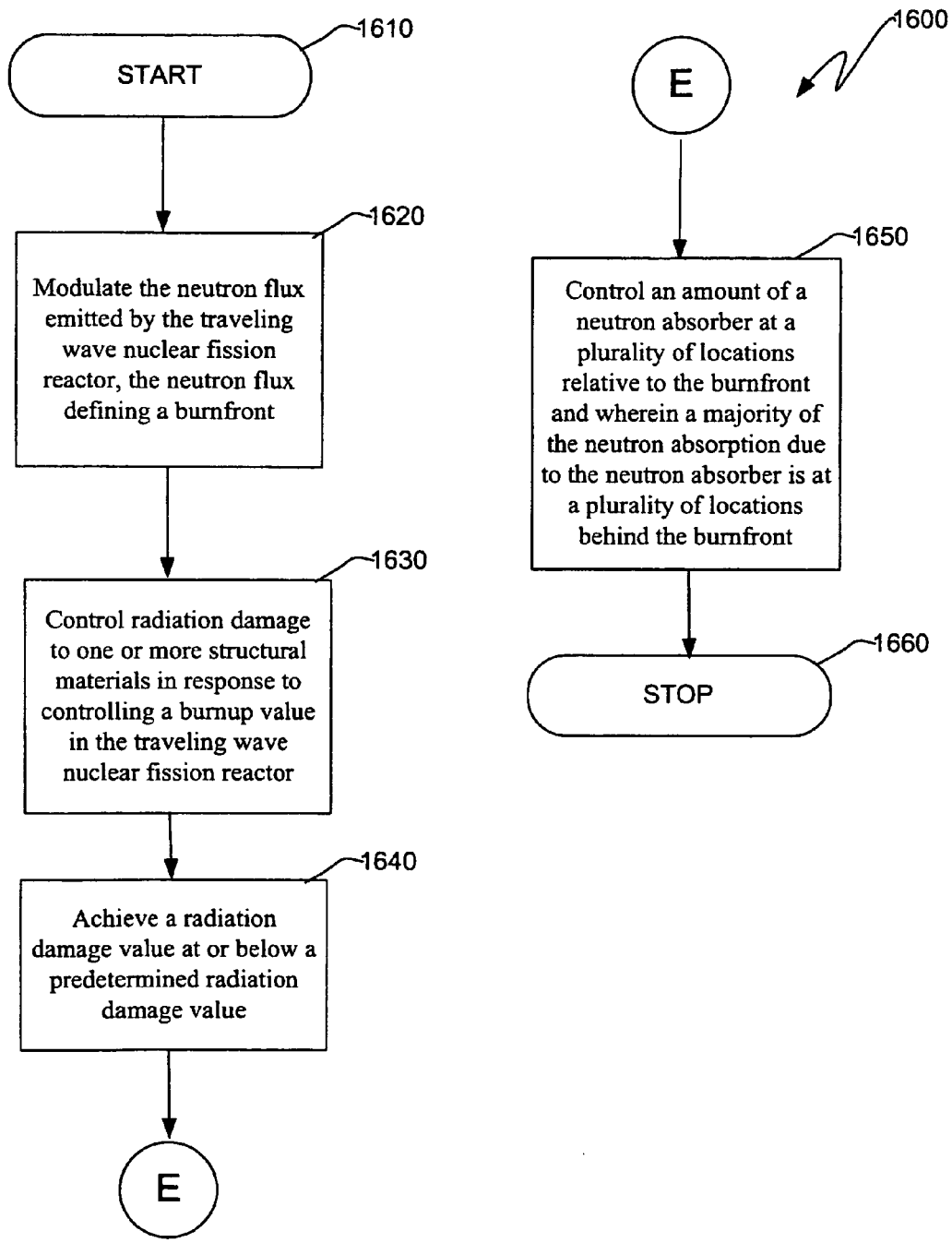

Referring to FIG. 42, an illustrative method 1600 for controlling burnup in a traveling wave nuclear fission reactor capable of emitting a neutron flux starts at a block 1610. At a block 1620, the method comprises modulating the neutron flux emitted by the traveling wave nuclear fission reactor, the neutron flux defining a burnfront. At a block 1630, radiation damage to one or more structural materials is controlled in response to controlling a burnup value in the traveling wave nuclear fission reactor. A radiation damage value is achieved at or below a predetermined radiation value at a block 1640. At a block 1650, an amount of a neutron absorber is controlled at a plurality of locations relative to the burnfront and wherein a majority of the neutron absorption due to the neutron absorber is at a plurality of locations behind the burnfront. The method stops at a block 1660.

Figure 43:
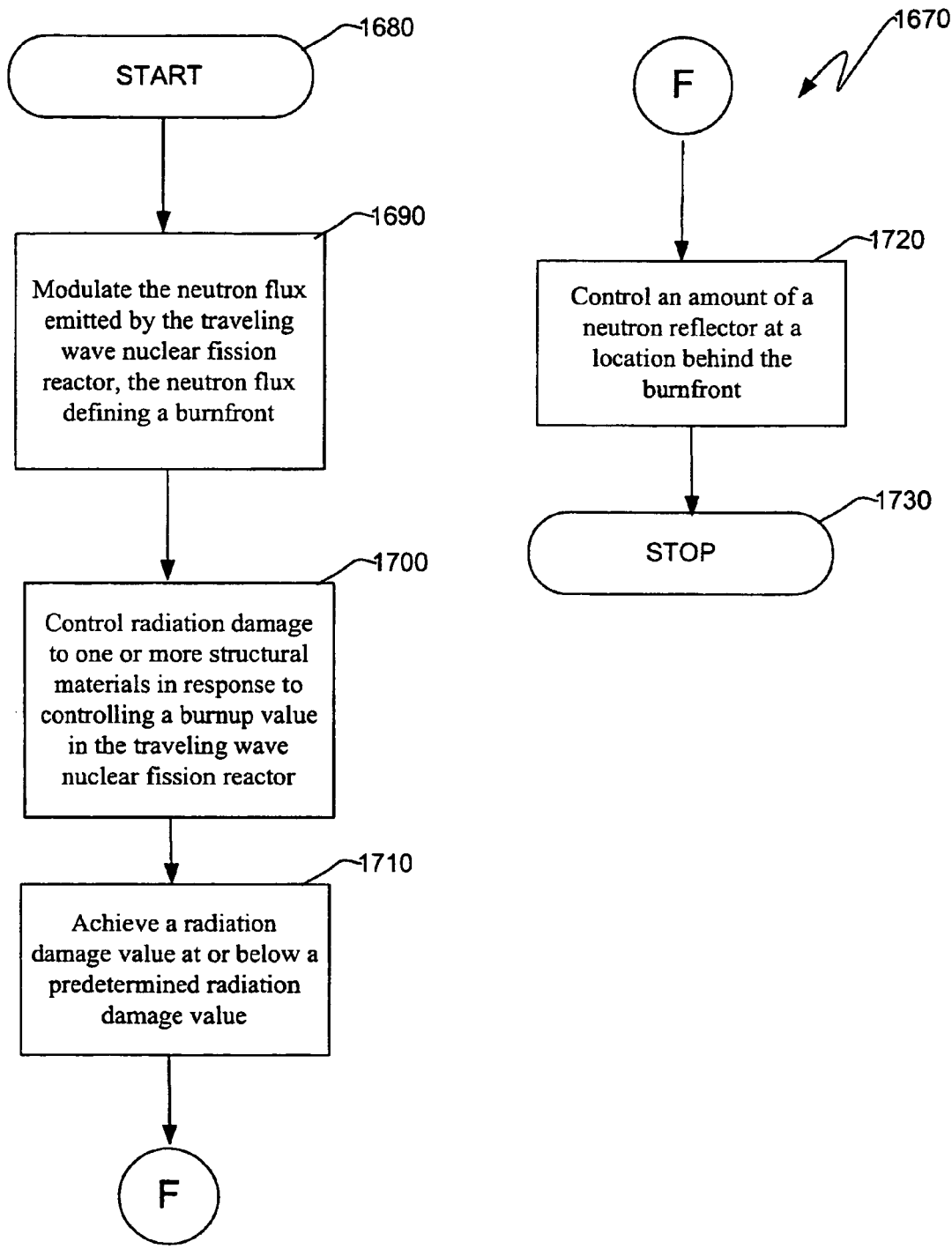

Referring to FIG. 43, an illustrative method 1670 for controlling burnup in a traveling wave nuclear fission reactor capable of emitting a neutron flux starts at a block 1680. At a block 1690, the method comprises modulating the neutron flux emitted by the traveling wave nuclear fission reactor, the neutron flux defining a burnfront. At a block 1700, radiation damage to one or more structural materials is controlled in response to controlling a burnup value in the traveling wave nuclear fission reactor. A radiation damage value is achieved at or below a predetermined radiation value at a block 1710. An amount of a neutron reflector is controlled at a location behind the burnfront at a block 1720. The method stops at a block 1730.

Figure 44:
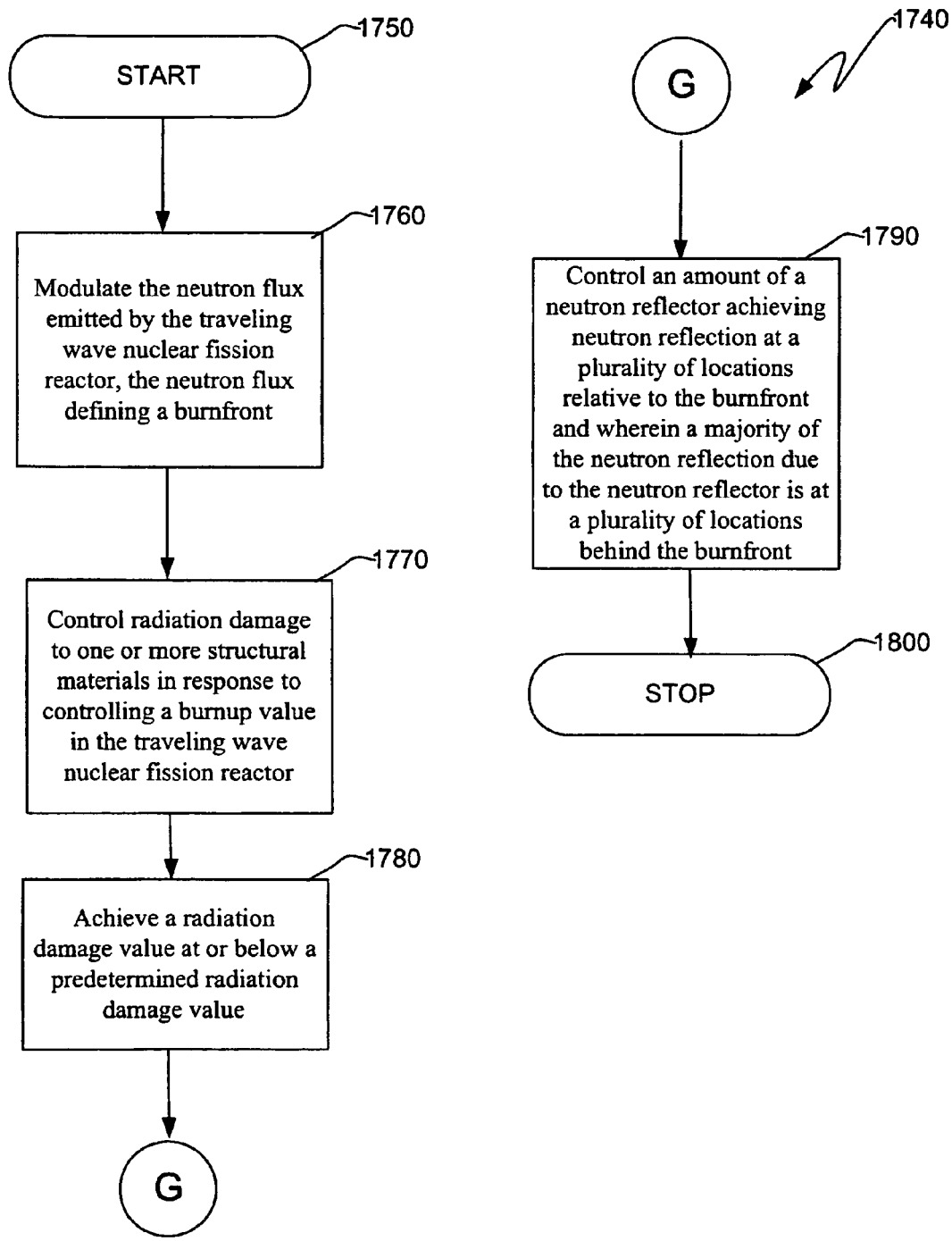

Referring to FIG. 44, an illustrative method 1740 for controlling burnup in a traveling wave nuclear fission reactor capable of emitting a neutron flux starts at a block 1750. At a block 1760, the method comprises modulating the neutron flux emitted by the traveling wave nuclear fission reactor, the neutron flux defining a burnfront. At a block 1770, radiation damage to one or more structural materials is controlled in response to controlling a burnup value in the traveling wave nuclear fission reactor. A radiation damage value is achieved at or below a predetermined radiation value at a block 1780. At a block 1790, an amount of a neutron reflector achieving neutron reflection is controlled at a plurality of locations relative to the burnfront and wherein a majority of the neutron reflection due to the neutron reflector is at a plurality of locations behind the burnfront. The method stops at a block 1800.

Figure 45:
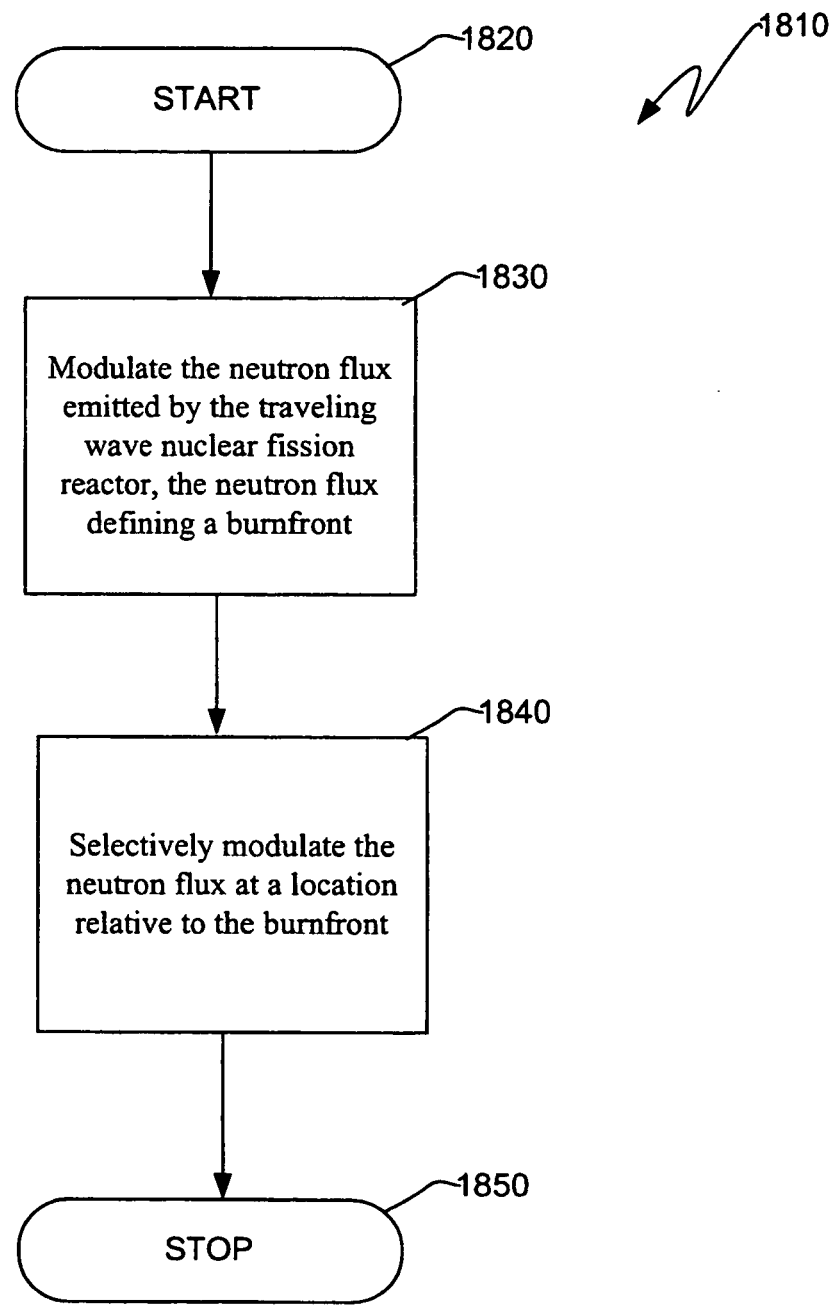

Referring to FIG. 45, an illustrative method 1810 for controlling burnup in a traveling wave nuclear fission reactor capable of emitting a neutron flux starts at a block 1820. At a block 1830, the method comprises modulating the neutron flux emitted by the traveling wave nuclear fission reactor, the neutron flux defining a burnfront. The neutron flux is selectively modulated at a location relative to the burnfront at a block 1840. The method stops at a block 1850.

Figure 46:
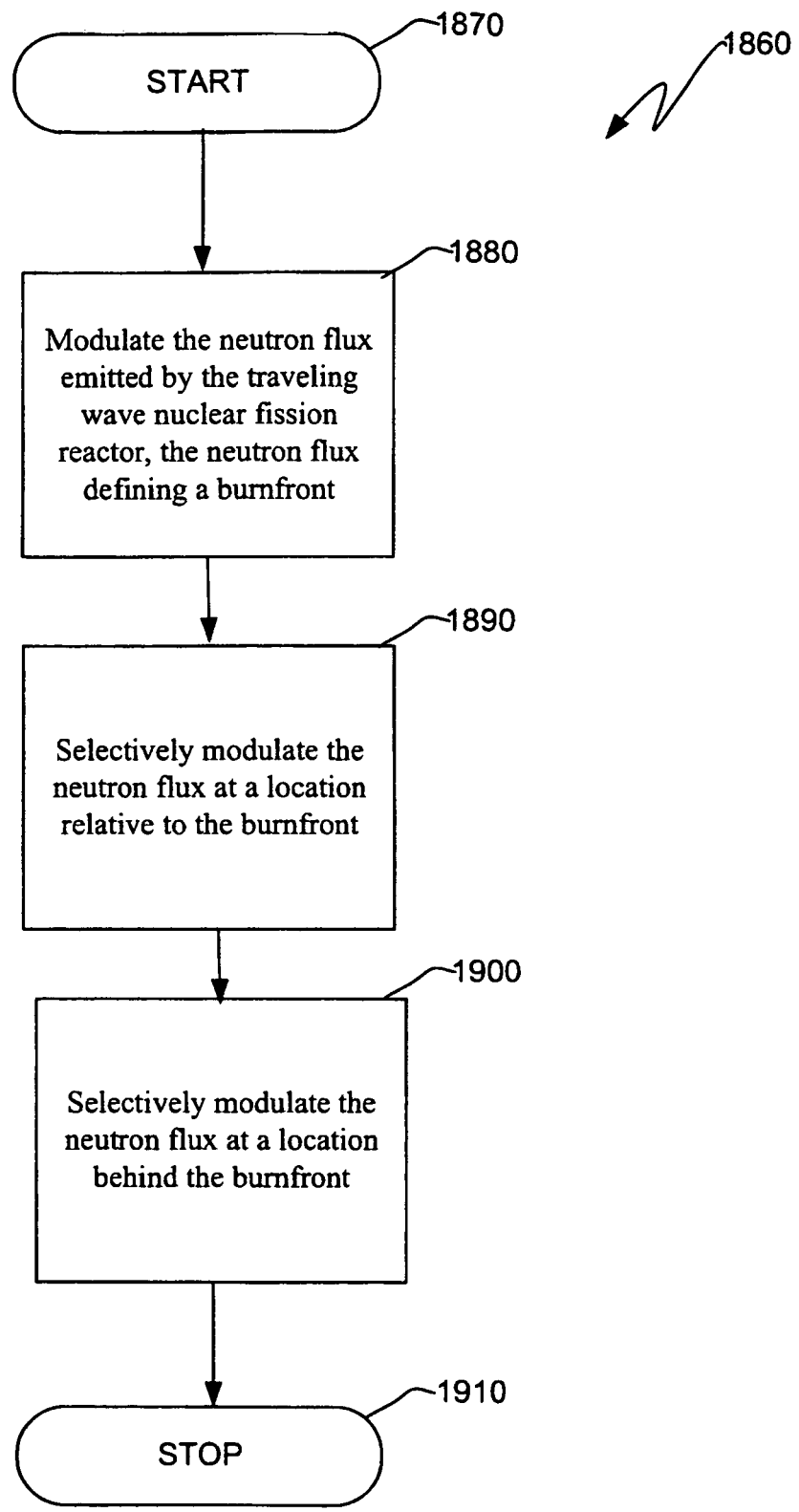

Referring to FIG. 46, an illustrative method 1860 for controlling burnup in a traveling wave nuclear fission reactor capable of emitting a neutron flux starts at a block 1870. At a block 1880, the method comprises modulating the neutron flux emitted by the traveling wave nuclear fission reactor, the neutron flux defining a burnfront. The neutron flux is selectively modulated at a location relative to the burnfront at a block 1890. At a block 1900, the neutron flux is selectively modulated at a location behind the burnfront. The method stops at a block 1910.

Figure 47:
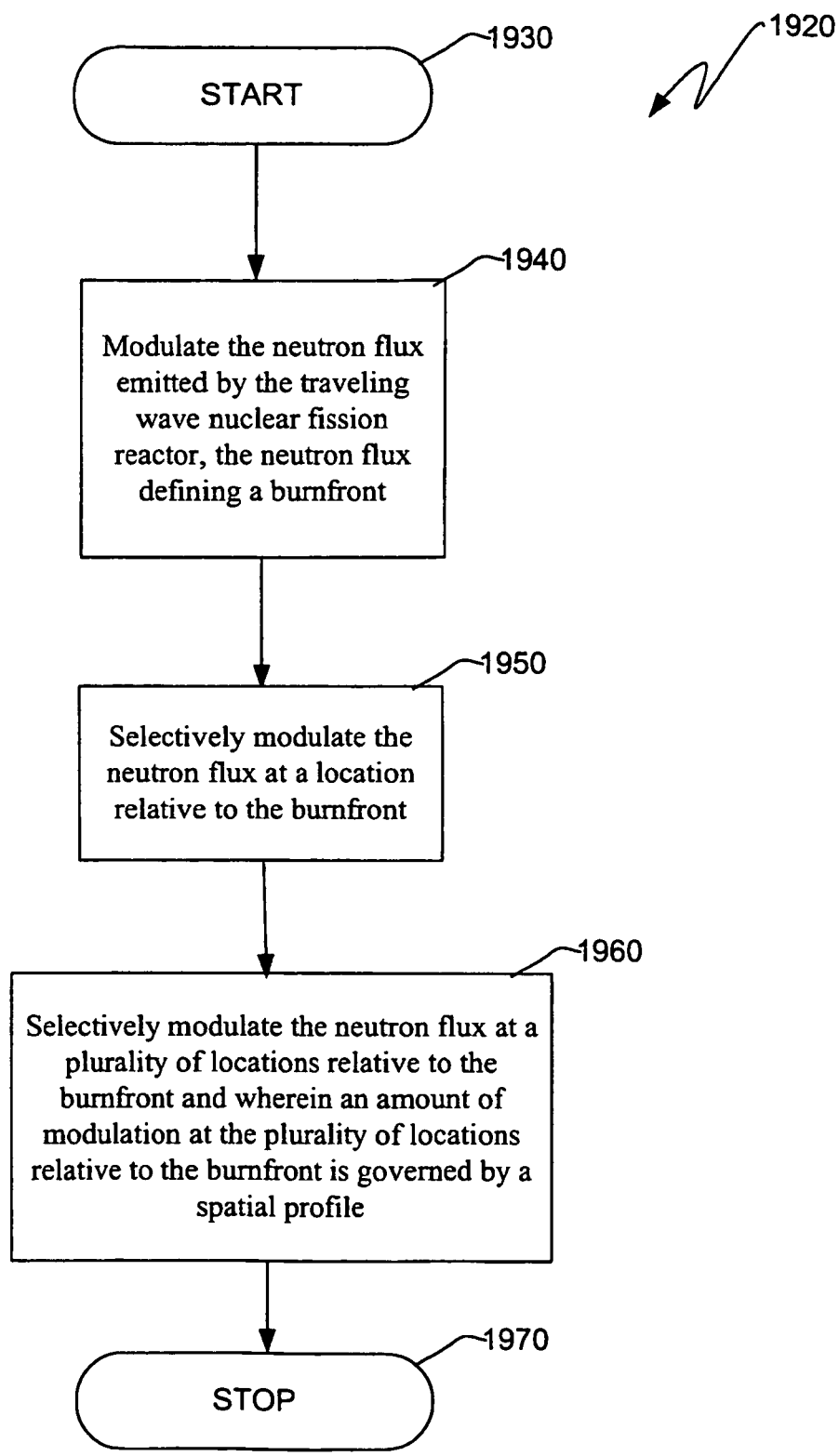

Referring to FIG. 47, an illustrative method 1920 for controlling burnup in a traveling wave nuclear fission reactor capable of emitting a neutron flux starts at a block 1930. At a block 1940, the method comprises modulating the neutron flux emitted by the traveling wave nuclear fission reactor, the neutron flux defining a burnfront. The neutron flux is selectively modulated at a location relative to the burnfront at a block 1950. At a block 1960, the neutron flux is selectively modulated at a plurality of locations relative to the burnfront and wherein an amount of modulation at the plurality of locations relative to the burnfront is governed by a spatial profile. The method stops at a block 1970.

Figure 48:
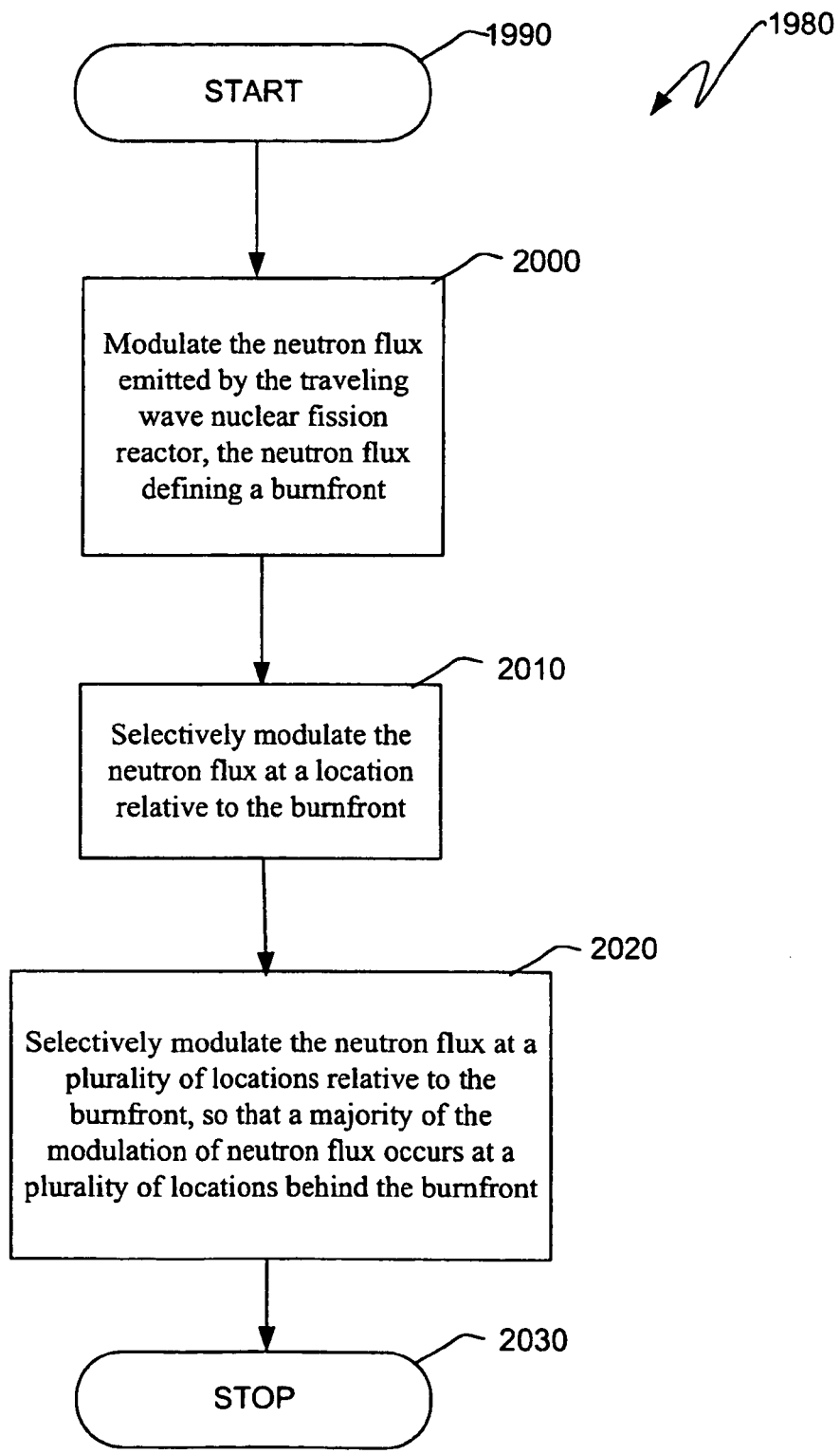

Referring to FIG. 48, an illustrative method 1980 for controlling burnup in a traveling wave nuclear fission reactor capable of emitting a neutron flux starts at a block 1990. At a block 2000, the method comprises modulating the neutron flux emitted by the traveling wave nuclear fission reactor, the neutron flux defining a burnfront. The neutron flux is selectively modulated at a location relative to the burnfront at a block 2010. At a block 2020, the neutron flux is selectively modulated at a plurality of locations relative to the burnfront, so that a majority of the modulation of neutron flux occurs at a plurality of locations behind the burnfront. The method stops at a block 2030.

Figure 49:
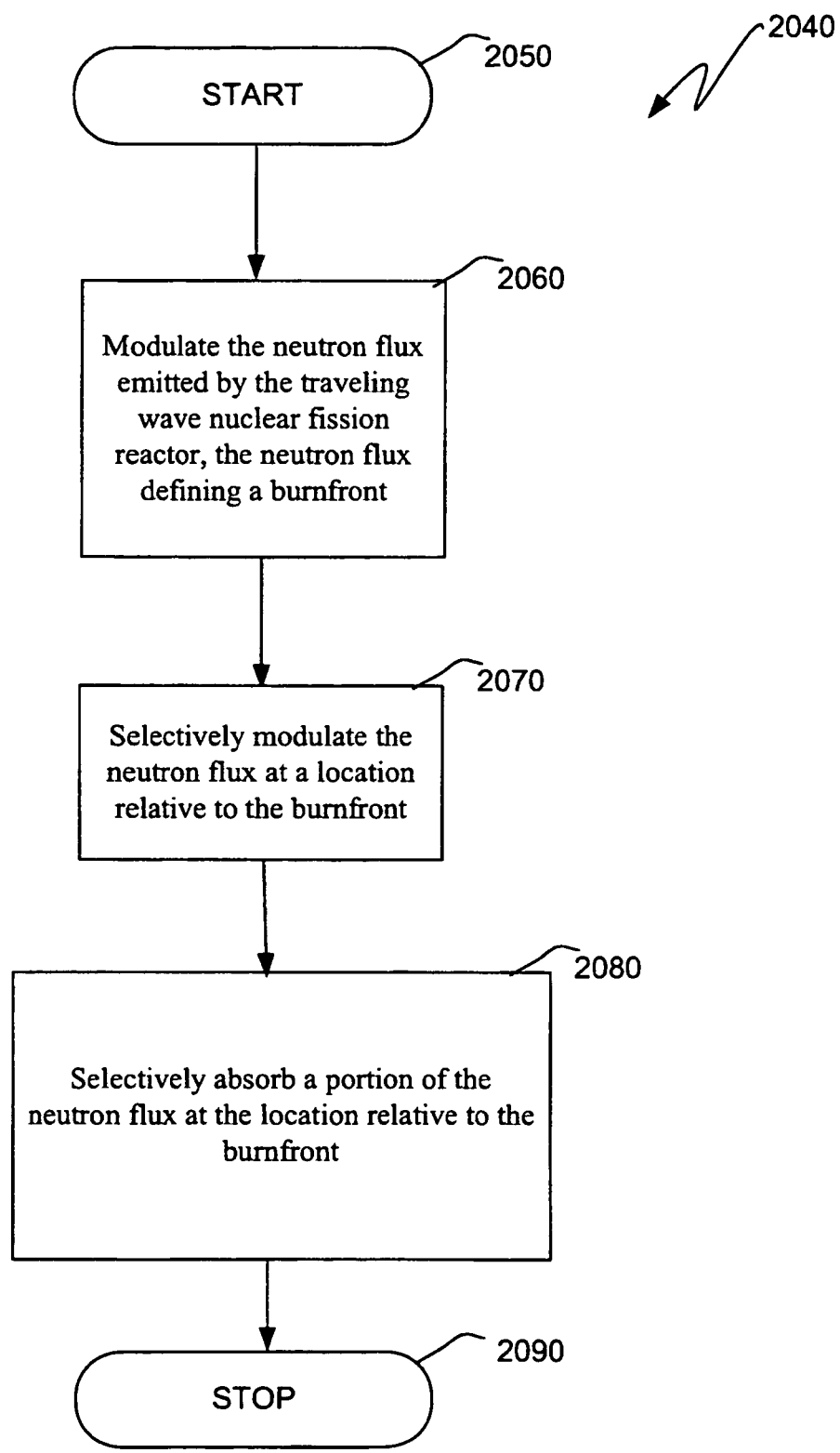

Referring to FIG. 49, an illustrative method 2040 for controlling burnup in a traveling wave nuclear fission reactor capable of emitting a neutron flux starts at a block 2050. At a block 2060, the method comprises modulating the neutron flux emitted by the traveling wave nuclear fission reactor, the neutron flux defining a burnfront. The neutron flux is selectively modulated at a location relative to the burnfront at a block 2070. At a block 2080, a portion of the neutron flux is selectively absorbed at a location relative to the burnfront. The method stops at a block 2090.

Figure 50:
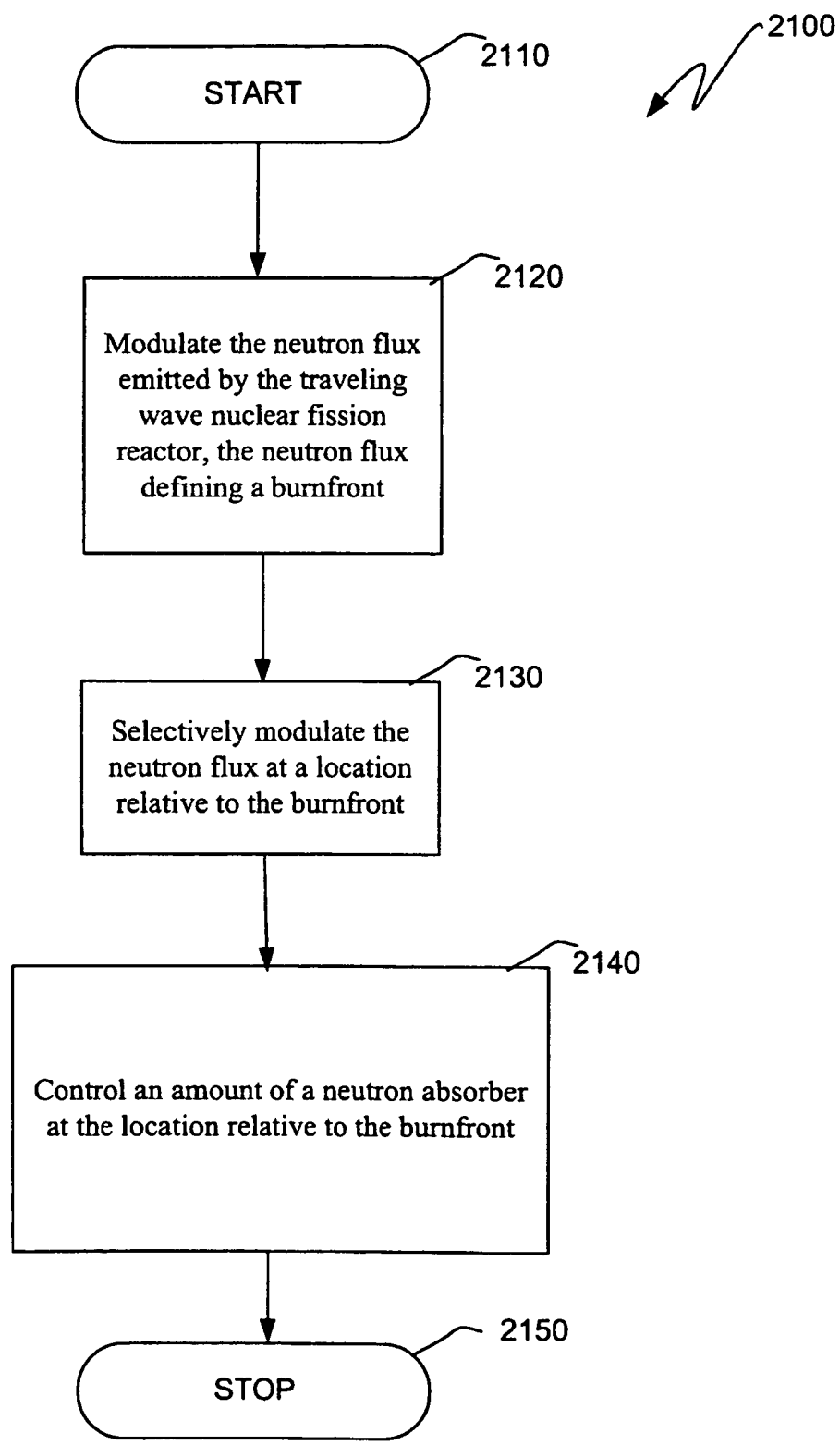

Referring to FIG. 50, an illustrative method 2100 for controlling burnup in a traveling wave nuclear fission reactor capable of emitting a neutron flux starts at a block 2110. At a block 2120, the method comprises modulating the neutron flux emitted by the traveling wave nuclear fission reactor, the neutron flux defining a burnfront. The neutron flux is selectively modulated at a location relative to the burnfront at a block 2130. At a block 2140, an amount of a neutron absorber at the location relative to the burnfront is controlled. The method stops at a block 2150.

Figure 51:
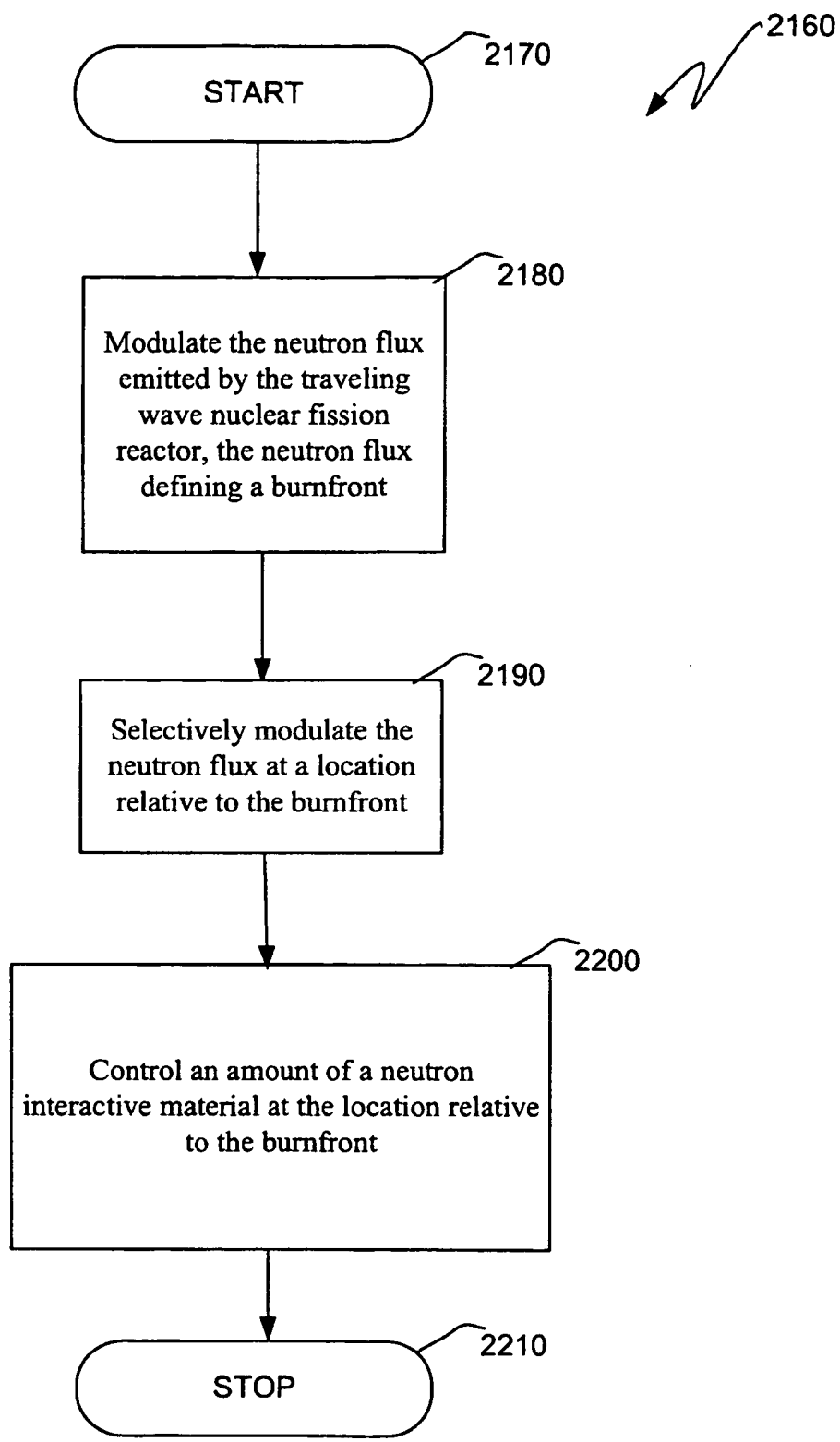

Referring to FIG. 51, an illustrative method 2160 for controlling burnup in a traveling wave nuclear fission reactor capable of emitting a neutron flux starts at a block 2170. At a block 2180, the method comprises modulating the neutron flux emitted by the traveling wave nuclear fission reactor, the neutron flux defining a burnfront. The neutron flux is selectively modulated at a location relative to the burnfront at a block 2190. At a block 2200, an amount of a neutron interactive material is controlled at the location relative to the burnfront. The method stops at a block 2210.

Figure 52:
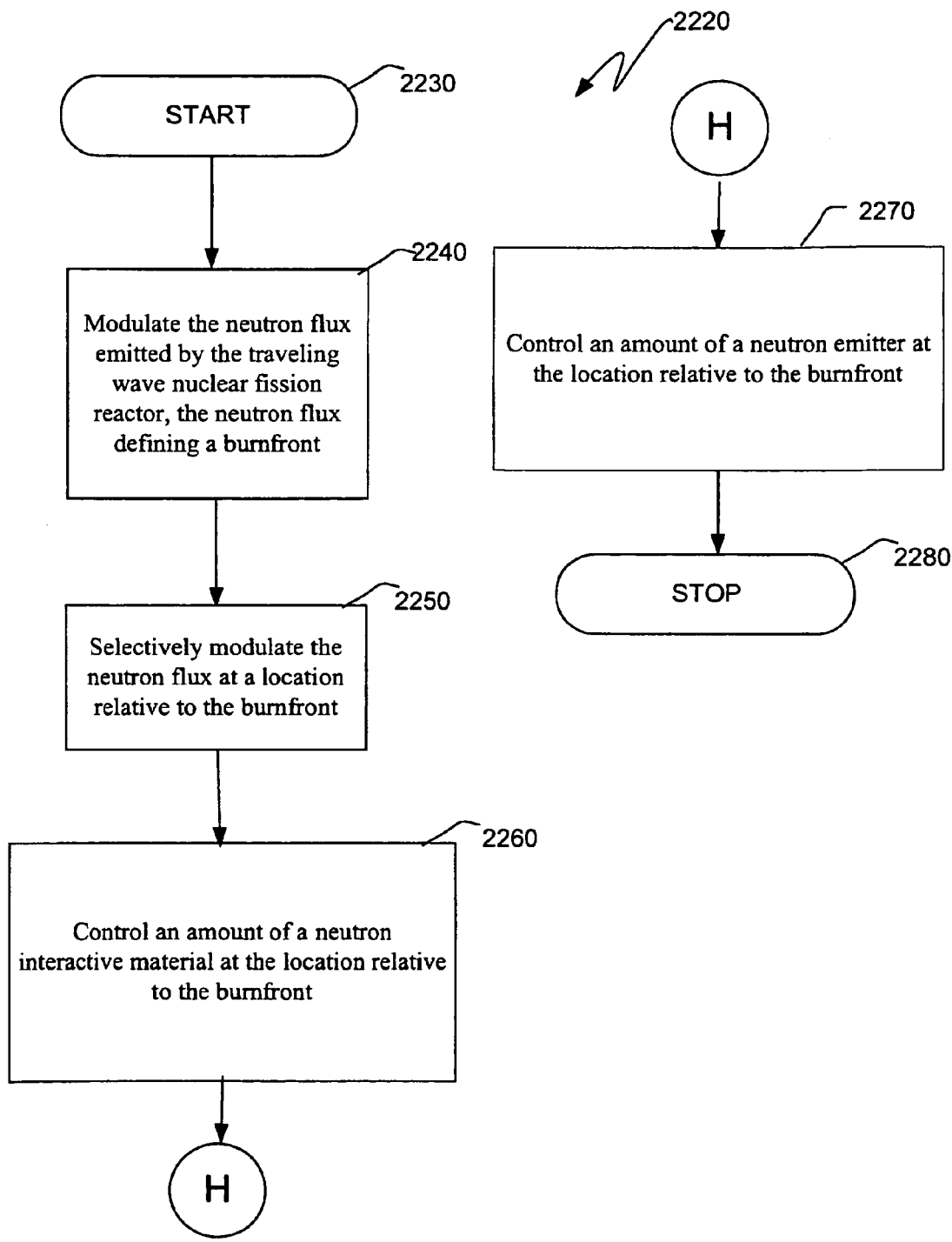

Referring to FIG. 52, an illustrative method 2220 for controlling burnup in a traveling wave nuclear fission reactor capable of emitting a neutron flux starts at a block 2230. At a block 2240, the method comprises modulating the neutron flux emitted by the traveling wave nuclear fission reactor, the neutron flux defining a burnfront. The neutron flux is selectively modulated at a location relative to the burnfront at a block 2250. At a block 2260, an amount of a neutron interactive material is controlled at the location relative to the burnfront. At a block 2270, an amount of a neutron emitter is controlled at the location relative to the burnfront. The method stops at a block 2280.

Figure 53:
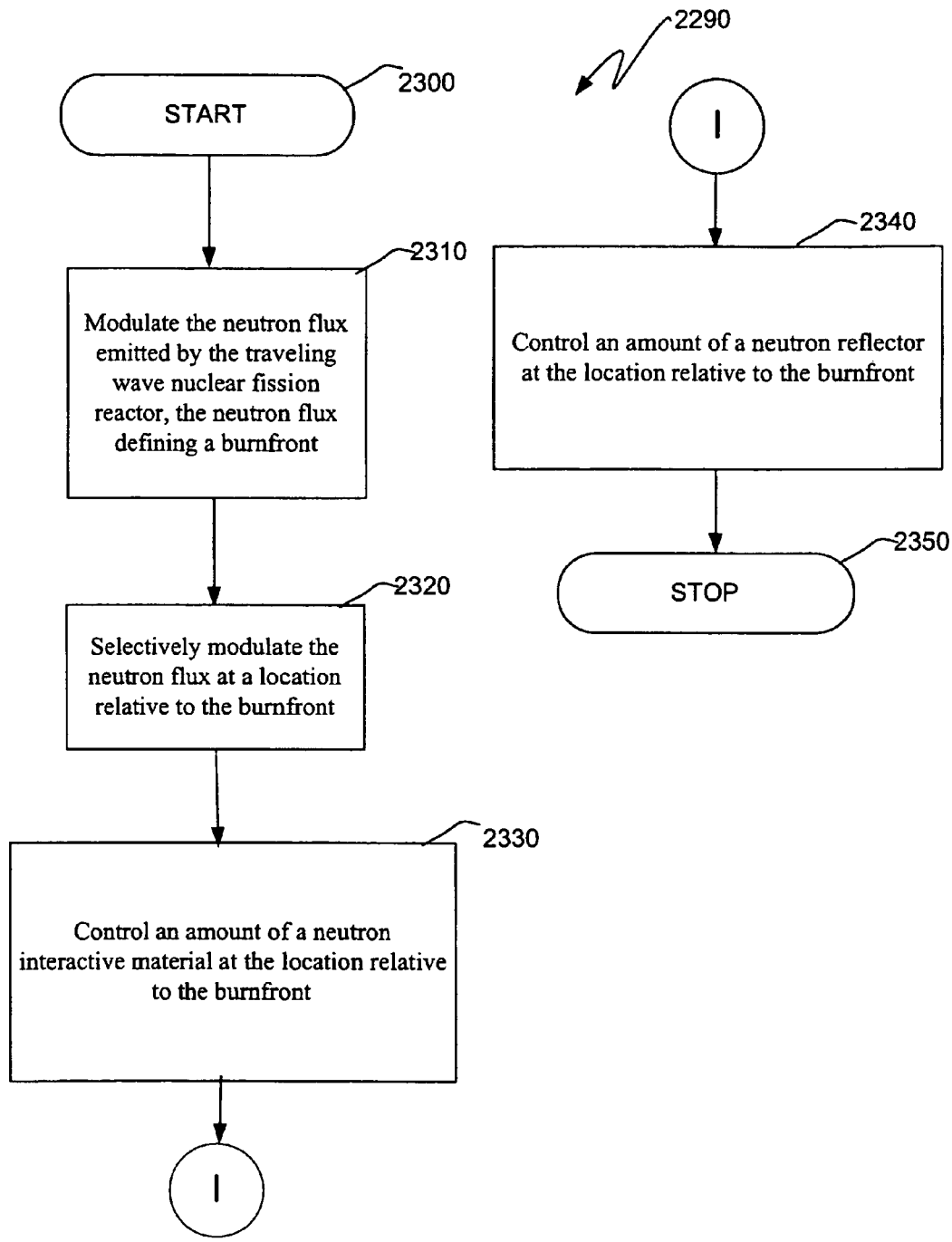

Referring to FIG. 53, an illustrative method 2290 for controlling burnup in a traveling wave nuclear fission reactor capable of emitting a neutron flux starts at a block 2300. At a block 2310, the method comprises modulating the neutron flux emitted by the traveling wave nuclear fission reactor, the neutron flux defining a burnfront. The neutron flux is selectively modulated at a location relative to the burnfront at a block 2320. At a block 2330, an amount of a neutron interactive material is controlled at the location relative to the burnfront. At a block 2340, an amount of a neutron reflector is controlled at the location relative to the burnfront. The method stops at a block 2350.

Figure 54:
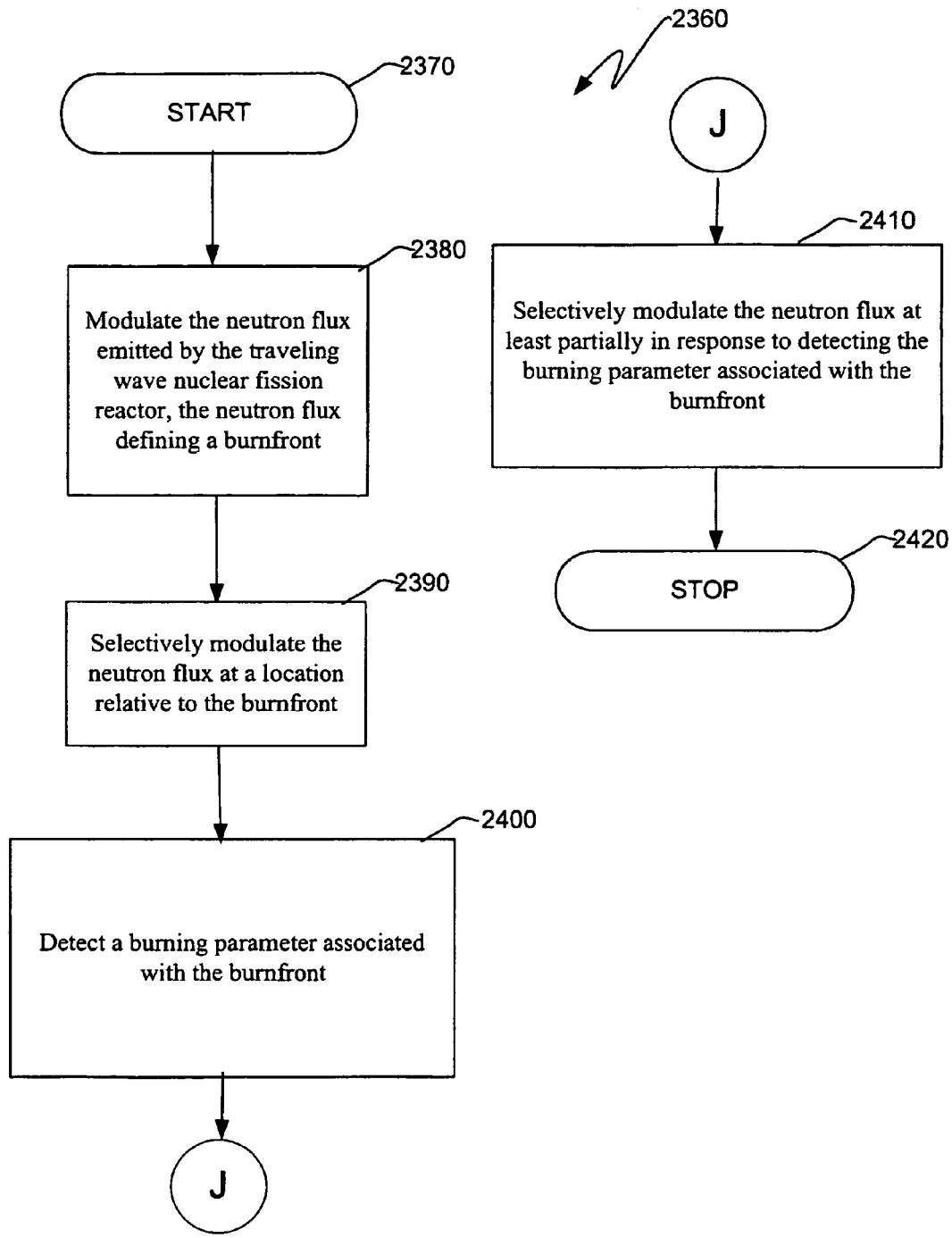

Referring to FIG. 54, an illustrative method 2360 for controlling burnup in a traveling wave nuclear fission reactor capable of emitting a neutron flux starts at block 2370. At a block 2380, the method comprises modulating the neutron flux emitted by the traveling wave nuclear fission reactor, the neutron flux defining a burnfront. The neutron flux is selectively modulated at a location relative to the burnfront at a block 2390. At a block 2400, a burning parameter associated with the burnfront is detected. At a block 2410, the neutron flux is selectively modulated at least partially in response to detecting the burning parameter associated with the burnfront. The method stops at a block 2420.

Figure 55:
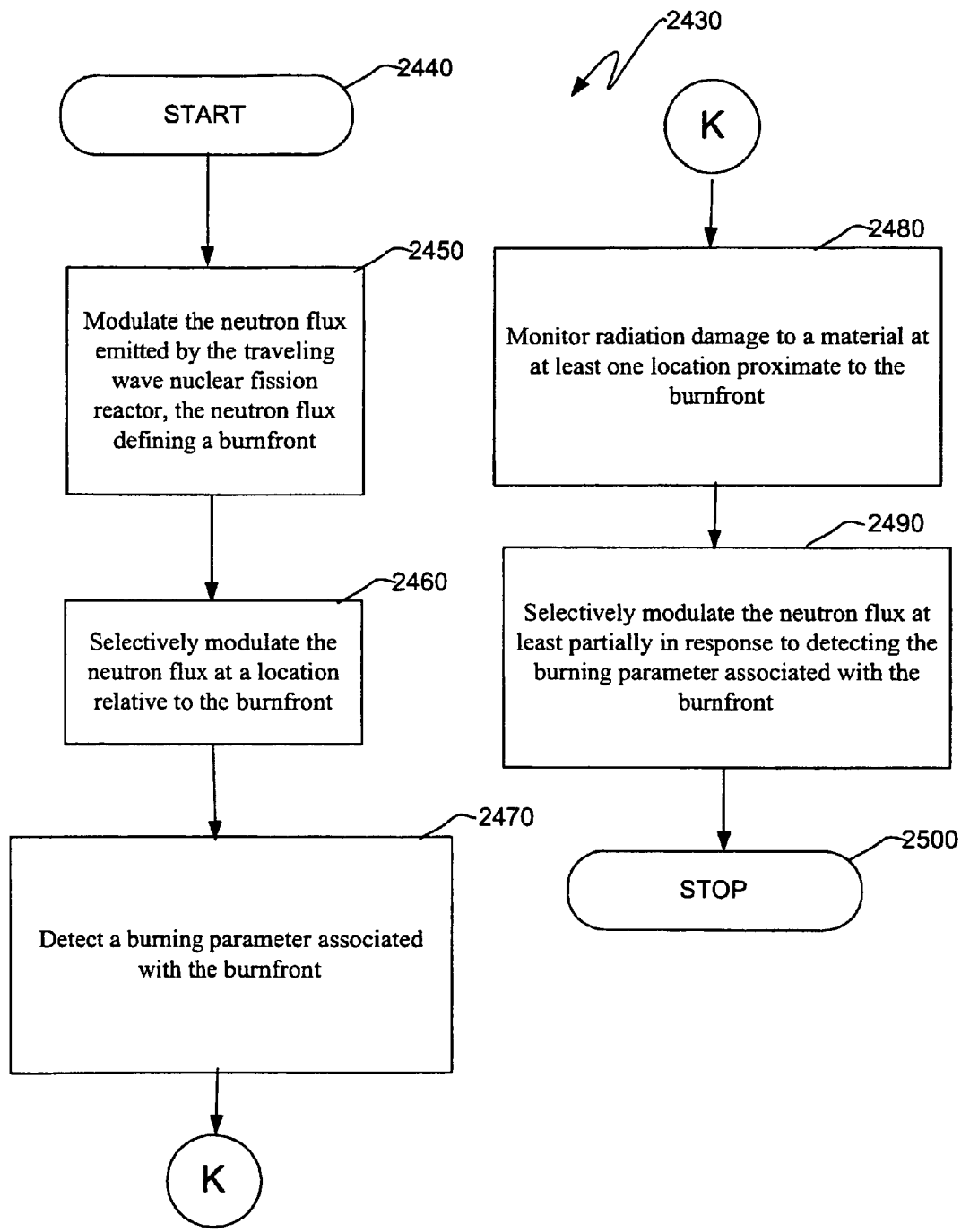

Referring to FIG. 55, an illustrative method 2430 for controlling burnup in a traveling wave nuclear fission reactor capable of emitting a neutron flux starts at a block 2440. At a block 2450, the method comprises modulating the neutron flux emitted by the traveling wave nuclear fission reactor, the neutron flux defining a burnfront. The neutron flux is selectively modulated at a location relative to the burnfront at a block 2460. At a block 2470, a burning parameter associated with the burnfront is detected. At a block 2480, radiation damage to a material at least one location proximate to the burnfront is monitored. At a block 2490, the neutron flux is selectively modulated at least partially in response to detecting the burning parameter associated with the burnfront. The method stops at a block 2500.

Figure 56:
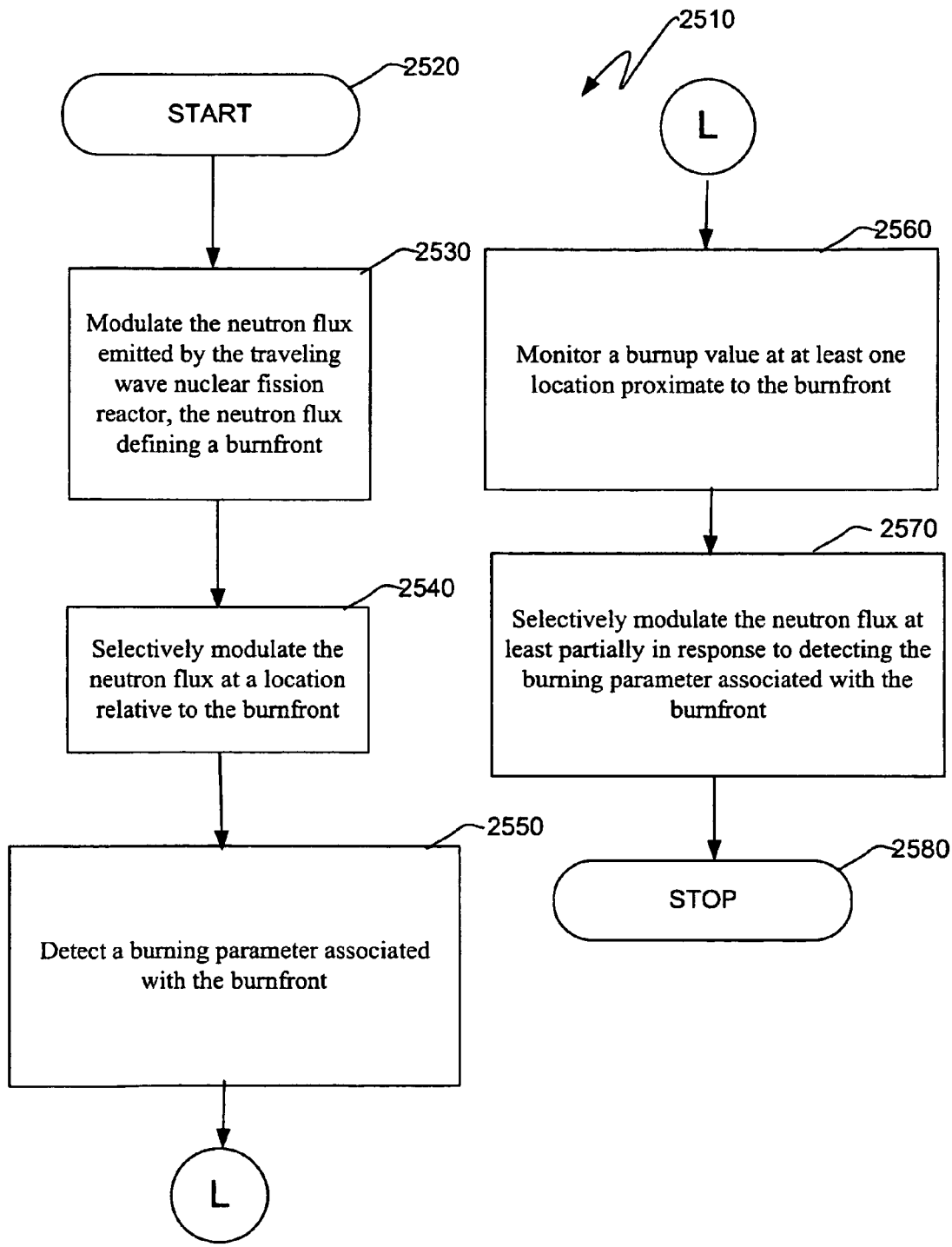

Referring to FIG. 56, an illustrative method 2510 for controlling burnup in a traveling wave nuclear fission reactor capable of emitting a neutron flux starts at a block 2520. At a block 2530, the method comprises modulating the neutron flux emitted by the traveling wave nuclear fission reactor, the neutron flux defining a burnfront. The neutron flux is selectively modulated at a location relative to the burnfront at a block 2540. At a block 2550, a burning parameter associated with the burnfront is detected. At a block 2560, a burnup value is monitored at least one location proximate to the burnfront. At a block 2570, the neutron flux is selectively modulated at least partially in response to detecting the burning parameter associated with the burnfront. The method stops at a block 2580.

Figure 57:
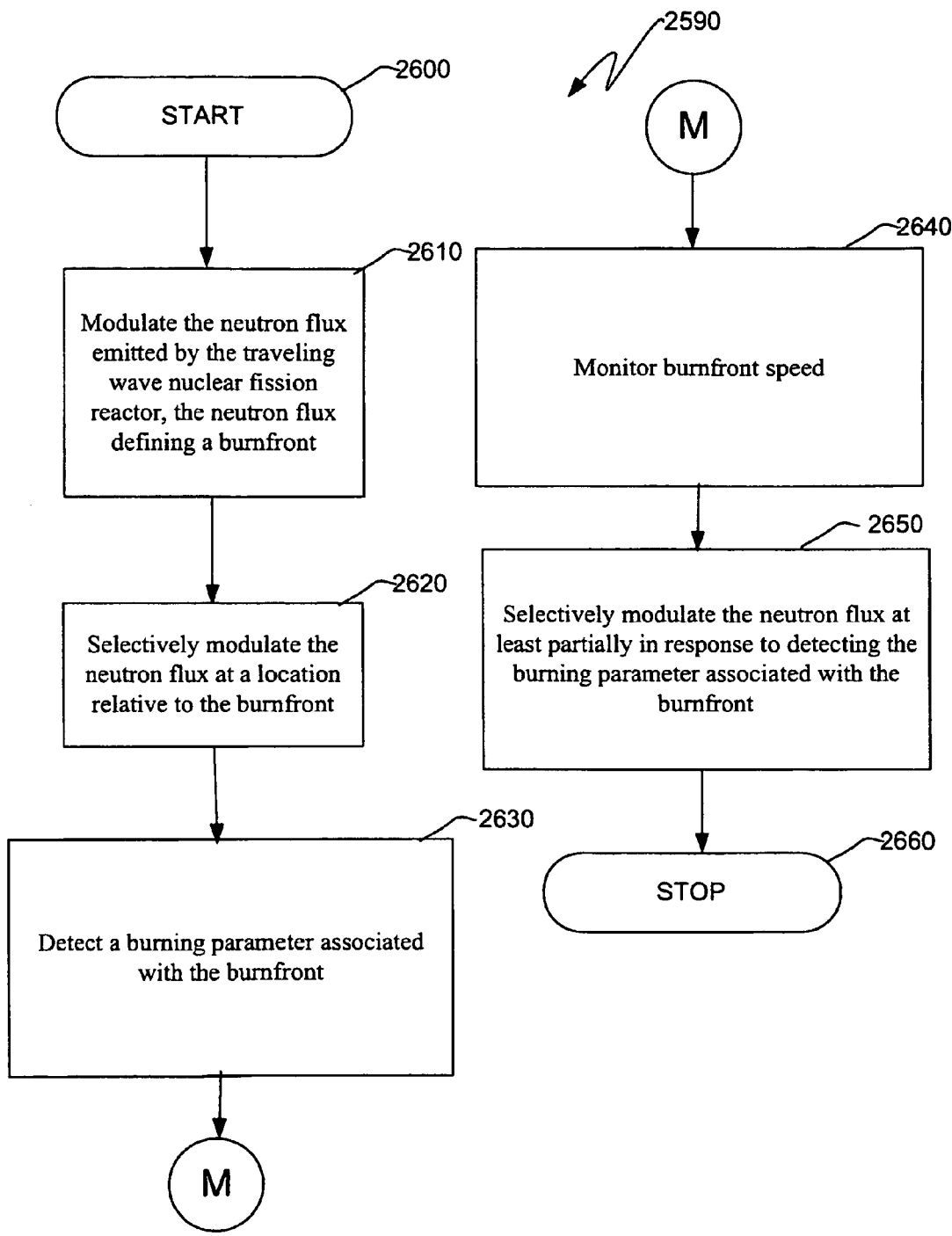

Referring to FIG. 57, an illustrative method 2590 for controlling burnup in a traveling wave nuclear fission reactor capable of emitting a neutron flux starts at a block 2600. At a block 2610, the method comprises modulating the neutron flux emitted by the traveling wave nuclear fission reactor, the neutron flux defining a burnfront. The neutron flux is selectively modulated at a location relative to the burnfront at a block 2620. At a block 2630, a burning parameter associated with the burnfront is detected. At a block 2640, burnup velocity is monitored. At a block 2650, the neutron flux is selectively modulated at least partially in response to detecting the burning parameter associated with the burnfront. The method stops at a block 2660.

Figure 58:
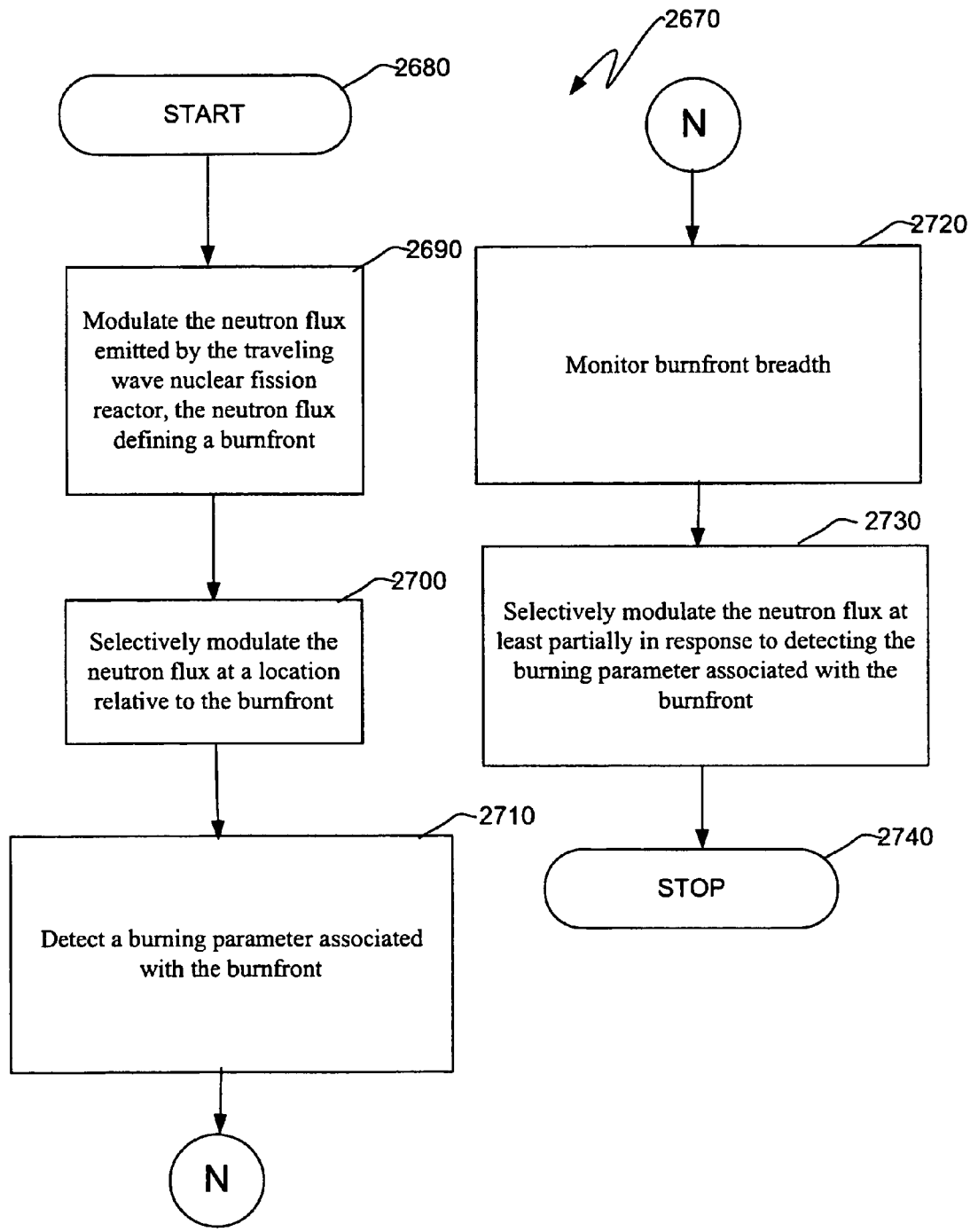

Referring to FIG. 58, an illustrative method 2670 for controlling burnup in a traveling wave nuclear fission reactor capable of emitting a neutron flux starts at a block 2680. At a block 2690, the method comprises modulating the neutron flux emitted by the traveling wave nuclear fission reactor, the neutron flux defining a burnfront. The neutron flux is selectively modulated at a location relative to the burnfront at a block 2700. At a block 2710, a burning parameter associated with the burnfront is detected. At a block 2720, burnfront breadth is monitored. At a block 2730, the neutron flux is selectively modulated at least partially in response to detecting the burning parameter associated with the burnfront. The method stops at a block 2740.

Figure 59:
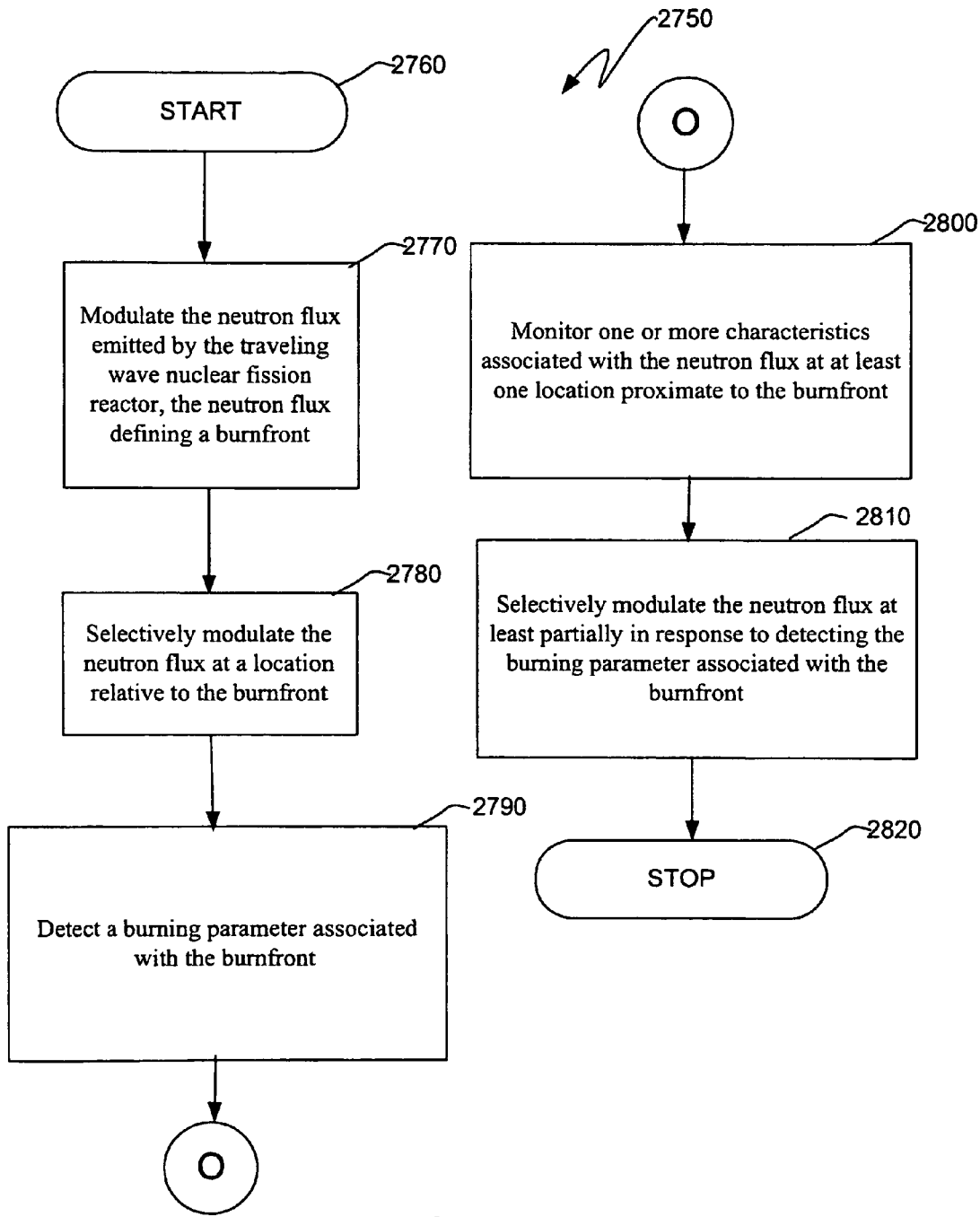

Referring to FIG. 59, an illustrative method 2750 for controlling burnup in a traveling wave nuclear fission reactor capable of emitting a neutron flux starts at a block 2760. At a block 2770, the method comprises modulating the neutron flux emitted by the traveling wave nuclear fission reactor, the neutron flux defining a burnfront. The neutron flux is selectively modulated at a location relative to the burnfront at a block 2780. At a block 2790, a burning parameter associated with the burnfront is detected. At a block 2800, one or more characteristics associated with the neutron flux are monitored at least one location proximate to the burnfront. At a block 2810, the neutron flux is selectively modulated at least partially in response to detecting the burning parameter associated with the burnfront. The method stops at a block 2820.

Figure 60:
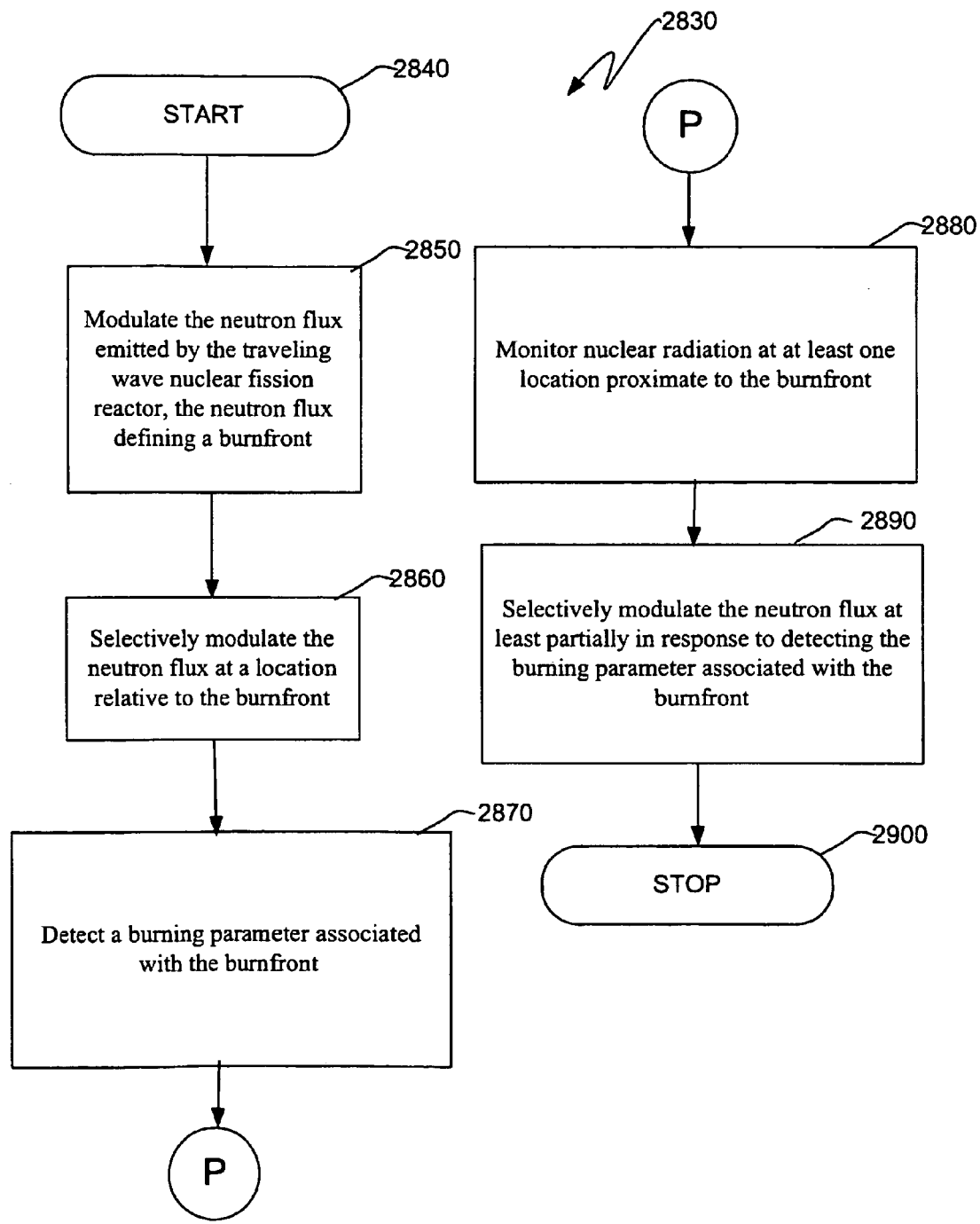

Referring to FIG. 60, an illustrative method 2830 for controlling burnup in a traveling wave nuclear fission reactor capable of emitting a neutron flux starts at a block 2840. At a block 2850, the method comprises modulating the neutron flux emitted by the traveling wave nuclear fission reactor, the neutron flux defining a burnfront. The neutron flux is selectively modulated at a location relative to the burnfront at a block 2860. At a block 2870, a burning parameter associated with the burnfront is detected. At a block 2880, nuclear radiation is monitored at least one location proximate to the burnfront. At a block 2890, the neutron flux is selectively modulated at least partially in response to detecting the burning parameter associated with the burnfront. The method stops at a block 2900.

Figure 61:
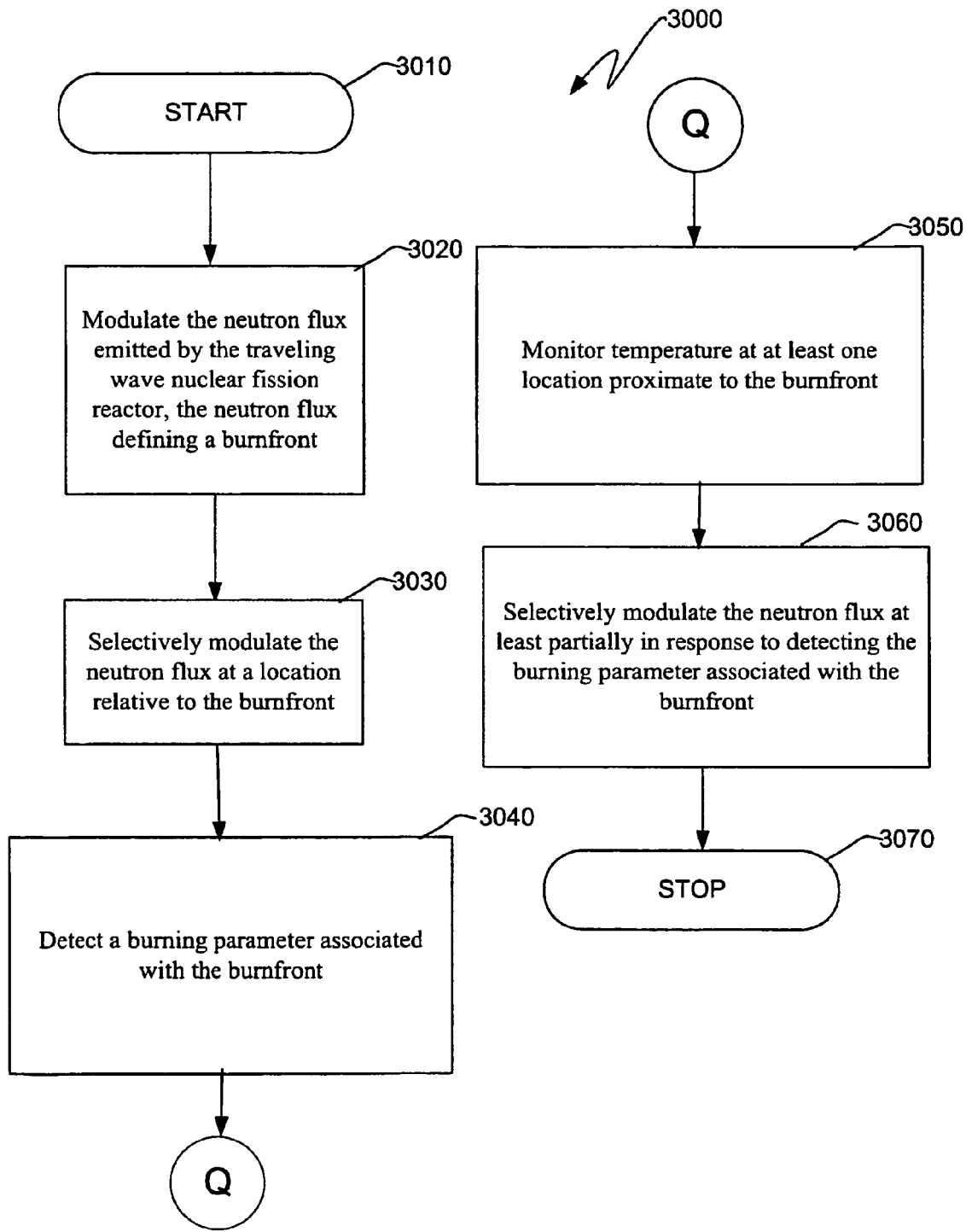

Referring to FIG. 61, an illustrative method 3000 for controlling burnup in a traveling wave nuclear fission reactor capable of emitting a neutron flux starts at a block 3010. At a block 3020, the method comprises modulating the neutron flux emitted by the traveling wave nuclear fission reactor, the neutron flux defining a burnfront. The neutron flux is selectively modulated at a location relative to the burnfront at a block 3030. At a block 3040, a burning parameter associated with the burnfront is detected. At a block 3050, temperature is monitored at least one location proximate to the burnfront. At a block 3060, the neutron flux is selectively modulated at least partially in response to detecting the burning parameter associated with the burnfront. The method stops at a block 3070.

Figure 62:
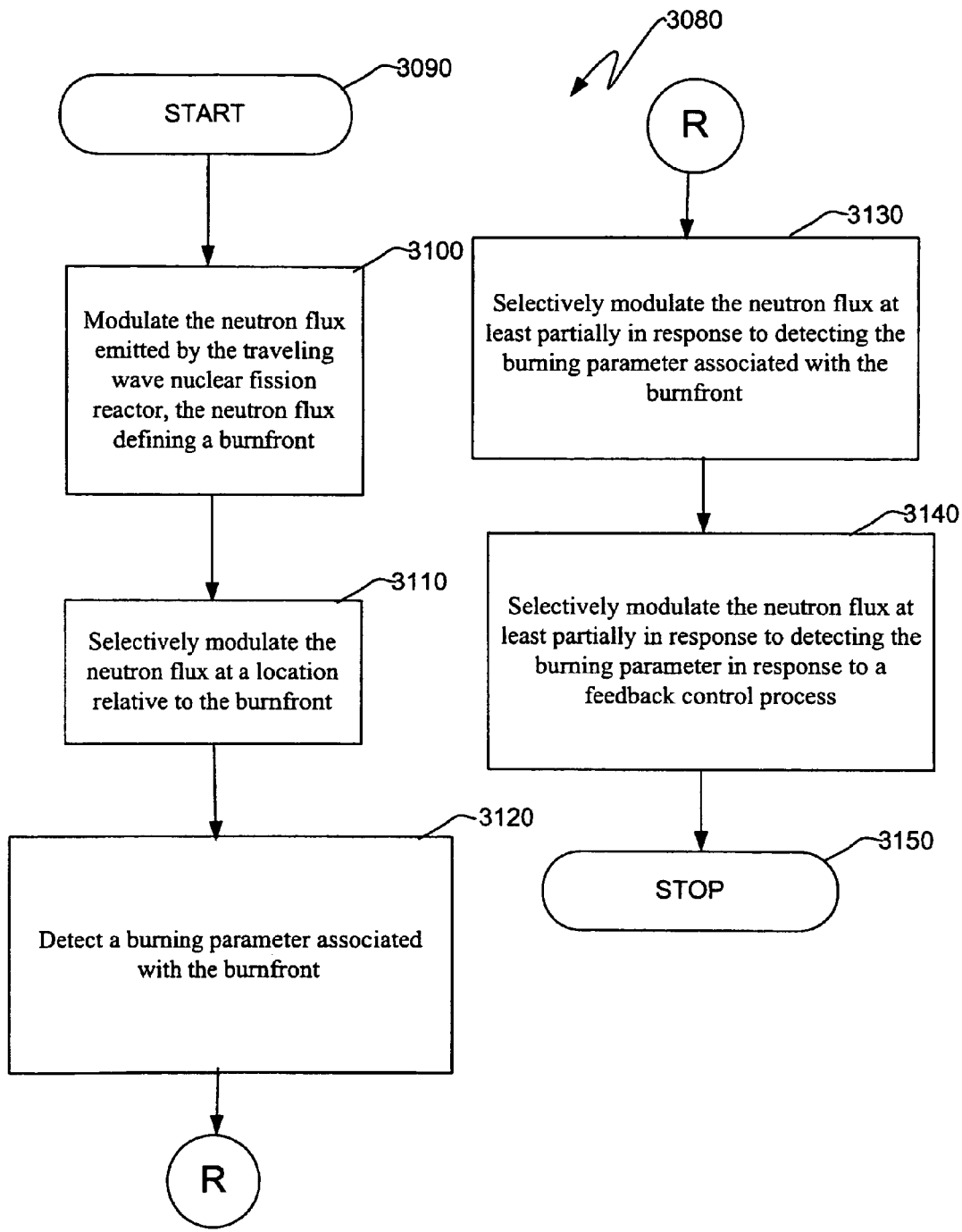

Referring to FIG. 62, an illustrative method 3080 for controlling burnup in a traveling wave nuclear fission reactor capable of emitting a neutron flux starts at a block 3090. At a block 3100, the method comprises modulating the neutron flux emitted by the traveling wave nuclear fission reactor, the neutron flux defining a burnfront. The neutron flux is selectively modulated at a location relative to the burnfront at a block 3110. At a block 3120, a burning parameter associated with the burnfront is detected. At a block 3130, neutron flux is selectively modulated at least partially in response to detecting the burning parameter associated with the burnfront. At a block 3140, the neutron flux is selectively modulated at least partially in response to detecting the burning parameter in response to a feedback control process. The method stops at a block 3150.

Figure 63:
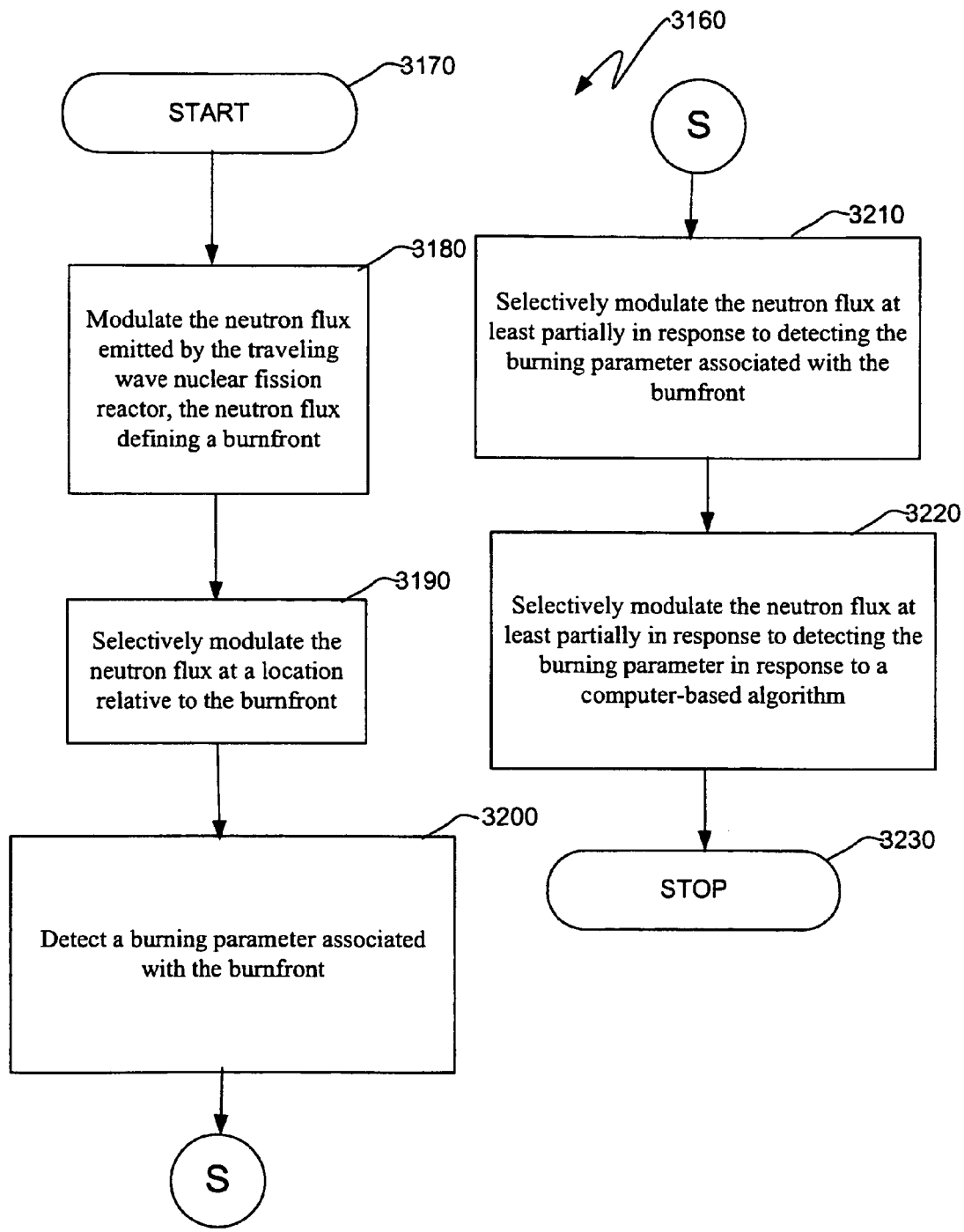

Referring to FIG. 63, an illustrative method 3160 for controlling burnup in a traveling wave nuclear fission reactor capable of emitting a neutron flux starts at a block 3170. At a block 3180, the method comprises modulating the neutron flux emitted by the traveling wave nuclear fission reactor, the neutron flux defining a burnfront. The neutron flux is selectively modulated at a location relative to the burnfront at a block 3190. At a block 3200, a burning parameter associated with the burnfront is detected. At a block 3210, the neutron flux is selectively modulated at least partially in response to detecting the burning parameter associated with the burnfront. At a block 3220, the neutron flux is selectively modulated at least partially in response to detecting the burning parameter in response to a computer-based algorithm. The method stops at a block 3230.

Figure 64:
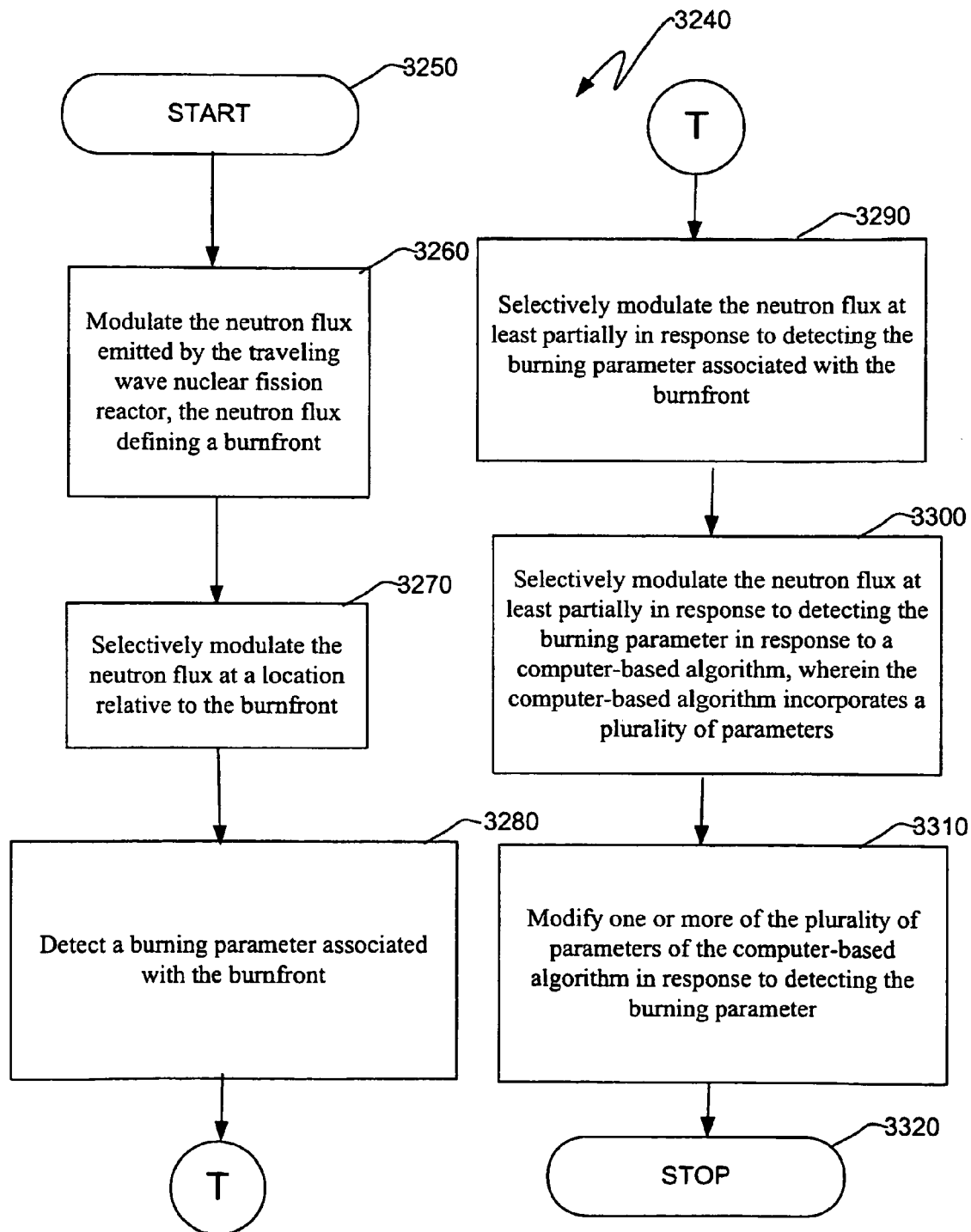

Referring to FIG. 64, an illustrative method 3240 for controlling burnup in a traveling wave nuclear fission reactor capable of emitting a neutron flux starts at a block 3250. At a block 3260, the method comprises modulating the neutron flux emitted by the traveling wave nuclear fission reactor, the neutron flux defining a burnfront. The neutron flux is selectively modulated at a location relative to the burnfront at a block 3270. At a block 3280, a burning parameter associated with the burnfront is detected. At a block 3290, the neutron flux is selectively modulated at least partially in response to detecting the burning parameter associated with the burnfront. At a block 3300, the neutron flux is selectively modulated at least partially in response to detecting the burning parameter in response to a computer-based algorithm, wherein the computer-based algorithm incorporates a plurality of parameters. At a block 3310, one or more of the plurality of parameters of the computer-based algorithm is modified in response to detecting the burning parameter. The method stops at a block 3320.

Figure 65:
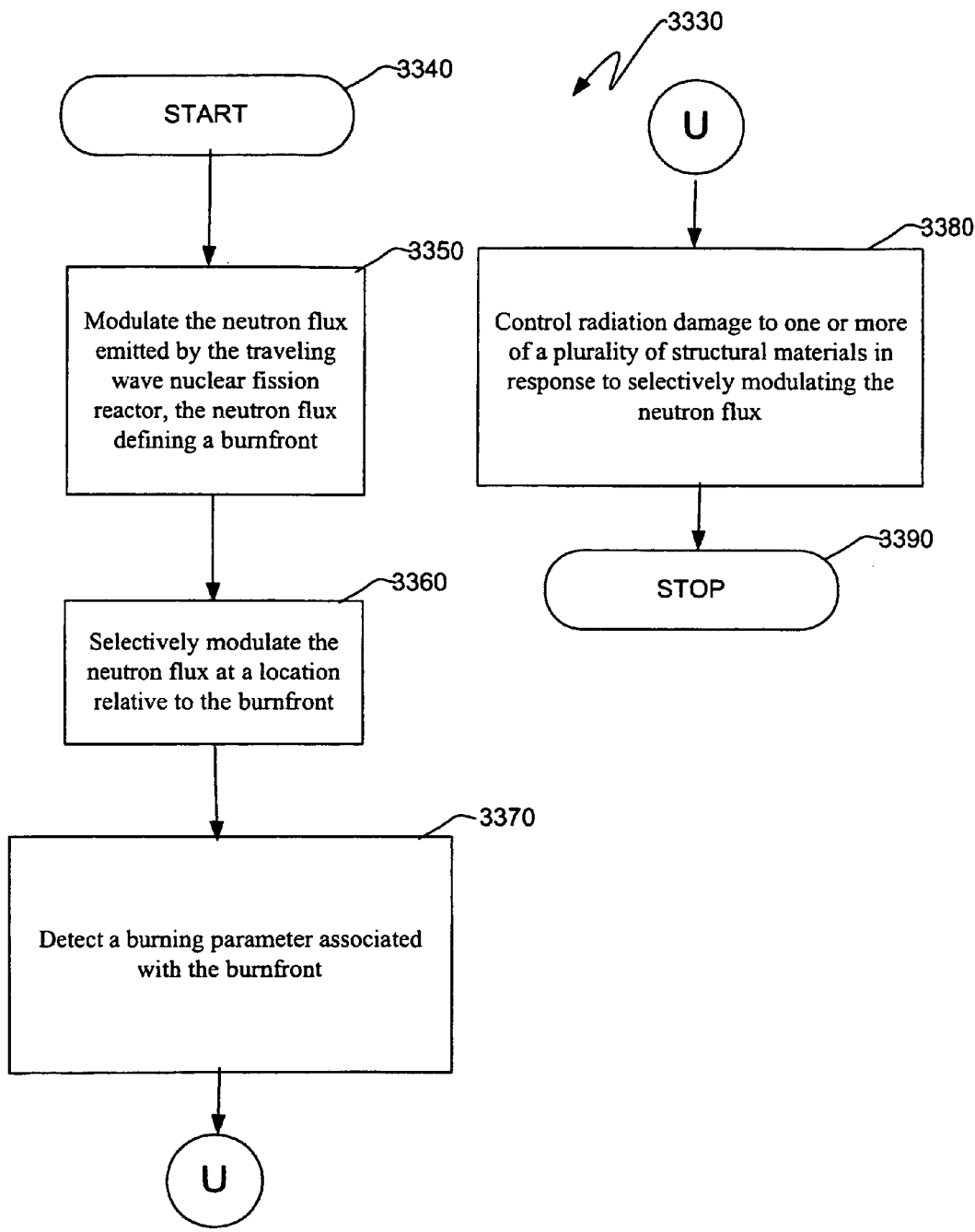

Referring to FIG. 65, an illustrative method 3330 for controlling burnup in a traveling wave nuclear fission reactor capable of emitting a neutron flux starts at a block 3340. At a block 3350, the method comprises modulating the neutron flux emitted by the traveling wave nuclear fission reactor, the neutron flux defining a burnfront. The neutron flux is selectively modulated at a location relative to the burnfront at a block 3360. At a block 3370, a burning parameter associated with the burnfront is detected. At a block 3380, radiation damage to one or more of a plurality of structural materials is controlled in response to selectively modulating the neutron flux. The method stops at a block 3390.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Moreover, those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Therefore, what are provided are a traveling wave nuclear fission reactor, fuel assembly, and a method of controlling burnup therein.

While various aspects and embodiments have been disclosed herein, other aspects and embodiments will be apparent to those skilled in the art. For example, each of the embodiments of the nuclear fission reactor fuel assembly may be disposed in a thermal neutron reactor, a fast neutron reactor, a neutron breeder reactor, a fast neutron breeder reactor, as well as the previously mentioned traveling wave reactor. Thus, each of the embodiments of the fuel assembly is versatile enough to be beneficially used in various nuclear reactor designs.

Moreover, the various aspects and embodiments disclosed herein are for purposes of illustration and are not intended to be limiting, with the true scope and spirit being indicated by the following claims.

What is claimed is:

1. A traveling wave nuclear fission reactor, comprising:
a nuclear reactor core;
at least one nuclear fission reactor fuel assembly disposed in said reactor core, said nuclear fission reactor fuel assembly being configured to generate a burnfront emitting a neutron flux, having a burning parameter, and achieving a burnup value at or below a predetermined burnup value;
a neutron flux monitoring system;
one or more neutron absorber control rods disposable in the nuclear fission reactor fuel assembly;
a controller configured to implement a control function responsive to the neutron flux monitoring system to selectively control an amount of the one or more neutron absorber control rods at a location relative to the burnfront for achieving the burnup value at or below the predetermined burnup value, including increasing an amount of the one or more neutron absorber control rods at a rear location behind the burnfront such that a burnup value at the burnfront increases and a burnup value behind the burnfront decreases; and a drive motor configured to dispose the one or more neutron absorber control rods in response to the controller implementing the control function.

2. The traveling wave nuclear fission reactor of claim 1, wherein the controller is configured to implement the control function responsive to the neutron flux monitoring system to selectively control the amount of the one or more neutron absorber control rods at the rear location behind the burnfront for achieving the burnup value at or below the predetermined burnup value.

3. The traveling wave nuclear fission reactor of claim 1, wherein said controller is capable controlling an amount of the one or more neutron absorber control rods for achieving neutron absorption at a plurality of locations relative to the burnfront and wherein a majority of the neutron absorption due to the one or more neutron absorber control rods being at a plurality of rear locations behind the burnfront.

4. The traveling wave nuclear fission reactor of claim 1, wherein said nuclear fission reactor fuel assembly is capable of controlling an amount of a neutron reflector at a location behind the burnfront for achieving the burnup value at or below the predetermined burnup value.

5. The traveling wave nuclear fission reactor of claim 4, wherein said nuclear fission reactor fuel assembly is capable of controlling the amount of a neutron reflector for achieving neutron reflection at a plurality of locations relative to the burnfront and wherein a majority of the neutron reflection due to the neutron reflector is at a plurality of locations behind the burnfront.

6. The traveling wave nuclear fission reactor of claim 1, further comprising a neutron emitter capable of being moved from a first location behind the burnfront to a second location behind the burnfront for achieving the burnup value at or below the predetermined burnup value.

7. The traveling wave nuclear fission reactor of claim 1, further comprising a neutron emitter capable of being moved from a first location behind the burnfront to a second location proximate to the burnfront for achieving the burnup value at or below the predetermined burnup value.

8. The traveling wave nuclear fission reactor of claim 1, further comprising a neutron emitter capable of being moved from a first location behind the burnfront to a second location in front of the burnfront for achieving the burnup value at or below the predetermined burnup value.

9. The traveling wave nuclear fission reactor of claim 1, wherein said nuclear fission reactor fuel assembly is capable of controlling radiation damage to one or more of a plurality of structural materials in response to controlling the burnup value in the traveling wave nuclear fission reactor.

10. The traveling wave nuclear fission reactor of claim 9, wherein said nuclear fission reactor fuel assembly is capable of controlling the radiation damage by achieving the radiation damage value at or below a predetermined radiation damage value.

11. The traveling wave nuclear fission reactor of claim 10, further comprising a neutron emitter capable of being moved from a first location behind the burnfront to a second location behind the burnfront for achieving the radiation damage value at or below the predetermined radiation damage value.

12. The traveling wave nuclear fission reactor of claim 10, further comprising a neutron emitter capable of being moved from a first location behind the burnfront to a second location proximate to the burnfront for achieving the radiation damage value at or below the predetermined radiation damage value.

13. The traveling wave nuclear fission reactor of claim 10, further comprising a neutron emitter capable of being moved from a first location behind the burnfront to a second location in front of the burnfront for achieving the radiation damage value at or below the predetermined radiation damage value.

14. The traveling wave nuclear fission reactor of claim 1, wherein said controller is configured to implement the control function responsive to the neutron flux monitoring system to selectively control the amount of the one or more neutron absorber control rods at the rear location behind the burnfront for achieving a radiation damage value at or below a predetermined radiation damage value.

15. The traveling wave nuclear fission reactor of claim 14, wherein said controller is configured to implement the control function responsive to the neutron flux monitoring system to selectively control the amount of the one or more neutron absorber control rods for achieving neutron absorption at a plurality of locations relative to the burnfront for obtaining the radiation damage value at or below a predetermined radiation damage value and wherein a majority of the neutron absorption due to the one or more neutron absorber control rods is at a plurality of locations behind the burnfront.

16. The traveling wave nuclear fission reactor of claim 1, wherein said nuclear fission reactor fuel assembly is capable of controlling an amount of a neutron reflector at a location behind the burnfront for achieving a radiation damage value at or below a predetermined radiation damage value.

17. The traveling wave nuclear fission reactor of claim 16, wherein said nuclear fission reactor fuel assembly is capable of controlling the amount of the neutron reflector for achieving neutron reflection at a plurality of locations relative to the burnfront for obtaining the radiation damage value at or below a predetermined radiation damage value and wherein a majority of the neutron reflection due to the neutron reflector is at a plurality of locations behind the burnfront.

18. The traveling wave nuclear fission reactor of claim 1, wherein said controller is configured to implement the control function responsive to the neutron flux monitoring system to selectively modulate the neutron flux at a first location relative to the burnfront for modulating the neutron flux emitted by the traveling wave nuclear fission reactor.

19. The traveling wave nuclear fission reactor of claim 1, wherein said controller is configured to implement the control function responsive to the neutron flux monitoring system to selectively modulate the neutron flux at the rear location behind the burnfront for modulating the neutron flux emitted by the traveling wave nuclear fission reactor.

20. The traveling wave nuclear fission reactor of claim 1, wherein said controller is configured to implement the control function responsive to the neutron flux monitoring system to selectively modulate the neutron flux at a plurality of locations relative to the burnfront and wherein an amount of modulation at the plurality of locations relative to the burnfront is governed by a spatial profile.

21. The traveling wave nuclear fission reactor of claim 20, wherein the spatial profile is symmetric with respect to the burnfront.

22. The traveling wave nuclear fission reactor of claim 20, wherein the spatial profile is asymmetric with respect to the burnfront.

23. The traveling wave nuclear fission reactor of claim 20, wherein the spatial profile indicates an amount of neutron absorber control rod insertion versus distance from a central location of the nuclear reactor core, the spatial profile has a slope having a steepest portion and wherein the steepest portion of the slope of the spatial profile occurs at a first location behind the burnfront.

24. The traveling wave nuclear fission reactor of claim 19, wherein the controller is configured to implement the control function responsive to the neutron flux monitoring system to selectively modulate the neutron flux at the location relative to the burnfront, so that a majority of the modulation of neutron flux occurs at a plurality of locations behind the burnfront.

25. The traveling wave nuclear fission reactor of claim 1, wherein the nuclear fission reactor fuel assembly is capable of selectively absorbing a portion of the neutron flux at the rear location relative to the burnfront.

26. The traveling wave nuclear fission reactor of claim 1, wherein the one or more neutron absorber control rods comprise a material chosen from lithium, silver, indium, cadmium, boron, cobalt, hafnium, dysprosium, gadolinium, samarium, erbium, europium and mixtures thereof.

27. The traveling wave nuclear fission reactor of claim 1, wherein the one or more neutron absorber control rods comprise a compound chosen from silver-indium-cadmium alloy, boron carbide, zirconium diboride, titanium diboride, hafnium diboride, gadolinium titanate, dysprosium titanate and mixtures thereof.

28. The traveling wave nuclear fission reactor of claim 1, wherein said controller is configured to implement the control function responsive to the neutron flux monitoring system to control an amount of a neutron interactive material at a location relative to the burnfront for selectively modulating the neutron flux emitted by the nuclear fission reactor fuel assembly.

29. The traveling wave nuclear fission reactor of claim 28, wherein the controller is configured to implement the control function responsive to the neutron flux monitoring system to control an amount of a neutron emitter at the location relative to the burnfront for controlling the amount of the neutron interactive material at the location relative to the burnfront.

30. The traveling wave nuclear fission reactor of claim 29, wherein the neutron emitter includes a fertile isotope.

31. The traveling wave nuclear fission reactor of claim 29, wherein the neutron emitter includes an element capable of undergoing beta decay to become a fissile isotope.

32. The traveling wave nuclear fission reactor of claim 28, wherein said nuclear fission reactor fuel assembly is capable of controlling an amount of a neutron reflector at the location relative to the burnfront for controlling the amount of the neutron interactive material at the location relative to the burnfront.

33. The travelling wave nuclear fission reactor of claim 1, wherein the control function includes decreasing an amount of the one or more neutron absorber control rods at a forward location in front of the burnfront such that the burnup value at the burnfront increases and the burnup value behind the burnfront decreases.

34. The travelling wave nuclear fission reactor of claim 1, wherein the controller is configured to implement a second control function responsive to the neutron flux monitoring system to selectively control an amount of the one or more neutron absorber control rods at a location relative to the burnfront, including decreasing an amount of the one or more neutron absorber control rods at the rear location behind the burnfront.

35. The travelling wave nuclear fission reactor of claim 34, wherein the second control function responsive to the neutron flux monitoring system further includes increasing an amount of the one or more neutron absorber control rods at a forward location in front of the burnfront such that a direction of movement of the burnfront reverses or speed of movement of the burnfront decreases.

36. The travelling wave nuclear fission reactor of claim 1, wherein increasing an amount of the one or more neutron absorber control rods at the rear location includes determining an amount of neutron absorber control rod insertion as a function of distance from a nuclear fission igniter of the travelling nuclear fission reactor.

* * * * *